US010997532B2

(12) United States Patent
Govindugari

(10) Patent No.: US 10,997,532 B2
(45) Date of Patent: May 4, 2021

(54) SYSTEM AND METHOD FOR ASSESSING AND OPTIMIZING MASTER DATA MATURITY

(71) Applicant: The Dun and Bradstreet Corporation, Short Hills, NJ (US)

(72) Inventor: Diwakar Ray Govindugari, Summit, NJ (US)

(73) Assignee: THE DUN AND BRADSTREET CORPORATION, Short Hills, NJ (US)

(*) Notice: Subject to any disclaimer, the term of this patent is extended or adjusted under 35 U.S.C. 154(b) by 185 days.

(21) Appl. No.: 15/883,138

(22) Filed: Jan. 30, 2018

(65) Prior Publication Data

US 2018/0225600 A1  Aug. 9, 2018

Related U.S. Application Data

(60) Provisional application No. 62/454,291, filed on Feb. 3, 2017.

(51) Int. Cl.
| | |
|---|---|
| *G06Q 10/06* | (2012.01) |
| *G06F 9/451* | (2018.01) |
| *G06T 11/20* | (2006.01) |
| *G06F 16/25* | (2019.01) |
| *G06F 16/22* | (2019.01) |

(52) U.S. Cl.
CPC ........... *G06Q 10/063* (2013.01); *G06F 9/451* (2018.02); *G06F 16/2219* (2019.01); *G06F 16/252* (2019.01); *G06T 11/206* (2013.01)

(58) Field of Classification Search
CPC .. G06Q 10/063; G06Q 10/6398; G06Q 10/00; G06Q 10/0639; G06Q 10/06; G06F 16/252; G06F 16/2219; G06F 9/451; G06T 11/206
See application file for complete search history.

(56) References Cited

U.S. PATENT DOCUMENTS

2004/0039631 A1* 2/2004 Crockett ................ G06Q 30/02
705/7.38
2005/0234767 A1* 10/2005 Bolzman ................ G06Q 10/00
705/7.39

(Continued)

OTHER PUBLICATIONS

MD3M: The master data management maturity model. Spruit, M, Pietzka, K. Oct. 28, 2014. Computers in Human Behavior 51 (2015) 1068-1076. (Year: 2014).*

(Continued)

*Primary Examiner* — Cory W Eskridge
(74) *Attorney, Agent, or Firm* — Ohlandt, Greeley, Ruggiero & Perle, L.L.P.

(57) ABSTRACT

A system for assessing and optimizing master data maturity for an enterprise master data architecture. The master data maturity analysis system generates a master data maturity matrix for individual master data users. Each unique master data user's master data maturity matrix is used to generate master data matrices for other hierarchical entities for an enterprise such as lines of business and/or the enterprise as a whole. Master data maturity matrices are stored over time and tracked to assess and optimize the master data maturity and improvement of the master data technology vertically and horizontally across all enterprise hierarchies and business components.

18 Claims, 40 Drawing Sheets

{Current and Target}

(56) References Cited

U.S. PATENT DOCUMENTS

| 2012/0303414 | A1 | 11/2012 | Dodge et al. |
| 2015/0106151 | A1 | 4/2015 | Krishnaswamy |
| 2016/0026951 | A1* | 1/2016 | Ramanathan ...... G06Q 10/0639 705/7.38 |
| 2017/0032297 | A1 | 2/2017 | Chalfant et al. |
| 2017/0103330 | A1* | 4/2017 | Gagne .................. G06F 11/079 |

OTHER PUBLICATIONS

The MD3M Questionnaire: Assessing Master Data Management Maturity. Spruit, M, Pietzka, K. Oct. 28, 2014. Computers in Human Behavior 51 (2015) 1068-1076. (Year: 2014).*
International Search Report dated Apr. 23, 2018 from corresponding International PCT Application No. PCT/US2018/015818, 3 pages.
Written Opinion of the International Searching Authority dated Apr. 23, 2018 from corresponding International PCT Application No. PCT/US2018/015818, 8 pages.
International Preliminary Report on Patentability dated Aug. 15, 2019 in corresponding International PCT Patent Application No. PCT/US2018/015818, 10 pages.
Schmidt, Alexander & Otto, Boris. (Nov. 2010). Enterprise Master Data Architecture: Design Decisions and Options. http://www.alexandria.unisg.ch/Publikationen/68963.

* cited by examiner

FIG. 9B (Current and Target)

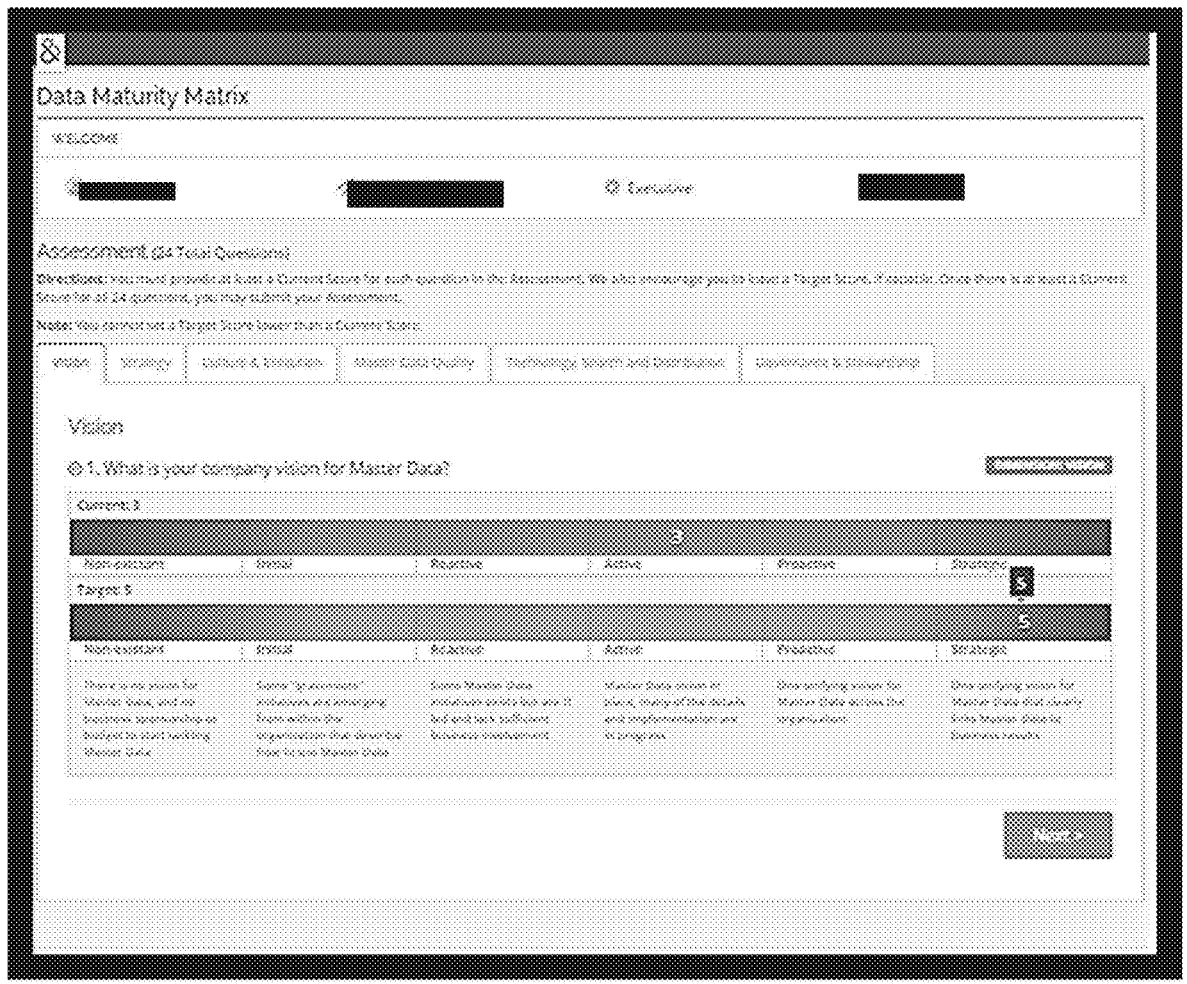
FIG. 10 A (Current/Target)

FIG. 10J plan to deliver benefits.

Your trend score was below 2.0, but greater than 1.0

Vision

Score 2.5

Vision
What is your company vision for Master Data?

You selected between:
- Some Master Data initiatives exists but are IT led and lack sufficient business involvement
- Master Data vision in place, many of the details and implementation are in progress

Strategy

Score 2.5

Strategy
What is your strategy for managing Master Data requirements?

You selected between:
- Strategy is mostly reactive, focused on firefighting initiatives
- Strategy is proactive, but mostly focused on individual business units

Strategy

Score 0

Unique IDs
What is your strategy for assigning Unique IDs to Master Data assets such as Customer, Vendor, Prospect, etc.?

You selected:
Do not see a value in Unique IDs

Strategy

Score 0

Enrichment
What is your strategy for enriching Master Data from external as well as internal data sources?

You selected:
Limited use of existing data

Strategy

Hierarchies
Commercial entities such as Customers and Vendors can have relationships (legal, geography, location, etc.) to other entities which can be represented in a hierarchies. Such information provide critical clarity into the opportunity or risk

FIG. 11B

| Score | | |
|---|---|---|
| 0 | | associated with a relationship. What is your strategy for managing hierarchical information?<br><br>You selected:<br>Limited or no need for master data |

| Strategy | | |
|---|---|---|
| Score 2 | | Consistency<br>What is your strategy for maintaining consistent schema definition for commercial entities such as customers and vendors?<br><br>You selected:<br>Consistency of schema, attributes is lacking and is only maintained for some master data |

| Strategy | | |
|---|---|---|
| Score 3 | | Data Sourcing<br>How is external data sourced and converted to Master Data?<br><br>You selected:<br>Source Data is sourced from multiple vendors individually by different groups. Some of the sourced data becomes Master Data |

| Culture & Execution | | |
|---|---|---|
| Score 1.5 | | Culture<br>What is your company culture in regards to Master Data?<br><br>You selected between:<br>• Master Data is created on an as needed basis with no or few rules/standards<br>• Good understanding of Master Data as an asset |

| Culture & Execution | | |
|---|---|---|
| Score 1.5 | | Execution<br>What is your Master Data Execution status?<br><br>You selected between:<br>• No version of the truth<br>• Multiple versions of the truth |

FIG. 11C

| | |
|---|---|
| Culture & Execution<br><br>Score<br>2 | Metrics<br>What is/are your Master Data Metrics?<br><br>You selected:<br>Starting to develop metrics to set Master Data Quality goals but there is no unified metrics scheme |
| Culture & Execution<br><br>Score<br>5 | Change management<br>How are you identifying and executing to Master Data changes?<br><br>You selected:<br>Master Data changes are continuously monitored and impacted systems are updated immediately |
| Culture & Execution<br><br>Score<br>2.5 | Level of Importance<br>What level of importance does your organization give towards Master Data Quality?<br><br>You selected between:<br>• Organization takes steps towards cross-department sharing to achieve operational efficiency<br>• Full business sponsorship and involvement, promoting enterprise-wide initiatives |
| Master Data Quality<br><br>Score<br>2.5 | Awareness<br>How aware is your organization in regards to Master Data Quality?<br><br>You selected between:<br>• Data quality concerns are perceived as mainly IT department's responsibility<br>• Data quality given considerable attention in the IT charter |
| Master Data Quality | Cleansing<br>What is your approach to Data cleansing which includes standardization, deduping, corrections, etc.? |

FIG. 11D

Score 3.5

You selected between:
• Dedup and Data cleansing are considered important and considered to be the responsibility of IT
• Data quality tools are in place for cleansing including duplicate identification Master Data Quality

Assessment
How does your organization react to Master Data Quality issues?

Score 0

You selected:
No capability for identifying data quality expectations nor are they documented Master Data Quality

Monitoring
What level of change monitoring does your organization have for Master Data?

Score 3.5

You selected between:
• Some monitoring for updates and quality in place
• Data quality checks and data updates are part of operational information systems Master Data Quality

Updates
How does your organization handle Master Data Updates?

Score 1

You selected:
Updates are not propagated across all systems

Technology, Search and Distribution

Integration
What is your Master Data Sourcing and Integration process?

You selected between:
• Data collection & sourcing takes up most of the time. Master

FIG. 11E

| | |
|---|---|
| Score 1.5 | data often siloed and most data is not integrated. Changes to Master data are uncontrolled with no common data definitions<br>• Some data integration. Controls developed around changes of master data definitions. Different guidelines and processes around definitions and requirements gathering |
| Technology, Search and Distribution<br><br>Score 3 | Distribution<br>How do your distribute your Master Data into other systems?<br><br>You selected:<br>Master Data solution covers few data domain |
| Technology, Search and Distribution<br><br>Score 2.5 | Matching<br>How do you currently search, match and retrieve master data?<br><br>You selected between:<br>• Lookup usually with scripts is limited to each silo where master data is maintained<br>• Search, Retrieval framework and match logic in place, but limited to certain systems. |
| Governance & Stewardship<br><br>Score 2 | Practice<br>What is your organization's awareness and practice towards Governance requirements for Master Data?<br><br>You selected:<br>Metrics are emerging to focus on retention for information, files, email, etc. to address known security and compliance risks |
| Governance & Stewardship | Governance<br>What is your current Governance policies for Master Data?<br><br>You selected between:<br>• Governance organization in place. Standard processes to address data aspects of projects. Leadership is aware of the |

FIG. 11F

| | importance of Data Governance and the impact on the performance of the organization |
|---|---|
| Score 3.5 | • Data governance in place, linked to key internal processes. Deliveries of projects that address data aspects are reviewed. Proactive monitoring for data quality controls feeds into the governance program |

Governance & Stewardship

Risk Management
How do you handle Risk related to Master Data?

Score 0.5

You selected between:
• No risk management necessary
• Effort to document risk associated with uncontrolled information assets has begun Governance & Stewardship

Stewardship
What is your approach to Data Stewardship? Do you have dedicated Data Stewards?

Score 0

You selected:
No data stewardship necessary

Enterprise Master Data Maturity Matrix

SYSTEM AND METHOD FOR ASSESSING AND OPTIMIZING MASTER DATA MATURITY

CROSS REFERENCE TO RELATED APPLICATION

The present application claims priority to U.S. Provisional Patent Application No. 62/454,291, entitled SYSTEM AND METHOD FOR ASSESSING AND OPTIMIZING MASTER DATA MATURITY, filed on Feb. 3, 2017, the entirety of which is incorporated by reference hereby.

DESCRIPTION OF THE RELATED TECHNOLOGY

In an enterprise, data falls into three types: master data, transaction data, and inventory data. Typical master data classes include material and product master data, supplier and customer master data, and master data regarding employees and assets. Transaction data, which describes business transactions and represents input and output of business processes, is constantly created in the course of business activities. Transaction data references master data and indicates changes to inventory data. Examples comprise purchase orders, invoices and shipping notes. Inventory data refers to stock and account levels, e.g. to bank account balances or reserved stock of finished goods.

Master data refers to the characteristics of core business objects within an enterprise. Master data is the single source of information or the 'golden record' that consists of uniform set of identifiers and standard definition of attributes that describe core entities of an enterprise such as customers, suppliers, prospects, locations, products, etc. Master data is high value information that an organization uses repeatedly across many lines of businesses (LOBs) and business components, and it supports key business processes and transactions throughout the entire enterprise.

Master data is managed as objects and attributes by a discipline known as master data management (MDM), which generally refers to a combination of hardware, software, policies and processes. According to ANSI/IEEE Standard 1471-2000, an architecture is defined as the "fundamental organization of a system, embodied in its components, their relationships to each other and the environment, and the principles governing its design and evolution." The information architecture as information system sub-architecture is often referred to as consisting of two parts, a master data model describing a company's key business objects as well as the relationships between them on a conceptual level (e. g. in a data object model) and an application architecture comprising the entirety of a company's applications that create, store, and update instances of the entity types defined in the conceptual master data model. The enterprise master data architecture is an information architecture whose scope is restricted to a specific data type (master data).

The general perception is that master data management (MDM) solutions are the cure-all for master data in an enterprise. Yet unlike transaction data and inventory data, time frequency (time dependency of data) and change frequency (updates or changes and volume) growth of data over time are all comparatively low, but the independence of master data identities is very high.

Thus managing master data is challenging since data is usually scattered throughout the enterprise without consistent view in many systems. Fragmentation occurs as a result of the data being generated and maintained by applications such as enterprise resource planning (ERP), customer relationship management (CRM) and other commercially available off-the-shelf (COTS) packages.

Delays and exponential cost increases in deploying MDM solutions has made customers wary of master data management solution(s) leading many to establish evaluation processes to determine the effectiveness of the use of master data. There are a several maturity models for data management including master data management (MDM), data quality, information management, data governance, etc. Almost all such maturity models are focused on the software solutions that fall under each category and do not measure the effective use of the actual data that is generally considered the life blood of such initiatives. They are also "linear" and "descriptive", usually applied for "as-is" assessments where the current capabilities are assessed with respect to given criteria and are frequently used as a simple report that does nothing beyond assigning a "maturity level" to an organization. Many existing models provide step-by-step recipes that simplify reality and lack empirical foundation. They also neglect the potential existence of multiple equally advantageous paths and focus on "linear" sequence of levels towards a predefined "end state."

MDM is an application-independent process that comprises design activities on a strategic, organizational and at an information systems level. While data management has been investigated for a long time, MDM has not been well established in the past.

For example, as shown in FIG. 15, conventional master data management assessment can offer "top down" measurements of master data dimensions (y axis) that are by evaluators (e.g. managers or outside evaluators) and not the master data users themselves. As there is no system interface or master data maturity engine or tracking master data maturity database, conventional systems provide a "snapshot" of, at best, current levels and a future trend vector of a single user perspective in a company. Moreover, such measurements are much more subjective as they are not based on actual master data usage by master data users, and thus put one or more degrees of ignorance between the actual master data usage and the measurement thereof, making report less reliable and any information therefrom including subjective and imprecise.

Such platforms fail to accurately measure maturity of master data within a given enterprise, as different enterprises have various MDM solutions and these data management solutions have differing functionality, deployment methods and features. There has been no method available to measure maturity levels of the actual master data within an enterprise.

SUMMARY

The following briefly describes embodiments to provide a basic understanding of some aspects of the innovations described herein. This brief description is not intended as an extensive overview. It is not intended to identify key or critical elements, or to delineate or otherwise narrow the scope. Its purpose is merely to present some concepts in a simplified form as a prelude to the more detailed description that is presented later.

As noted herein, extant MDM platforms have failed to appreciate that a master data initiative in an enterprise should ensure consistent master information across transactional and analytical systems, address key issues such as data quality and consistency proactively rather than "after the fact", and decouple master information from individual applications while still providing for objective, measurable and actionable master data optimization.

The enterprise-wide management of master data is a prerequisite for companies to meet strategic business requirements such as compliance to regulatory requirements, integrated customer management, and global business process integration. Among others, this demands systematic design of the enterprise master data architecture. The current state-of-the-art, however, does not provide sufficient guidance for practitioners as it does not specify concrete design decisions they have to make and to the design options of which they can choose with regard to the master data architecture.

Briefly stated, various embodiments are directed to a system for assessing and optimizing master data maturity for an enterprise comprising: a memory including a user database configured to store master data maturity data for a plurality of hierarchical entities including a plurality of unique master data users.

The system also includes a master data maturity engine configured to measure master data maturity for a plurality of hierarchical entities for an enterprise based on master data maturity units, for example unit values such as master data maturity scores, generated for a plurality of unique master data users, the master data maturity engine being configured to generate a master data maturity matrix comprising a plurality of master data dimensions; wherein the system is configured to generate the master data maturity matrix for each of the plurality of hierarchical entities. The master data maturity matrix comprises the master data maturity scores for each of the plurality of master data dimensions; wherein each master data dimension maturity score generated by the master data maturity engine can be scored on a standardized interval scale measuring a plurality of ordinal levels for each dimension. The system can be configured to calculate an overall master data maturity score from the plurality of master data dimension maturity scores for the master data maturity matrix.

In an embodiment, a line of business master data maturity matrix and an enterprise master data maturity matrix can be calculated from the master data user master data maturity scores, wherein each line of business master data maturity matrix is generated from the master data maturity scores of the one or more unique master data users associated with that line of business, and the enterprise master data maturity matrix is generated from the master data maturity scores of all the unique master data users for that enterprise. The system can be configured to allow a user to compare master data maturity scores for the hierarchical entities.

The system can comprise a user interface configured to present each of the plurality of unique master data users with a master data evaluation interface. The master data evaluation interface can include a survey comprising, for each master data dimension, an input for an ordinal measure of the dimension, wherein the master data maturity engine generates the master data maturity score for the master data dimension from the ordinal measure input, wherein the user interface is configured to display a graphic of the master data maturity matrix.

In at least one of the various embodiments, described is a system, method, and computer program product for assessing and optimizing master data maturity configured for a system comprising: a network computer, including: a transceiver for communicating over the network; a master data maturity database configured to store master data maturity data for a plurality of hierarchical entities including a plurality of unique master data users; a memory for storing at least instructions; and a processor device that is operative to execute instructions that enable actions, including: present each of the plurality of unique master data users with a master data maturity interface configured to generate a master data maturity matrix comprising a plurality of master data dimensions for each unique master data user; associate each of the unique master data users with a line of business and an enterprise; present, via the interface, each unique master data user with a master data evaluation survey evaluation which can comprise, for each master data dimension, an input for an ordinal measure of the dimension, wherein the master data maturity engine generates the master data maturity score for the master data dimension from the ordinal measure input; generate master data maturity scores for each of the plurality of master data dimensions from the ordinal measure input; generate, for each of the unique master data users, a master data maturity matrix comprising the plurality of master data dimension maturity scores and an overall master data maturity score; log the time the master data maturity matrix is created; determine if a master data maturity matrix has been generated for another master data user master data user logged to the same enterprise; if so, generate an enterprise master data maturity matrix from each unique users' master data maturity matrix scores; log the time the enterprise master data maturity matrix is created; log the line of business for each unique master data user to enterprise master data maturity matrix; and store each master data maturity matrix in the massive user database.

Described herein are embodiments of a method, a system, and a computer program product for determining the master data maturity of an organization that deals with the master data use within an enterprise. The method includes receiving an input corresponding to a master data evaluation, for example a survey such as a questionnaire. The pre-determined model facilitates assessing the maturity level of the organization across various goals. In addition to determining the maturity level across the goals, the pre-determined model facilitates the assessment of various key areas called dimensions associated with these goals. In various embodiments of the invention, the dimensions are assigned a pre-defined ordinal level, wherein one or more questions of the questionnaire is associated with a corresponding goal.

These master data maturity dimensions help the enterprise evaluate its existing procedures and also take into account procedures that the organization should employ to attain significant maturity levels. Further, since the list of dimensions associated with each key area is an exhaustive compilation, it helps in better assessment of the organization, thereby guiding the organization by providing granular level details. Further, the responses provided by the employees of the enterprises are also validated to ensure data authenticity. Such an assessment at each level based on the testers' responses provides a robust and foolproof mechanism to determine the maturity level of the organization.

In at least one of the various embodiments, the user taking the questionnaire can set two types of master data maturity scores for each question—a current score which embodies the current state or level of master data use across one or more goals across one or more dimension, and a future target score which embodies the state of master data use is for that goal and dimension and a discreet milestone therefor. This type of dual scoring allows the user to not only assess the current state but also track what changes the organization needs to make in order to achieve a different maturity level in their master data use.

Disclosed are embodiments that allow for master data users linked to predetermined business components such as lines of business (LOB) within an enterprise, such as, marketing, sales, finance, HR, IT, manufacturing, products, etc., to take the maturity assessment of master data use within their individual organization and line of business. The maturity scores and assessment can be tracked at these lines of business as well as across all lines of businesses at a company or enterprise level.

"Master data user" as described herein refer unique users who take the master data evaluation survey and generate a master data maturity master user matrix. A master data user can be any user in an enterprise who interacts with master data and thus can provide accurate, individualized input reflecting their actual usage and assessment. "Hierarchical master data entities" or "hierarchical entities" as described herein refer to entities or business components in an enterprise that can comprise at least one master data user, including master data user themselves. The master data user is the base unit or first order entity for hierarchical entities, with other entities in an enterprise being entities that include one or more unique master user entities. For example, one or more master data users can associate themselves with a predefined line of business, and that predefined line of business is a hierarchical entity can include a plurality of master data users. Similarly, the enterprise is a hierarchical entity that includes all the master data users. As described herein, any defined higher order hierarchical entity that includes one or more master data users can have its own master data maturity matrix generated by aggregating the master data maturity matrices of unique master data users associated or linked to that hierarchical entity.

In embodiments, unique master data users can take the master data maturity assessment as many times as needed or desired over time thereby allowing for monitoring progress of master data use within their individual lines of business as well as across the enterprise.

The method, the system, and the computer program product described above has a number of advantages:

First, such an assessment of the enterprise across multiple goals and the dimensions facilitates the enterprise to understand its current master data use procedures and its improvement areas in a more detailed fashion. By having the assessment, the tool assists the organization to focus its time and resources in one particular dimension where the scoring is low.

Second, the platform is dynamic and takes master data maturity assessment to a prescriptive level. It indicates how to identify desirable maturity levels and provides measurable guidelines on improvement measures. Specific courses of action are suggested by the model to reach a desired maturity level.

Third, setting current and future state of master data scoring for each question allows the organization to monitor and track progress from current state to a desired state over time, with the advantage of multiple matrices for each master data user tracking progress at a granular level.

Fourth advantage is that the assessment can be taken by many lines of businesses within the same enterprise allowing for visibility into areas of strength as well as weakness. This allows for concentrated efforts in terms of effort and process improvements to improve the use of master data in that area.

In addition, master data use is perceived differently by different users. The consumer of master data, the data steward responsible for ensuring the quality of master data, the executive, the technologist who is responsible for integration, etc., all have a different perspective on how the master data is being utilized. Fifth advantage is that the invention allows for different users within a line of business with differing roles take the assessment thereby showing a comparison of areas of strength and weakness. The model aggregates the results from multiple users and shows the comparative maturity scores across all users.

The master data maturity model focuses on factors driving evolution and change allowing an enterprise to gain an informed, objective assessment of the maturity of their organization or company. It helps identify, uncover, highlight and detail the strengths and weaknesses of the organization's capabilities and to benchmark future levels of organizational performance to develop a robust business case for investment and change management plan to deliver benefits. In addition, the user can compare with peers within and outside their individual lines of business or other defined business components allowing for sharing and collaborating on best practices and methods of implementation.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein:

Figure 8:
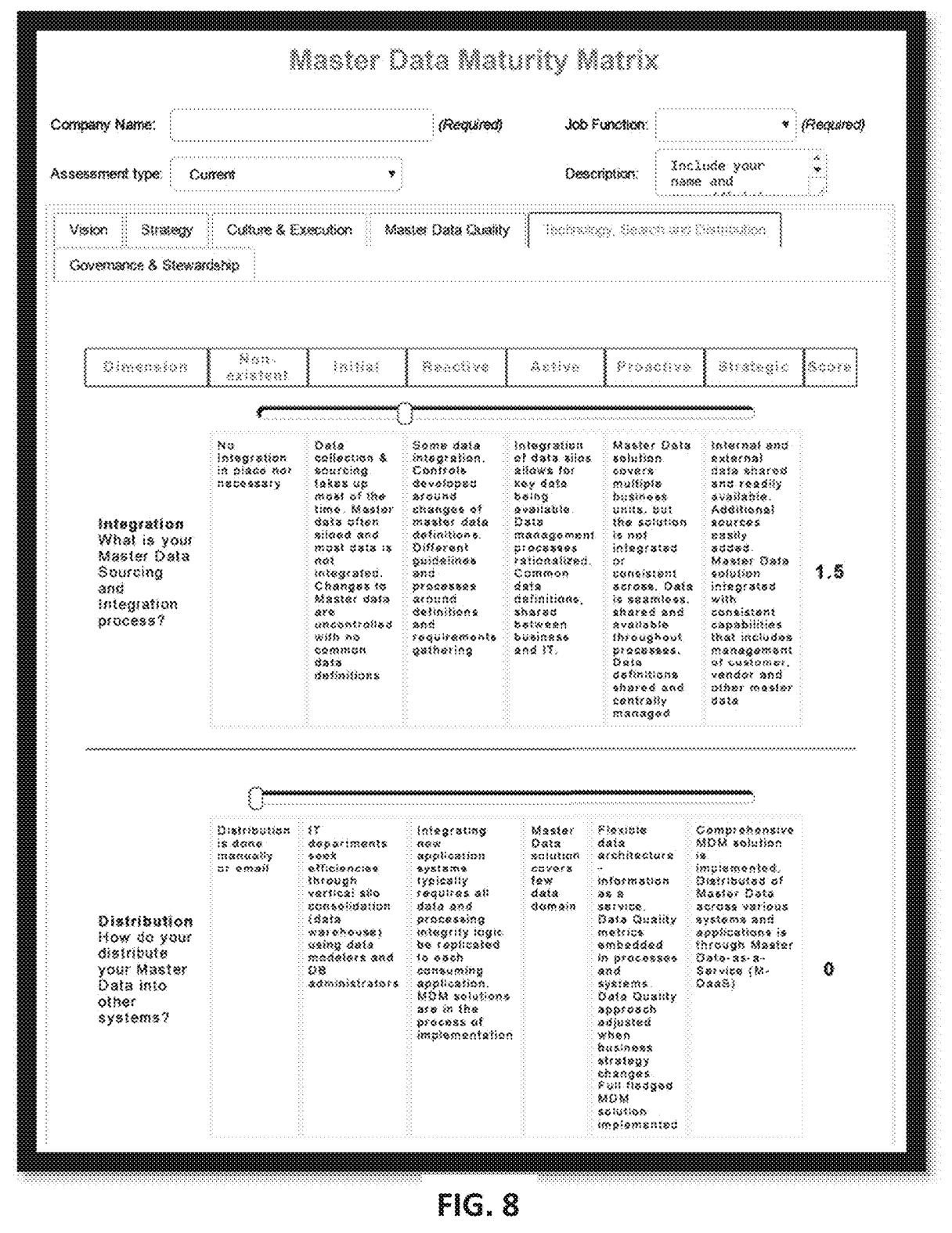
Figure 9A:
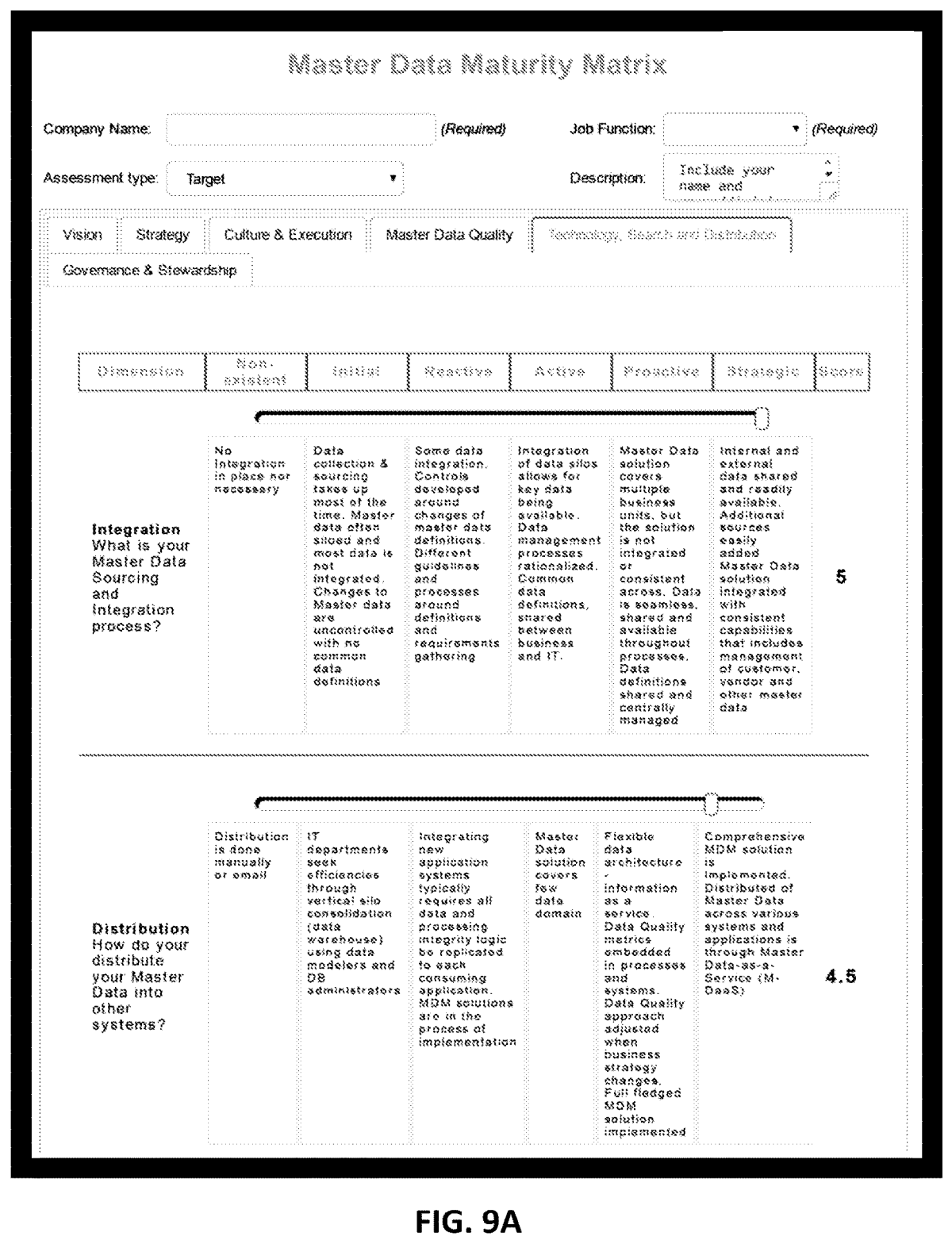
Figure 9B:
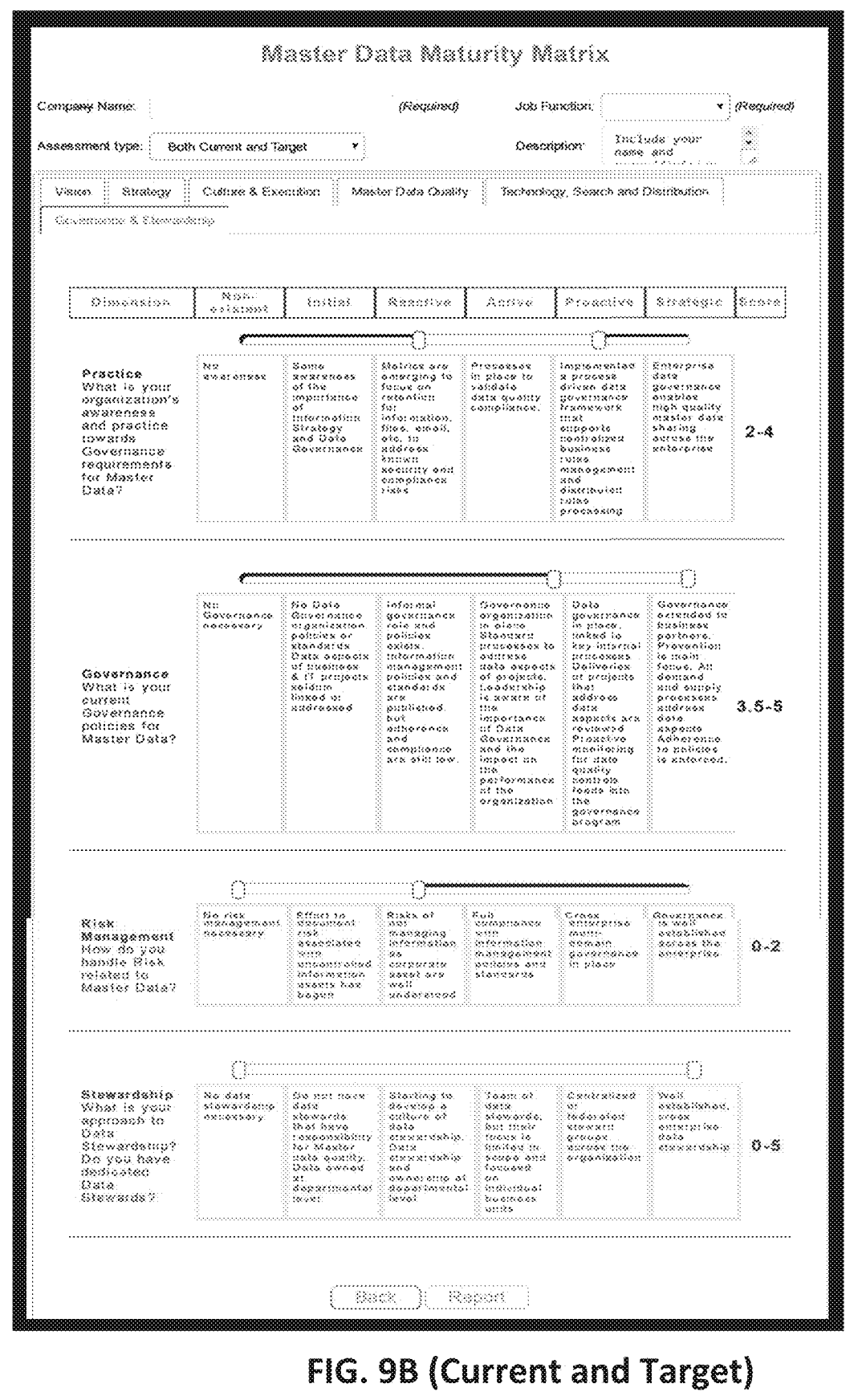
Figure 10B:
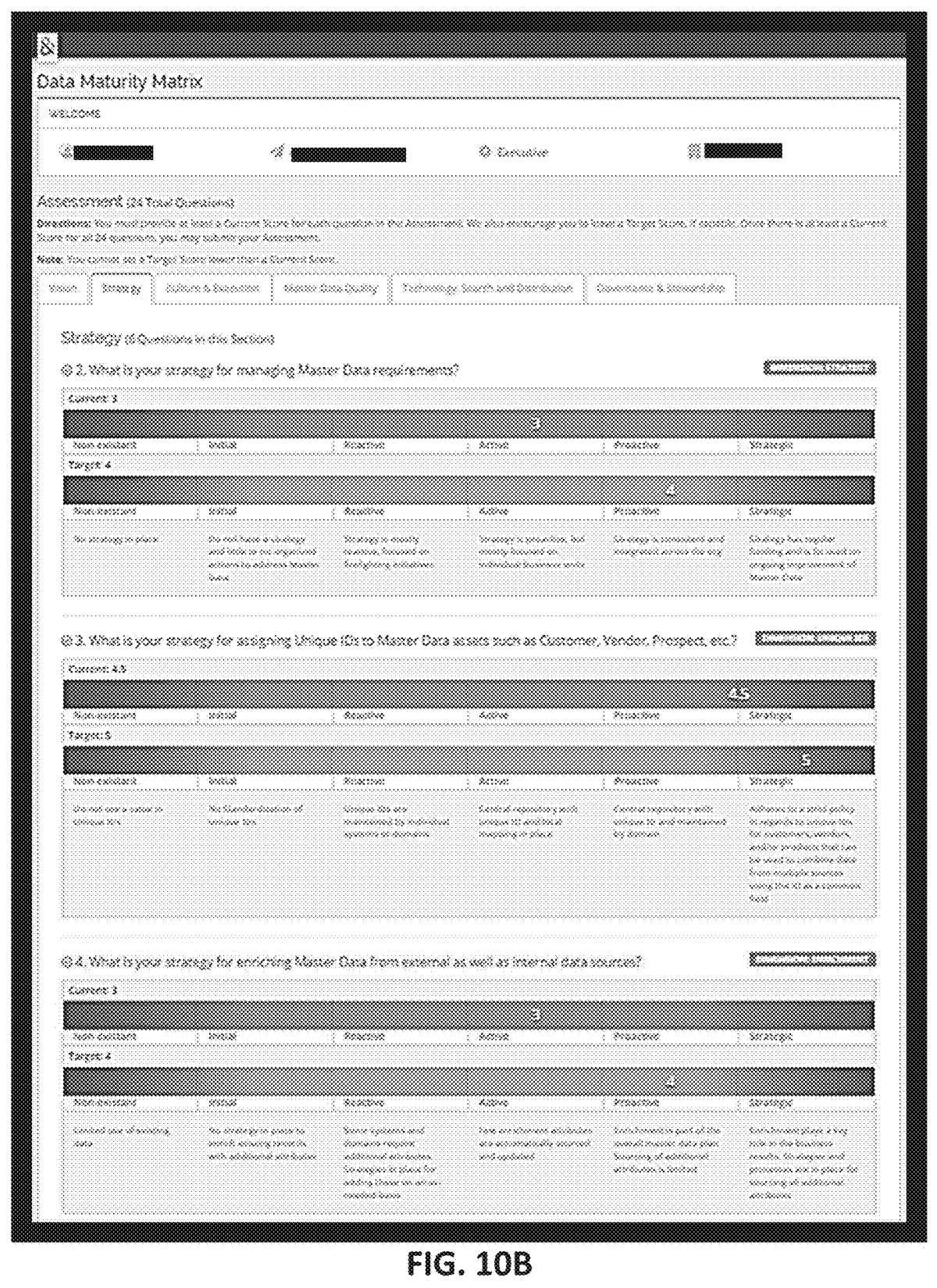
Figure 10C:
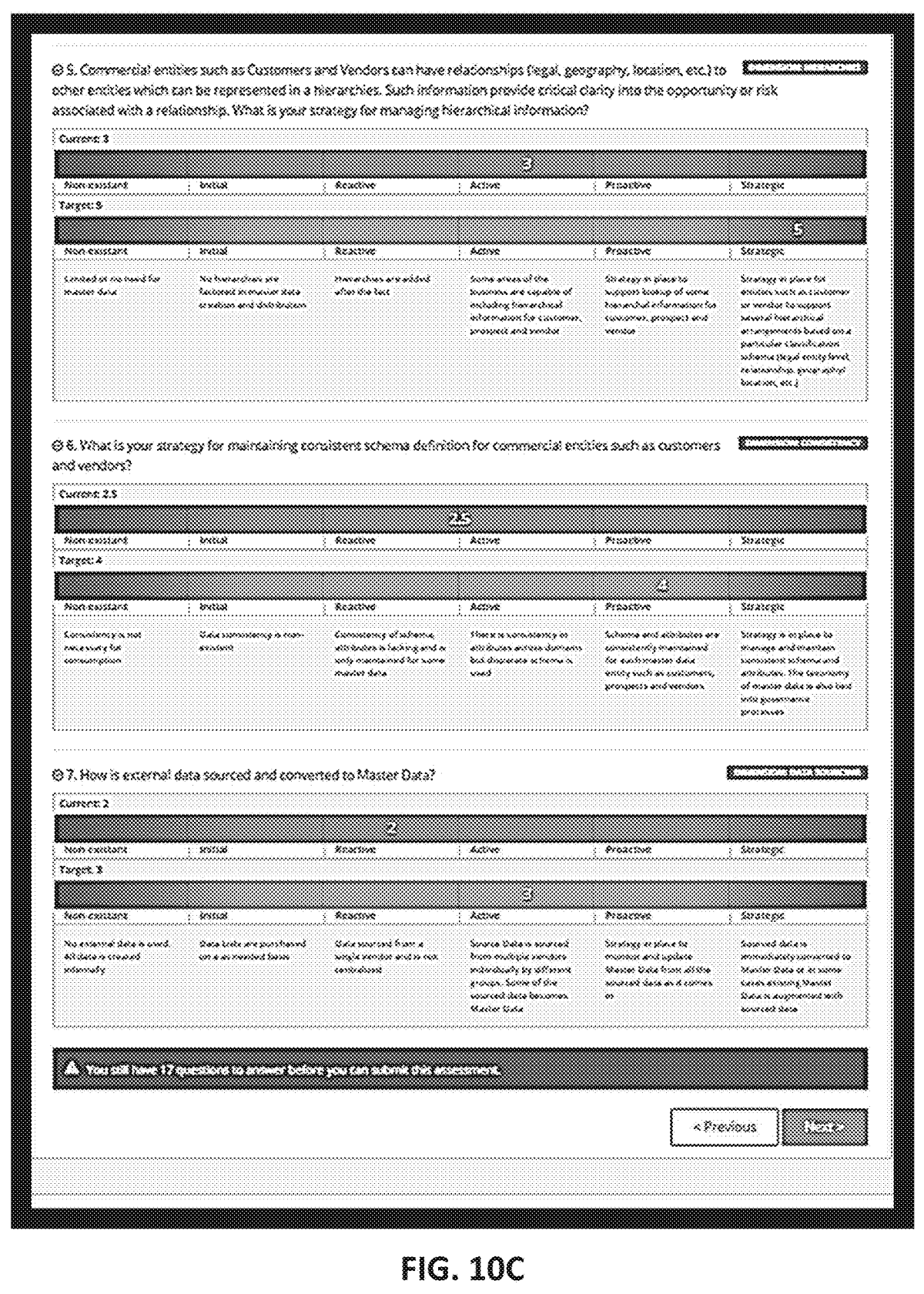
Figure 10D:
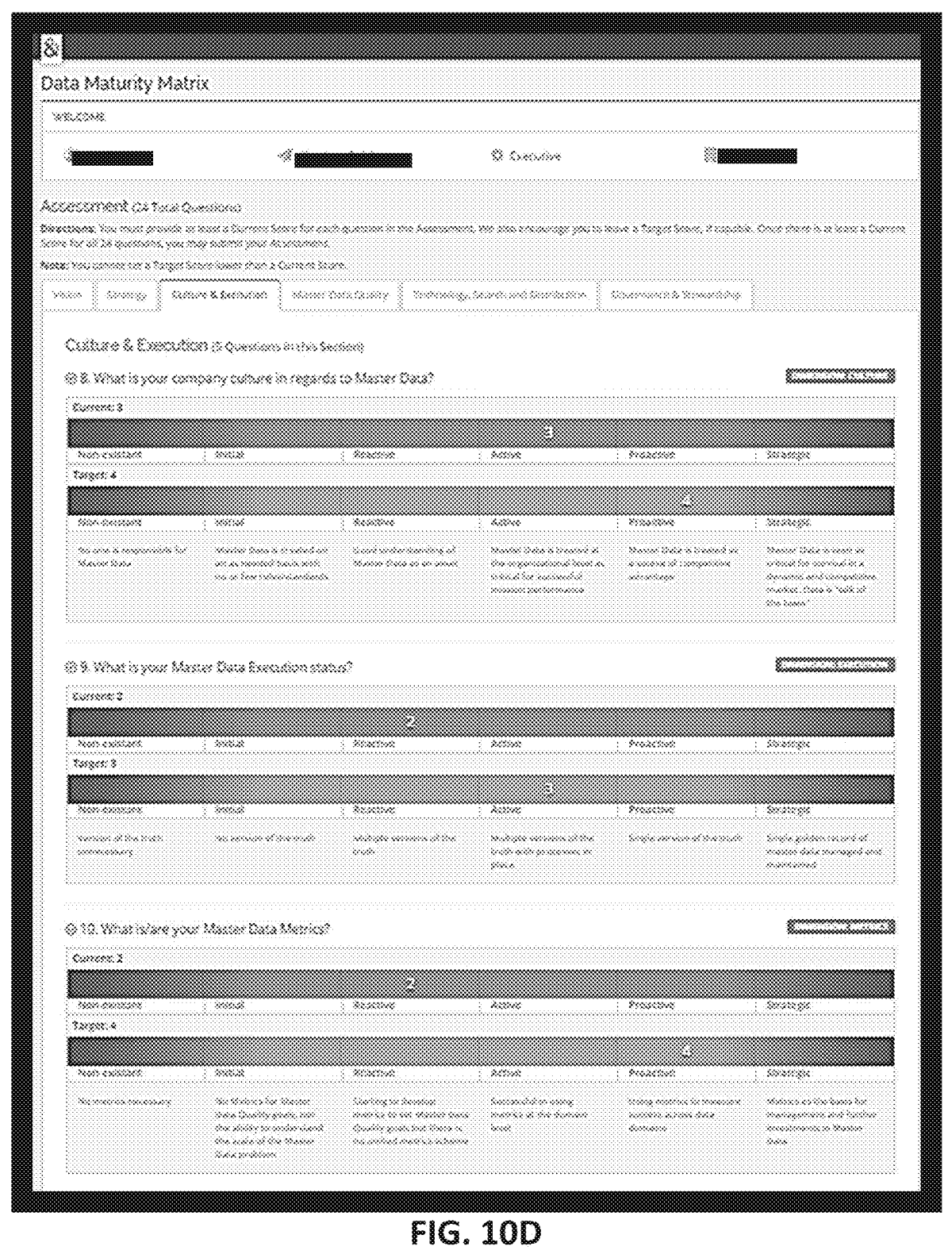
Figure 10E:
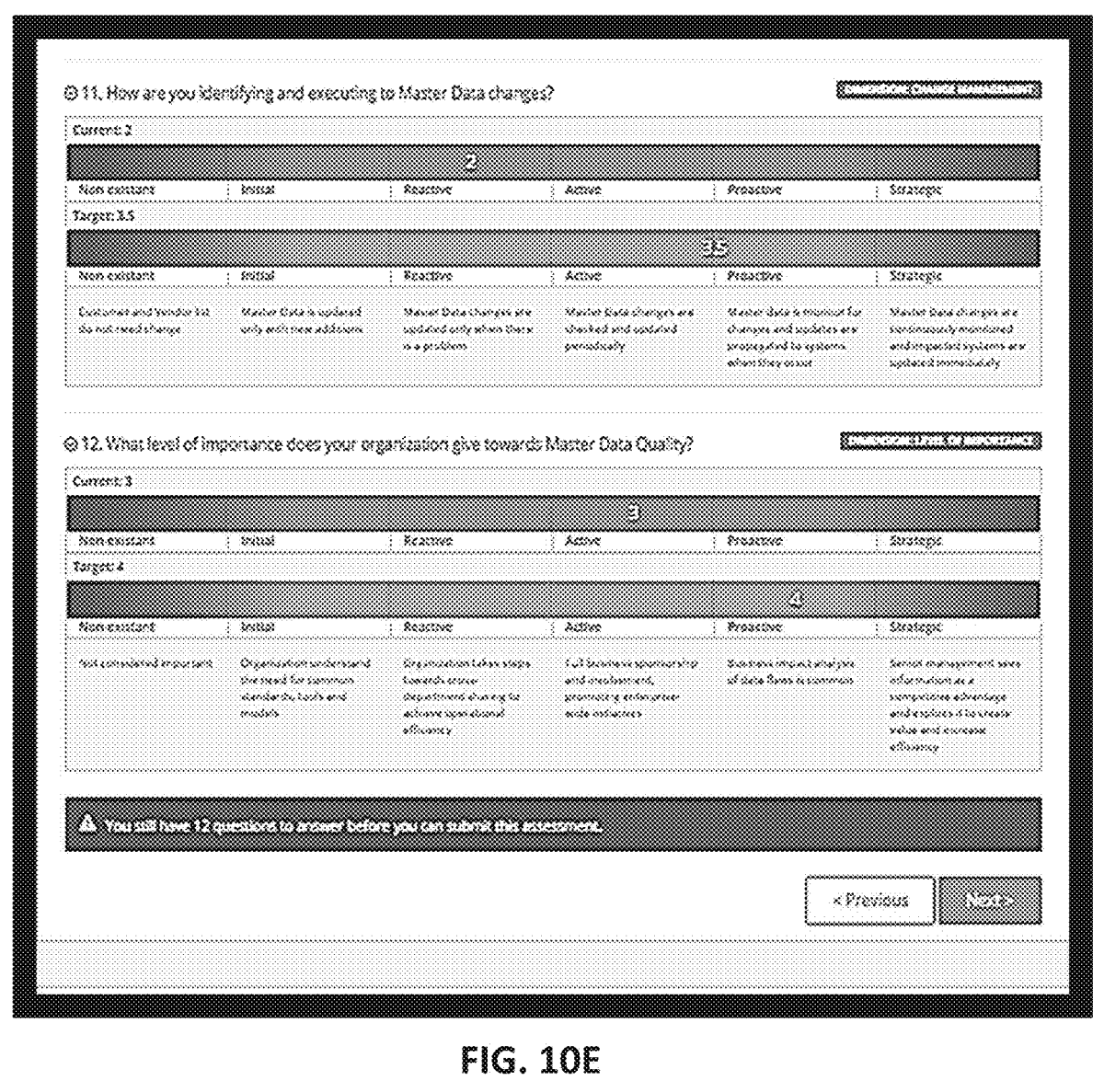
Figure 10F:
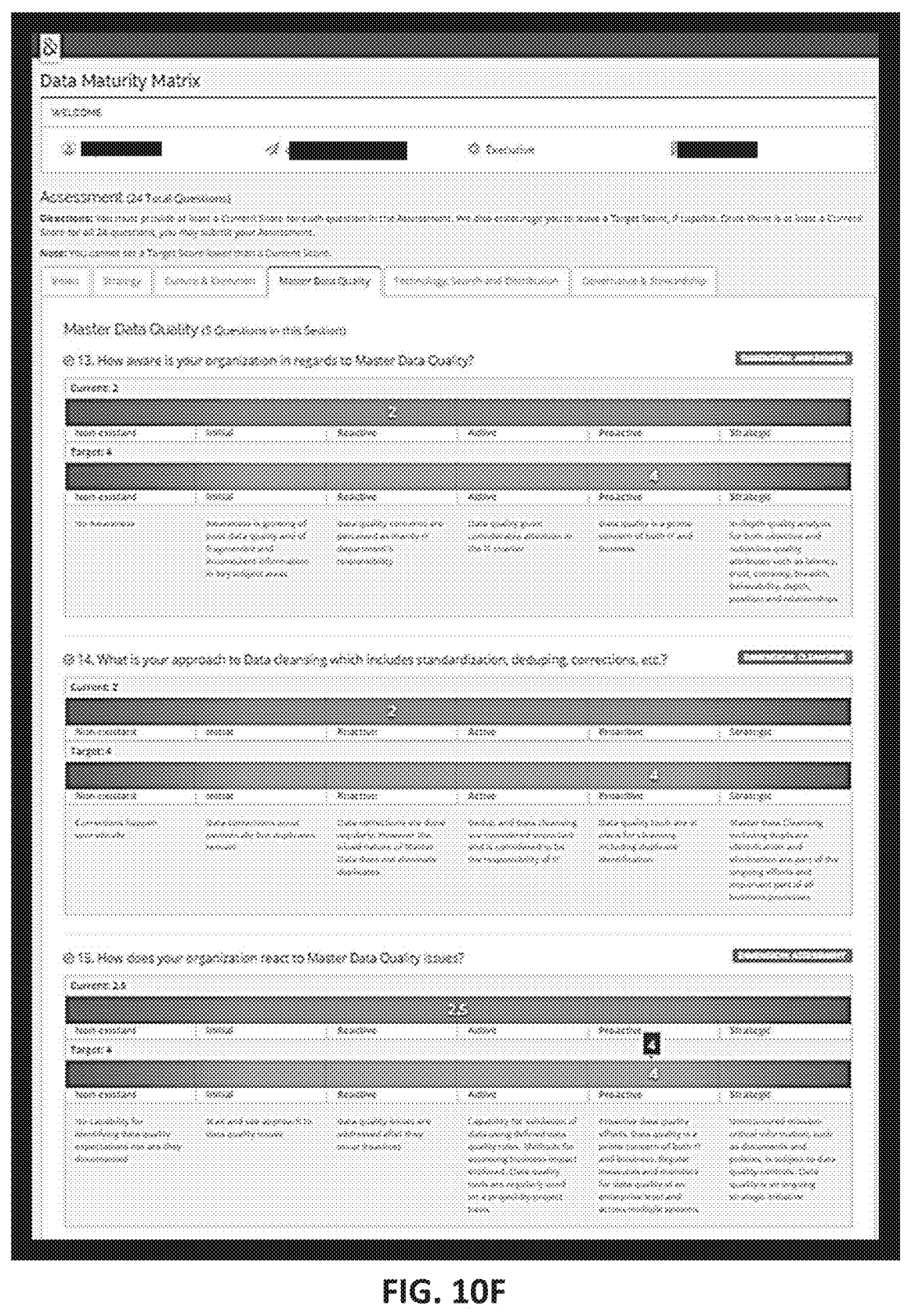
Figure 10G:
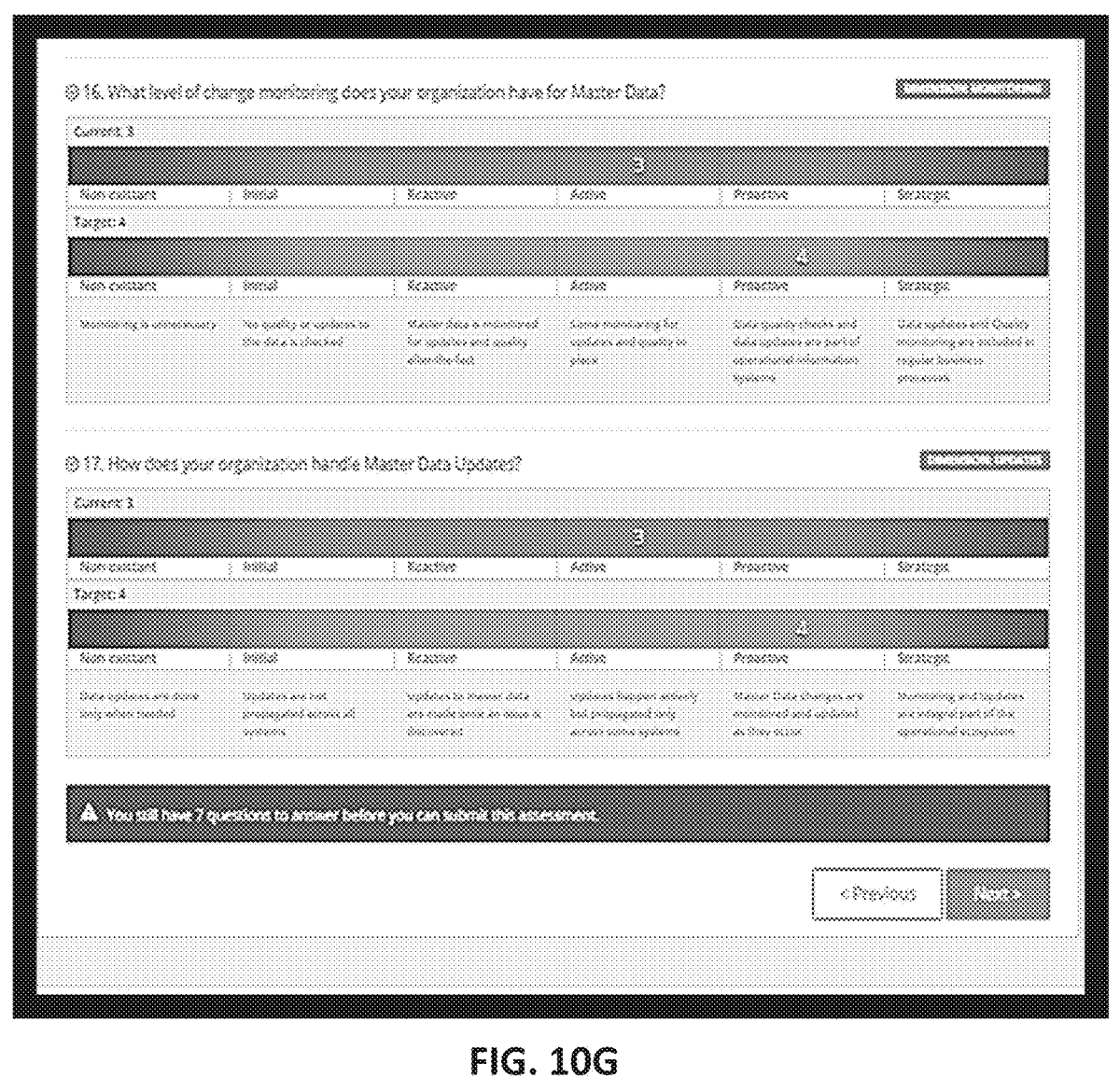
Figure 10H:
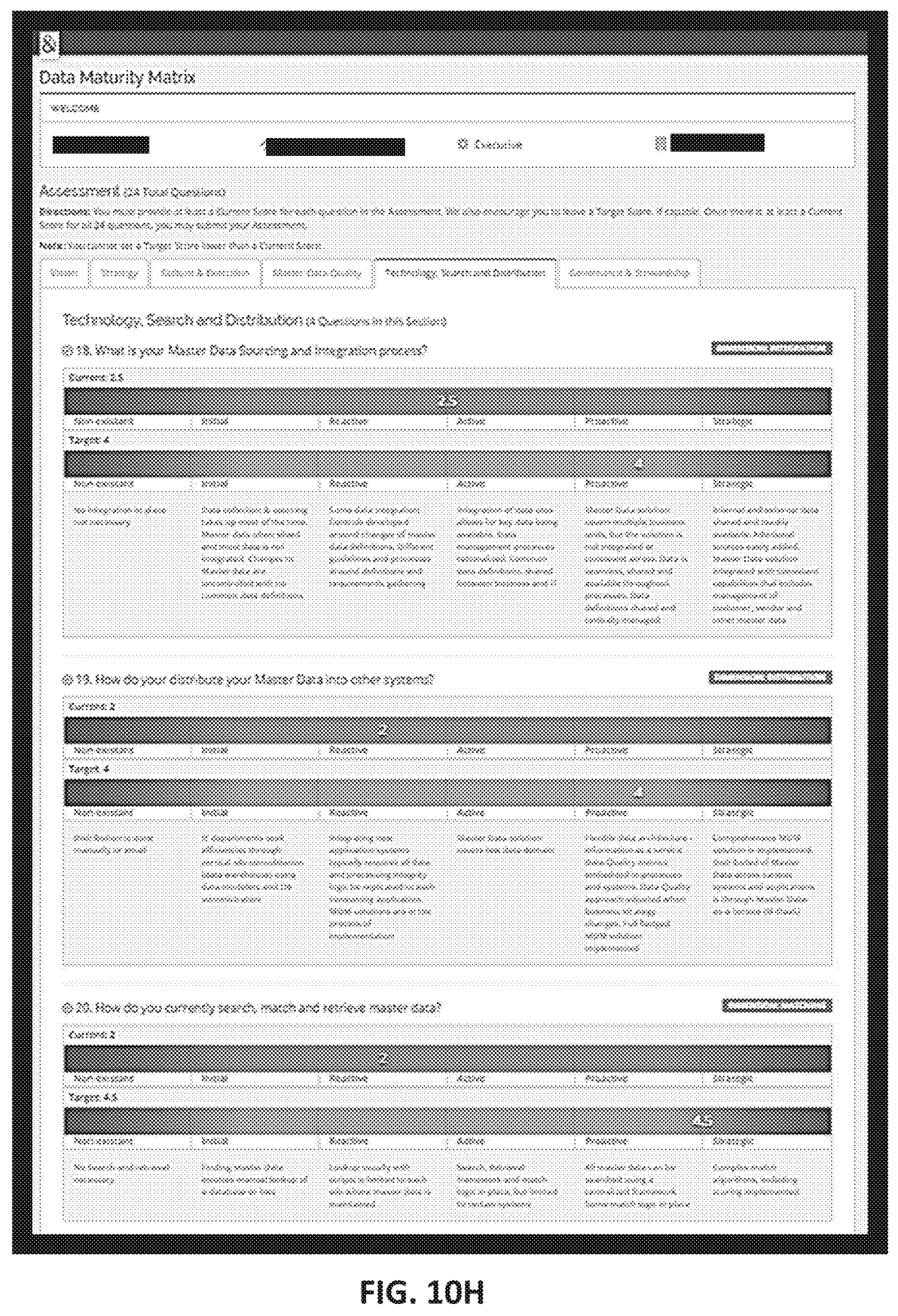
Figure 10I:
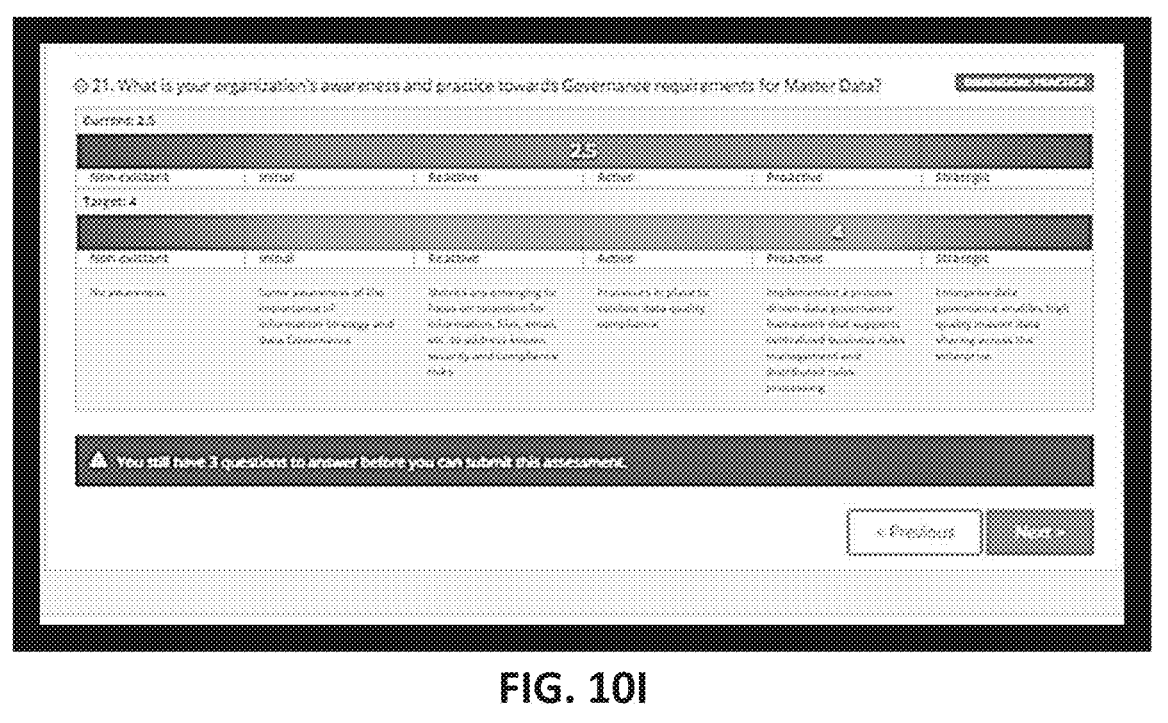
Figure 10J:
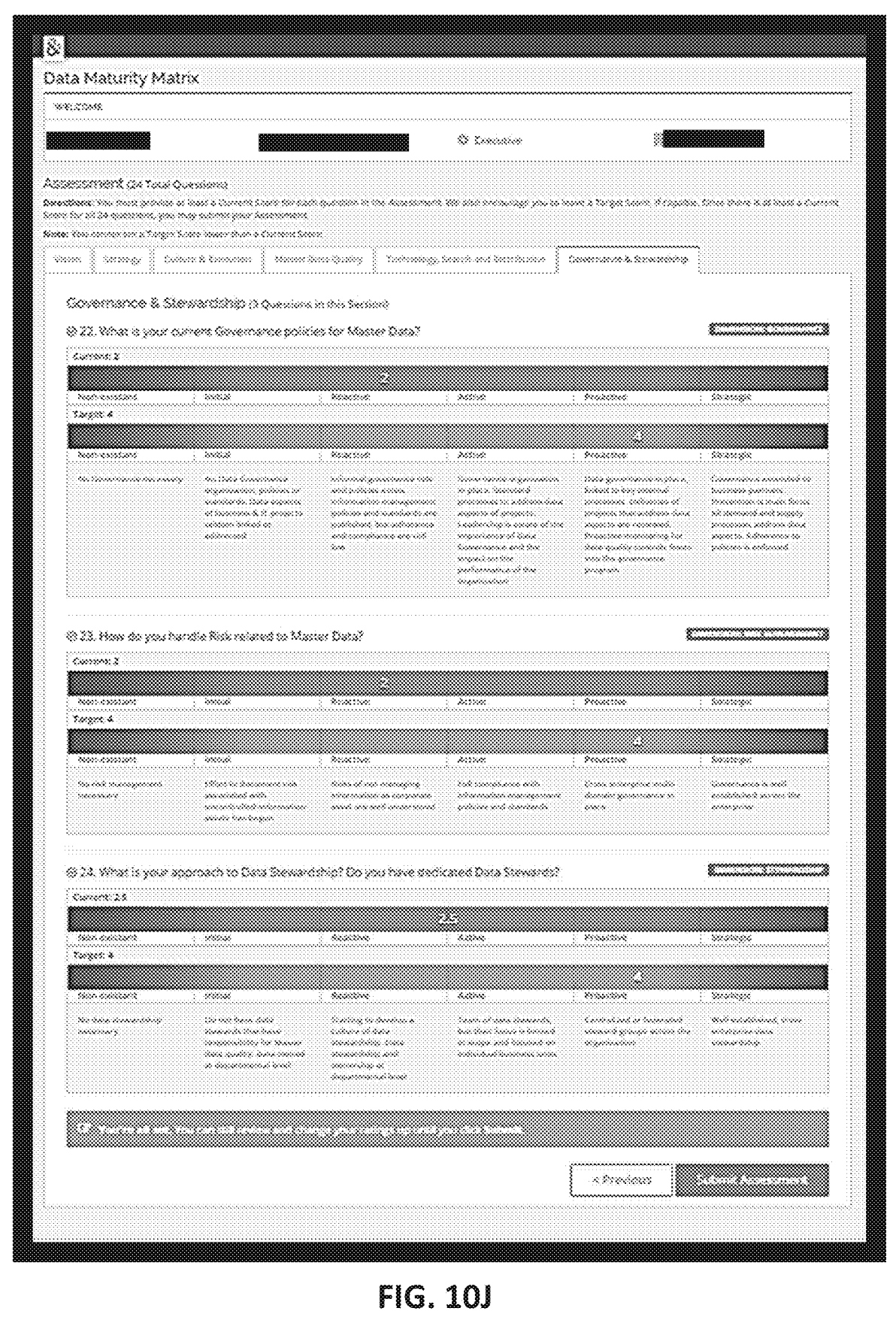
Figure 12B:
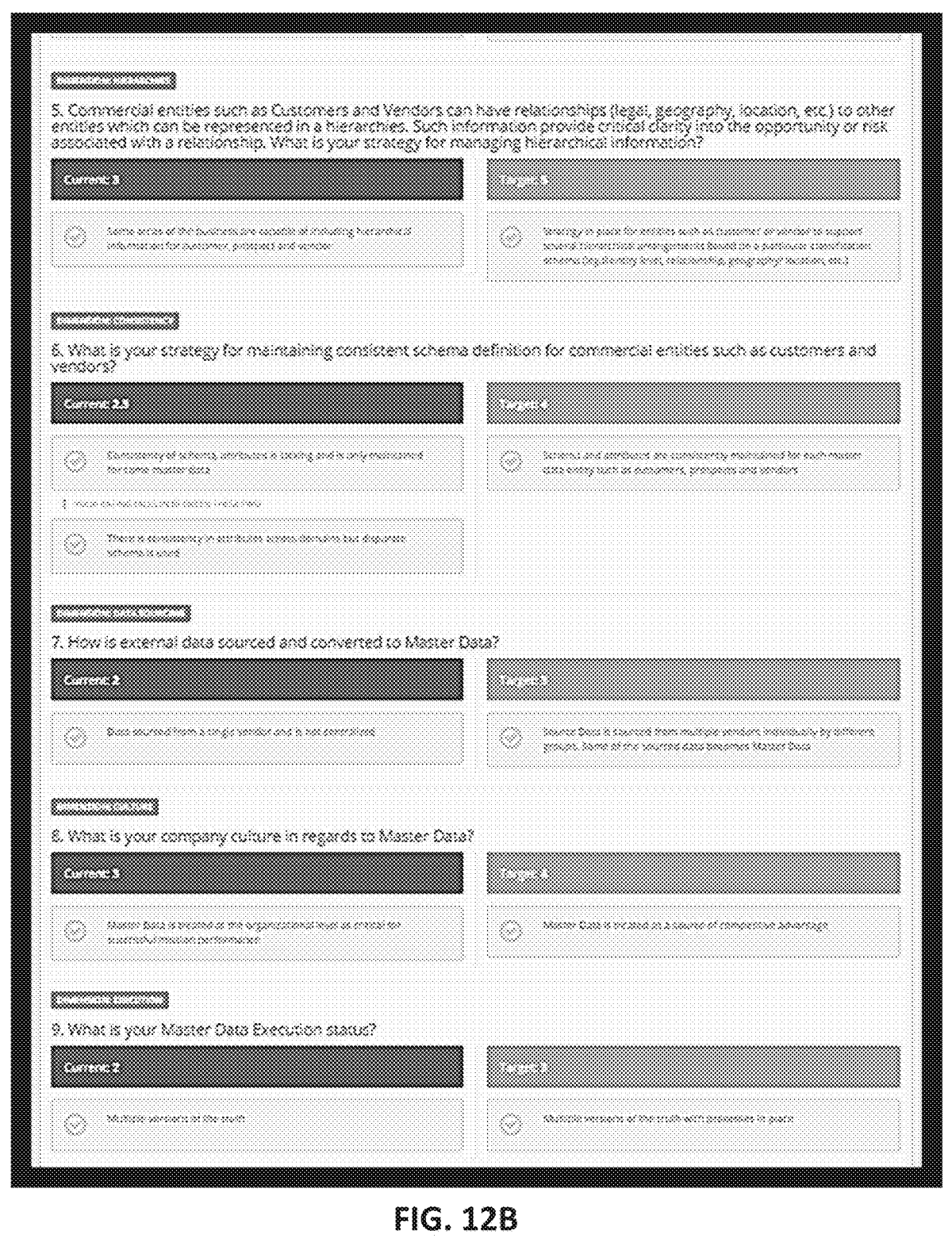
Figure 12C:
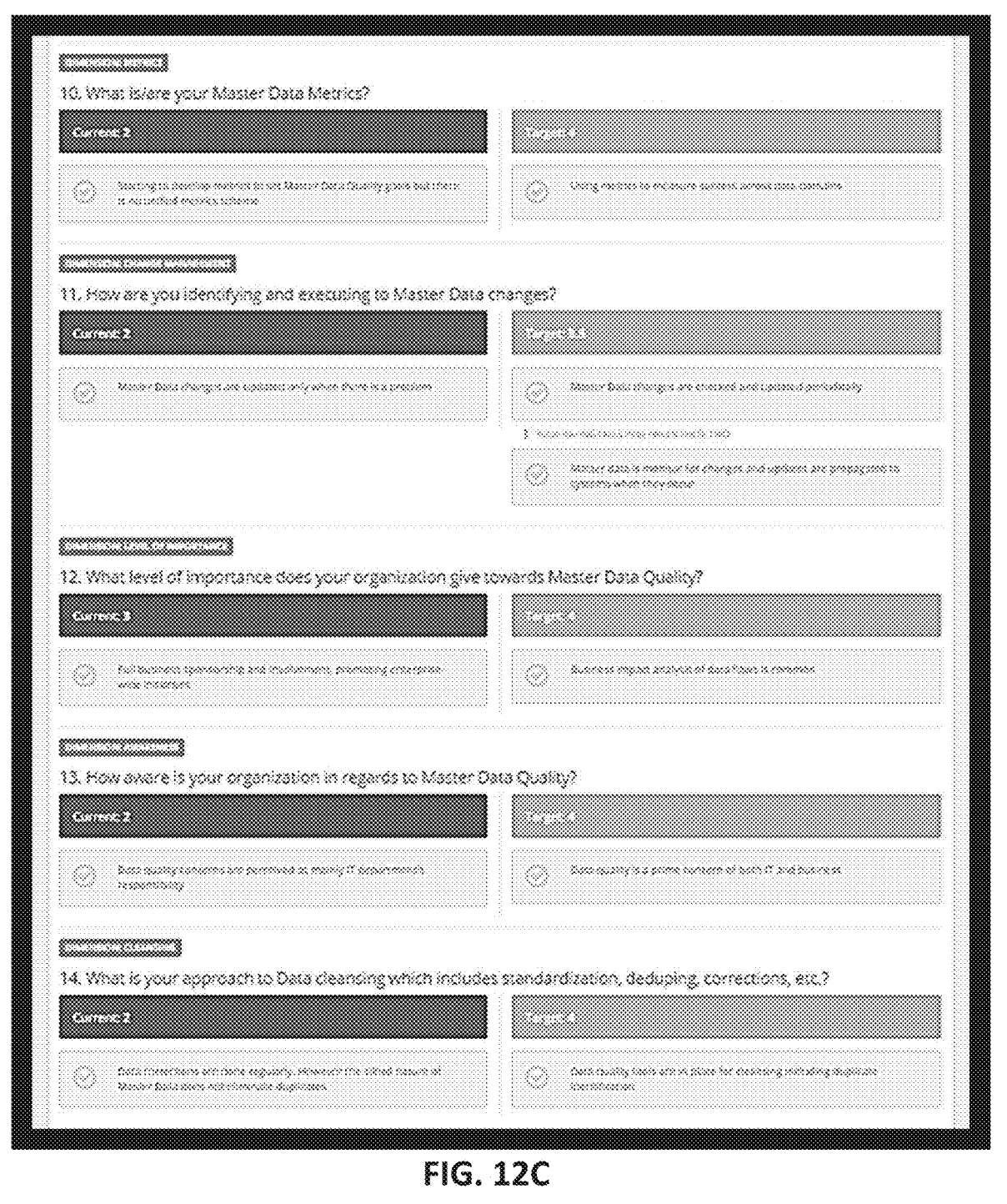
Figure 12D:
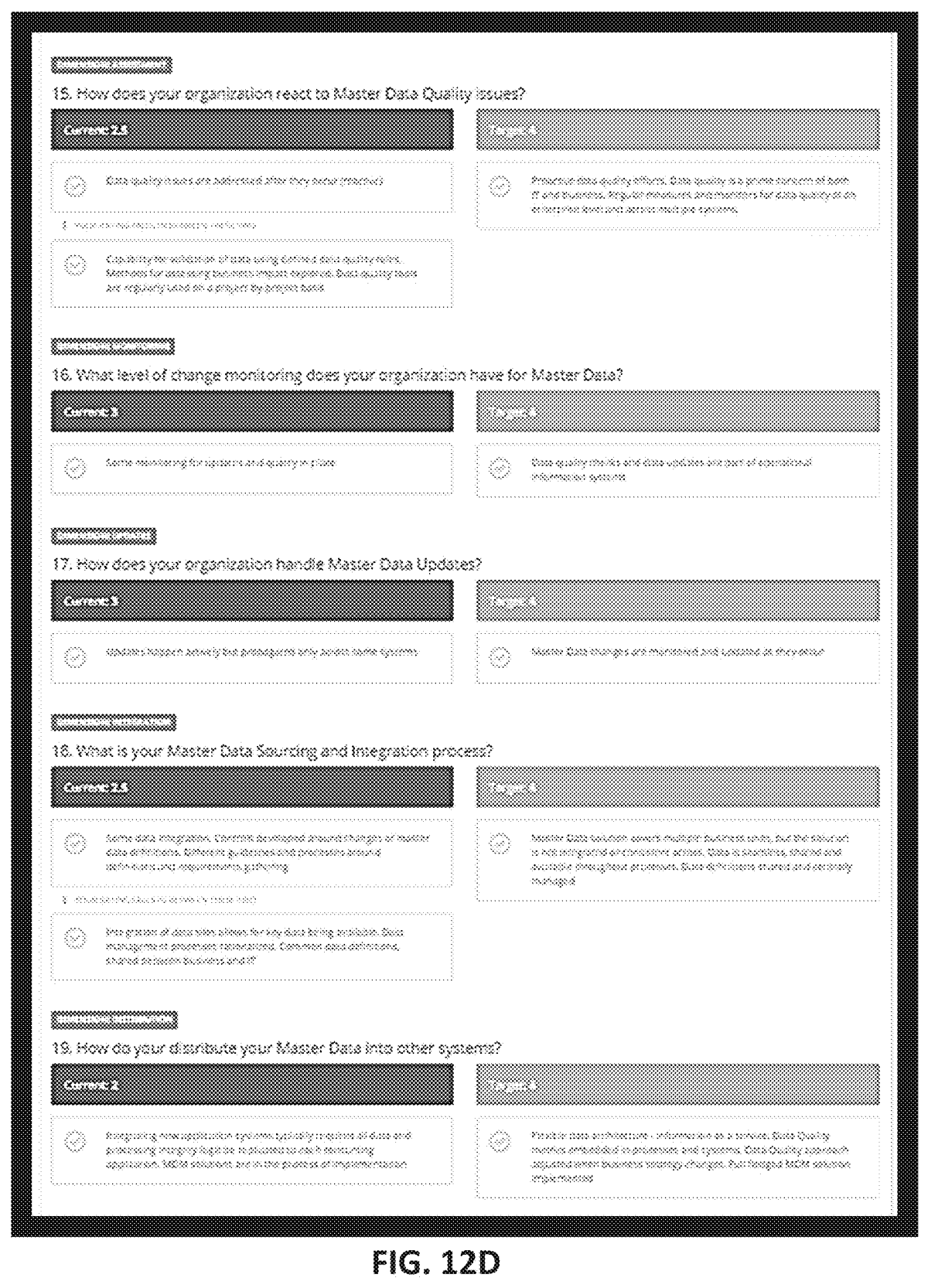
Figure 12E:
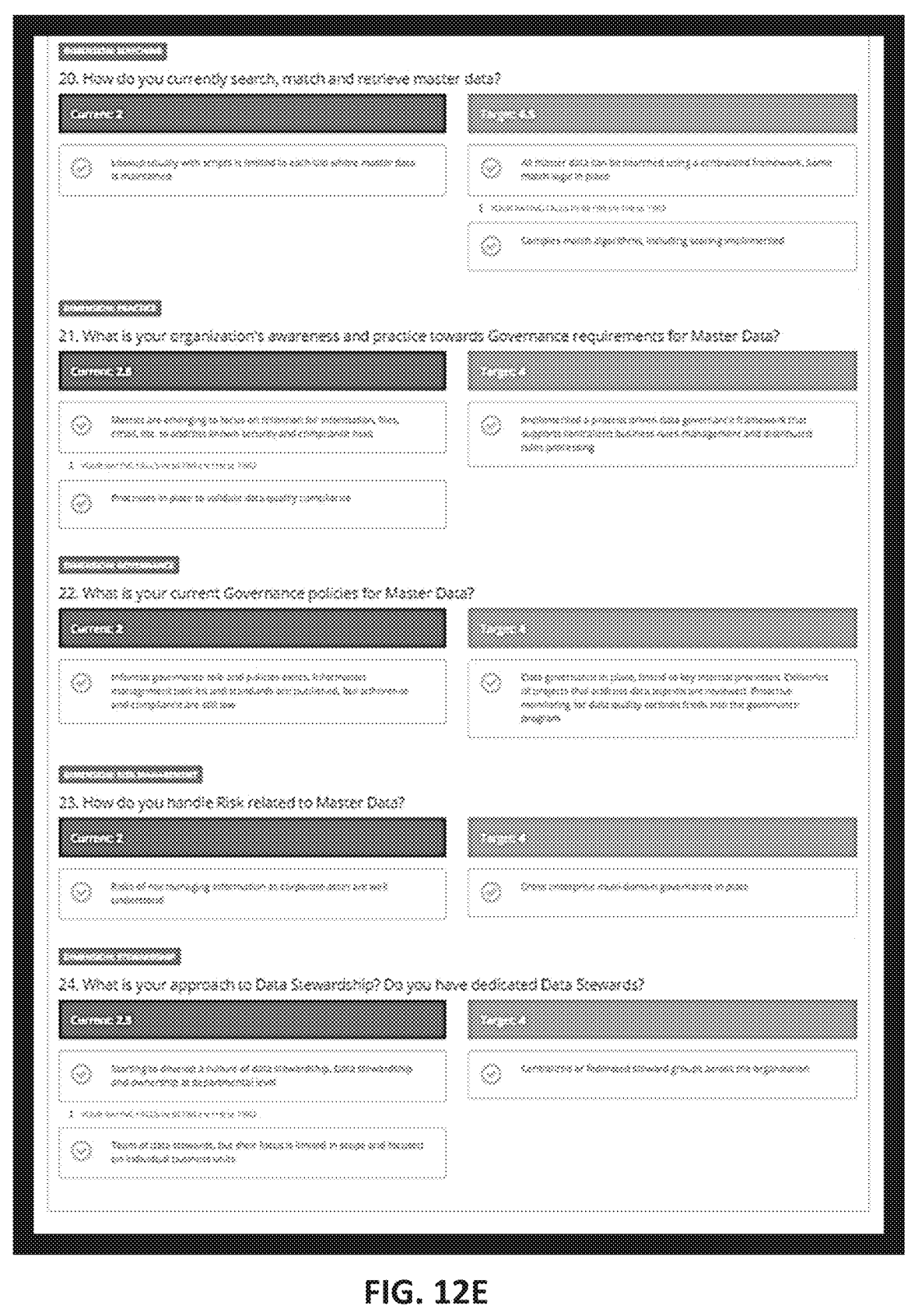

FIGS. 7-14B show user interfaces for generating and displaying master data maturity matrices in accordance with at least one of the various embodiments.

DETAILED DESCRIPTION OF THE EMBODIMENTS

Figure 1:
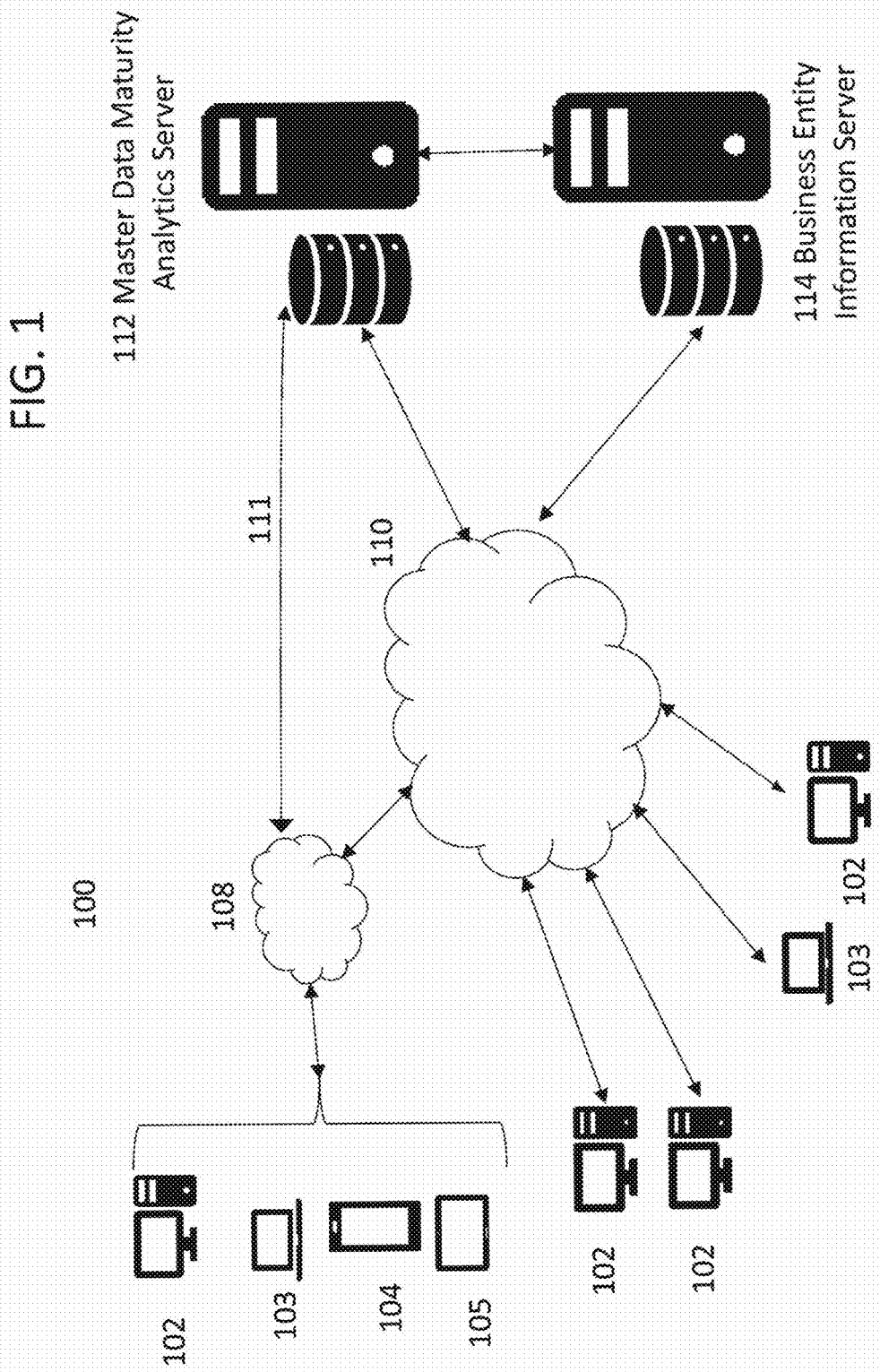
FIG. 1 is a system diagram of an environment in which at least one of the various embodiments can be implemented.

Various embodiments now will be described more fully hereinafter with reference to the accompanying drawings, which form a part hereof, and which show, by way of illustration, specific embodiments by which the innovations described herein can be practiced. The embodiments can, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments can be methods, systems, media, or devices. Accordingly, the various embodiments can take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application. The phrase "in one embodiment" or "in an embodiment" as used herein does not necessarily refer to the same embodiment, though it can. Furthermore, the phrase "in another embodiment" as used herein does not necessarily refer to a different embodiment, although it can. Thus, as described below, various embodiments can be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "widget controller" refers to a computer program that can be operative on a client application. Widget controllers can be downloaded and/or otherwise deployed to a client application. Widget controllers can be arranged to be operative for downloading content, monitoring master data user actions and input, or otherwise managing widgets located within client applications.

As used herein, the term "widget" refers to a user-interface element located in the client application. Widgets can be invisible or visible to users of the client applications. In some cases, a widget controller can generate widget "on-the-fly" before deploying content into the widget. Widgets can be adapted to reflect the operating environment of the client application that they are being hosted within. For example, in clients that support HTML, CSS a widget can be an HTML element such as a DIV, P, or the like. For client application operative in a Java environment, a widget can be a View object or Window object, and so on.

Illustrative Operating Environment

FIG. 1 shows components of one embodiment of an environment in which embodiments of the innovations described herein can be practiced. Not all of the components can be required to practice the innovations, and variations in the arrangement and type of the components can be made without departing from the spirit or scope of the innovations. As shown, system 100 of FIG. 1 includes local area networks (LANs)/wide area networks (WANs)—(network) 110, wireless network 108, client computers 102-105, Master Data Maturity Analytics Server Computer 112, and Business Entity Information Server Computer 114.

At least one embodiment of client computers 102-105 is described in more detail below in conjunction with FIG. 5. In one embodiment, at least some of client computers 102-105 can operate over a wired and/or wireless network, such as networks 110 and/or 108. Generally, client computers 102-105 can include virtually any computer capable of communicating over a network to send and receive information, perform various online activities, offline actions, or the like. In one embodiment, one or more of client computers 102-105 can be configured to operate within a business or other entity to perform a variety of services for the business or other entity. For example, client computers 102-105 can be configured to operate as a web server, an enterprise server serving enterprise client computers, a server host for a workstation, or the like. However, client computers 102-105 are not constrained to these services and can also be employed, for example, as an end-user computing node, in other embodiments. It should be recognized that more or less client computers can be included within a system such as described herein, and embodiments are therefore not constrained by the number or type of client computers employed.

Computers that can operate as client computer 102 can include computers that typically connect using a wired or wireless communications medium such as personal computers, multiprocessor systems, microprocessor-based or programmable electronic devices, network PCs, or the like. In some embodiments, client computers 102-105 can include virtually any portable personal computer capable of connecting to another computing device and receiving information such as, laptop computer 103, smart mobile telephone 104, and tablet computers 105, and the like. However, portable computers are not so limited and can also include other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like. As such, client computers 102-105 typically range widely in terms of capabilities and features. Moreover, client computers 102-105 can access various computing applications, including a browser, or other web-based application.

A web-enabled client computer can include a browser application that is configured to receive and to send web pages, web-based messages, and the like. The browser application can be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. In one embodiment, a user of the client computer can employ the browser application to perform various activities over a network (online). However, another application can also be used to perform various online activities.

Client computers 102-105 can also include at least one other client application that is configured to receive and/or send content between another computer. The client application can include a capability to send and/or receive content, or the like. The client application can further provide information that identifies itself, including a type, capability, name, and the like. In one embodiment, client computers 102-105 can uniquely identify themselves through any of a variety of mechanisms, including an Internet Protocol (IP) address, a phone number, Mobile Identification Number (MIN), an electronic serial number (ESN), or other device identifier. Such information can be provided in a network packet, or the like, sent between other client computers, Master Data Maturity Analytics Server Computer 112, Business Entity Information Server Computer 114, or other computers.

Client computers 102-105 can further be configured to include a client application that enables an end-user to log into an end-user account that can be managed by another computer, such as Master Data Maturity Analytics Server Computer 112, Business Entity Information Server Computer 114, or the like. Such end-user account, in one non-limiting example, can be configured to enable the end-user to manage one or more online activities, including in one non-limiting example, search activities, social networking activities, browse various websites, communicate with other users, or the like. However, participation in such online activities can also be performed without logging into the end-user account.

Wireless network 108 is configured to couple client computers 102-105 and its components with network 110. Wireless network 108 can include any of a variety of wireless sub-networks that can further overlay stand-alone ad-hoc networks, and the like, to provide an infrastructure-oriented connection for client computers 103-105. Such sub-networks can include mesh networks, Wireless LAN (WLAN) networks, cellular networks, and the like. In one embodiment, the system can include more than one wireless network.

Wireless network 108 can further include an autonomous system of terminals, gateways, routers, and the like connected by wireless radio links, and the like. These connectors can be configured to move freely and randomly and organize themselves arbitrarily, such that the topology of wireless network 108 can change rapidly.

Wireless network 108 can further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks can enable wide area coverage for mobile devices, such as client computers 103-105 with various degrees of mobility. In one non-limiting example, wireless network 108 can enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 can include virtually any wireless communication mechanism by which information can travel between client computers 103-105 and another computer, network, and the like.

Network 110 is configured to couple network computers with other computers and/or computing devices, including, Master Data Maturity Analytics Server Computer 112, Business Entity Information Server Computer 114, client computer 102, and client computers 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks can utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art.

Moreover, communication links can further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 can be configured to transport information of an Internet Protocol (IP). In essence, network 110 includes any communication method by which information can travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of Master Data Maturity Analytics Server Computer 112 is described in more detail below in conjunction with FIG. 6A. Briefly, however, Master Data Maturity Analytics Server Computer 112 includes virtually any network computer capable of master data maturity analysis and generating interfaces and interface objects as described herein. Computers that can be arranged to operate as Master Data Maturity Analytics Server Computer 112 include various network computers, including, but not limited to personal computers, desktop computers, multiprocessor systems, microprocessor-based or programmable consumer electronics, network PCs, server computers, network appliances, and the like.

Although FIG. 1 illustrates Master Data Maturity Analytics Server Computer 112 as a single computer, the embodiments are not so limited. For example, one or more functions of the Master Data Maturity Analytics Server Computer 112 can be distributed across one or more distinct network computers. Moreover, Master Data Maturity Analytics Server Computer 112 is not limited to a particular configuration. Thus, in one embodiment, Master Data Maturity Analytics Server Computer 112 can contain a plurality of network computers. In another embodiment, Master Data Maturity Analytics Server Computer 112 can contain a plurality of network computers that operate using a master/slave approach, where one of the plurality of network computers of Master Data Maturity Analytics Server Computer 112 is operative to manage and/or otherwise coordinate operations of the other network computers. In other embodiments, the Master Data Maturity Analytics Server Computer 112 can operate as a plurality of network computers arranged in a cluster architecture, a peer-to-peer architecture, and/or even within a cloud architecture. Thus, embodiments are not to be construed as being limited to a single environment, and other configurations, and architectures are also envisaged.

Figure 6A:
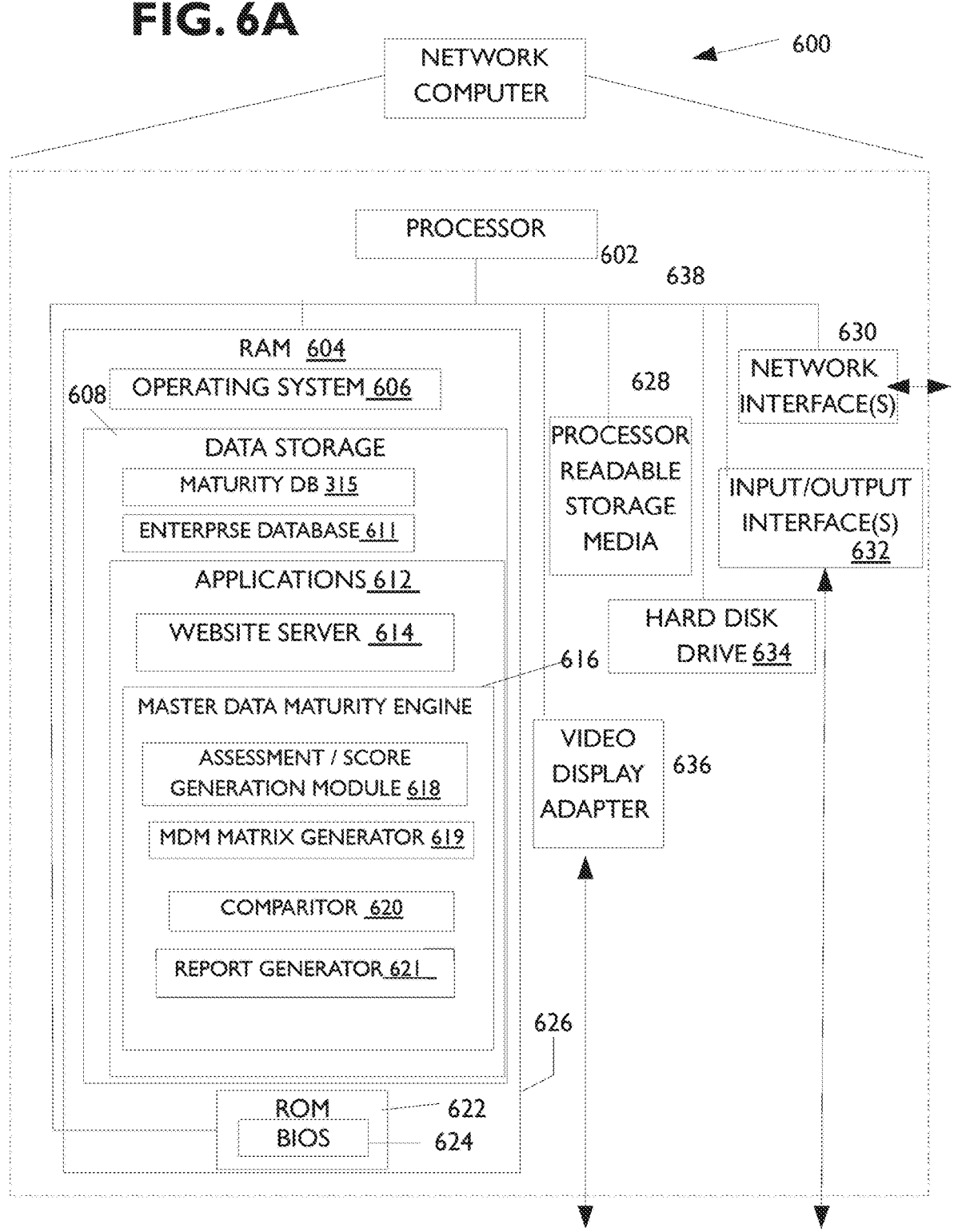
FIGS. 6A-6B shows an embodiment of a network computer that can be included in a system such as that shown in FIG. 1 and a logical flow therefor.

In at least one of the various embodiments, Business Entity Analytics Server Computer 114 can be one or more computers arranged to provide business entity analytics, such as, a network computer like that described in conjunction with FIG. 6A, or the like. As described herein, Business Entity Analytics Server 114 can include a database of robust company/business entity data 304 and employee data to enrich company master data maturity databases as described herein. Examples of Business Entity Analytics Servers 104 are described in U.S. Pat. No. 7,822,757, filed on Feb. 18, 2003 entitled System and Method for Providing Enhanced Information, and U.S. Pat. No. 8,346,790, filed on Sep. 28, 2010 and entitled Data Integration Method and System, the entirety of each of which is incorporated by reference herein. In at least one of the various embodiments, Business Entity Analytics Servers 104 can include one or more computers, such as, network computer 600 of FIG. 6, or the like. Briefly, however, Business Entity Information Server Computer 114 includes virtually any network computer capable of Business Entity Information delivery. Computers that can be arranged to operate as Business Entity Information Server Computer 114 include various network computers, including, but not limited to personal computers, desktop computers, multiprocessor systems, microprocessor-based or programmable consumer electronics, network PCs, server computers, network appliances, and the like.

Although illustrated separately, Master Data Maturity Analytics Server Computer 112 and Business Entity Information Server Computer 114 can be employed as a single network computer, separate network computers, a cluster of network computers, or the like. In some embodiments, either Master Data Maturity Analytics Server Computer 112 or Business Entity Information Server Computer 114, or both, can be enabled to serve interfaces and content, respond to user interactions, track user interaction with the master data maturity system, update widgets and widgets controllers, or the like.

In at least one of the various embodiments, Master Data Maturity Analytics Server 112 can be arranged to be in communication with Business Entity Information Server 114, Hosting Servers (not shown), or the like.

In at least one of the various embodiments, Master Data Maturity Analytics Server 112 can be one or more computers arranged to analyze Master Data maturity. In at least one of the various embodiments, Master Data Maturity Analytics Servers 114 can include one or more computers. In at least one of the various embodiments, Master Data Maturity Analytics Server 112 and/or Business Entity Information Server 114 can be hosted by hosting servers (not shown) including one or more computers, such as, network computer 300, or the like, that host one or more types of content that are provided for master data users and enterprises. For example, hosting servers can include one or more web servers providing web sites, images hosting sites, CRM servers, or the like. In at least one of the various embodiments, hosting servers can be arranged to integrate with Master Data Maturity Analytics Servers 114.

In at least one of the various embodiments, Master Data Maturity Analytics Servers 114 can be arranged to integrate and/or communicate with client devices or Business Entity Information Server 114 using API's or other communication interfaces. For example, one content provider service can offer a HTTP/REST based interface to Business Entity Information Servers 114, client devices, or Enterprise servers.

In at least one of the various embodiments, master data Maturity Analytics tools served from and/or hosted on Master Data Maturity Analytics Servers 114, hosting servers, and Business Entity Information Servers 114 can be provided over network to one or more client computers, such as, Client Computer 102, Client Computer 103, Client Computer 104, Client Computer 105, or the like.

In at least one of the various embodiments, communication between Business Entity Information Server 114 and Master Data Maturity Analytics Servers 112, and hosting servers and can include one more events that can correspond master data maturity analytics. Further, Master Data Maturity Analytics Servers 114 can be arranged to communicate directly or indirectly over network to the client computers using one or more direct network paths, such as network path 111. This communication can include information associated with one or more events occurring on the client computers.

One of ordinary skill in the art will appreciate that the architecture of system 100 is a non-limiting example that is illustrative of at least a portion of at least one of the various embodiments. As such, more or less components can be employed and/or arranged differently without departing from the scope of the innovations described herein. However, system 100 is sufficient for disclosing at least the innovations claimed herein.

Figure 2:
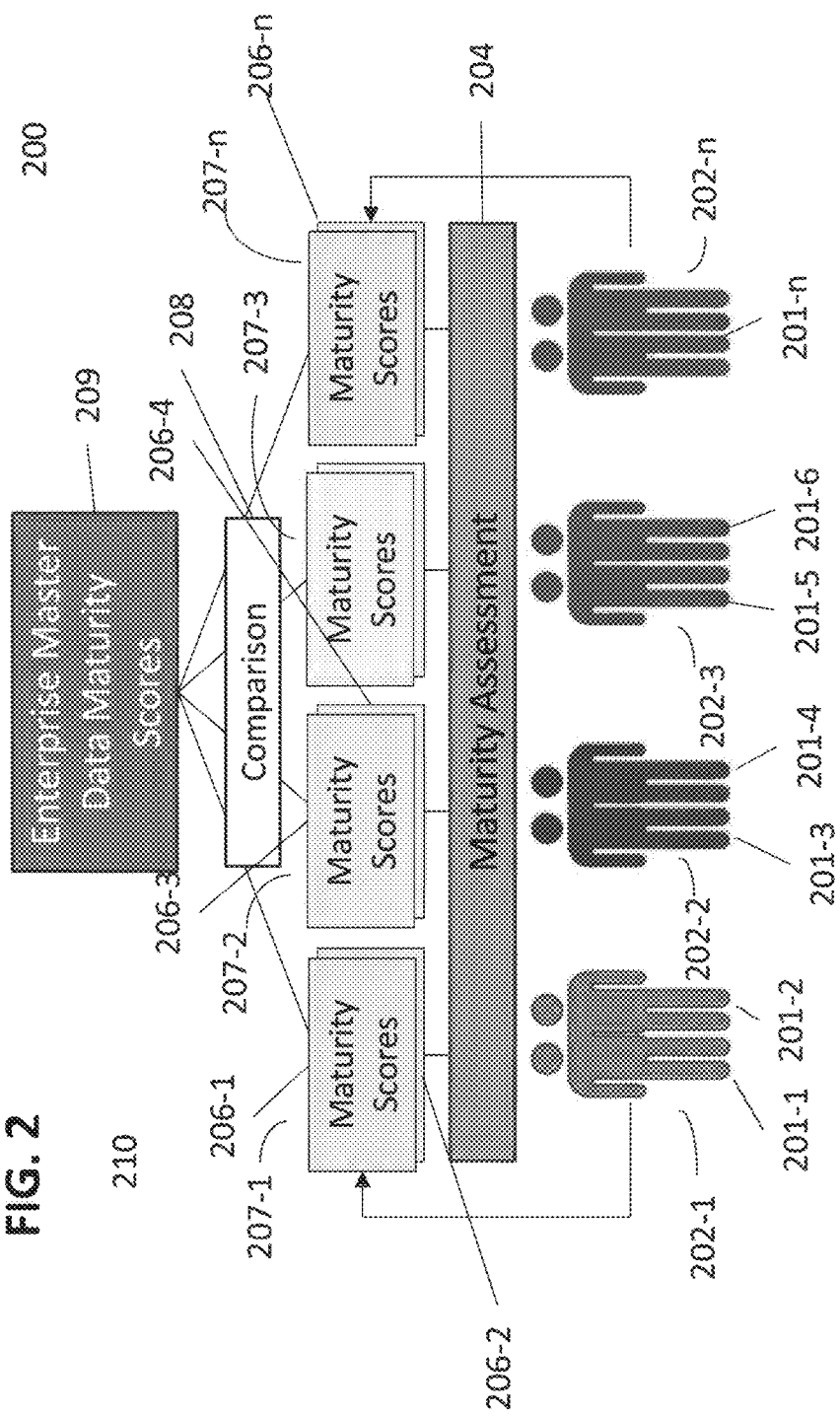
FIGS. 2-4 illustrate a logical architecture of a system and flowchart for a process for master data maturity analysis in accordance with at least one of the various embodiments.

FIG. 2 represents a flow for system 200 for master data maturity analytics in accordance with at least one of the various embodiments. In at least one of the various embodiments, the system receives input from a plurality of unique master data users 201-1 . . . 201-n. In at least one of the various embodiments, the unique master data users 201-1 . . . 201-n are associated with an enterprise, and information about that enterprise can that can be managed by the Master Data Maturity Analytics Servers 112, Business Entity Information Servers 114, network computer 300, or the like.

In at least one of the various embodiments, input that can be received from master data users 201-1 . . . 201-n can be processed in a master data maturity engine 204. The master data maturity engine 204 is configured to measure master data maturity for a plurality of hierarchical entities 202, 204, 210 for an enterprise based on master data maturity unit values such as scores 206-1 . . . 201-n generated for the plurality of unique master data users 201 . . . 201n. Examples of hierarchical entities for whom master data maturity is analyzed and scored includes the master data users 201-1 . . . 201-n, a line of business 202-1 . . . 202-n, and the enterprise 210. As described herein, the system is configured to use master data user's maturity scores 206-1 . . . 206-n to generate scores and matrices for lines of business 202-1 . . . 201-n the users belong to as well as enterprise scores and an enterprise master data maturity matrix 209 for the entire enterprise 210.

As will be appreciated, one exemplary advantage of the technology described herein is it more accurately obtains the real master data maturity of an enterprise by "sampling" from multiple 'points' within the company—the unique master data users—as opposed to a single person, manager, or outside evaluator taking the assessment. One or a few persons taking the assessment and entering into a platform can give skewed results and may not represent an accurate maturity level for the whole company or even division or line of business. Embodiments of the technology as described herein allow assessments to be directly input under controlled conditions by master data users representing divisions or groups, practitioners, decision makers, end users, indeed, up to and including all master data users and stakeholders in the enterprise. All the unique master data user maturity matrix scores are used to calculate and generate company-wide maturity trend scores while allowing for identifying and comparing divisional/group hierarchical level maturity assessments.

Figure 14A:
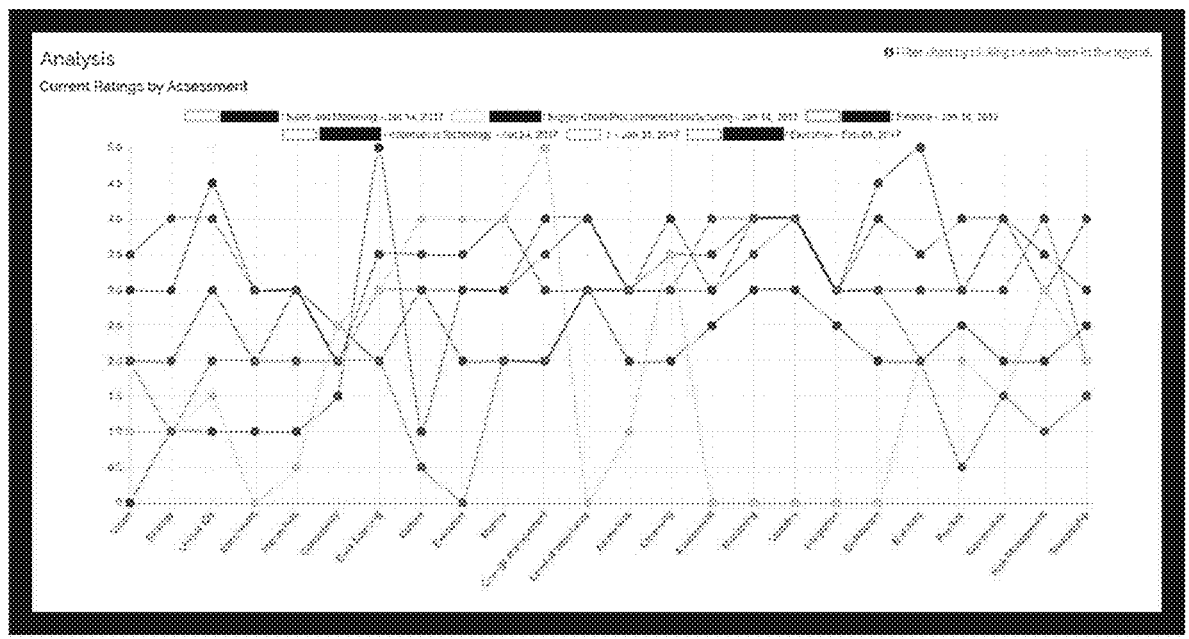
Figure 14B:
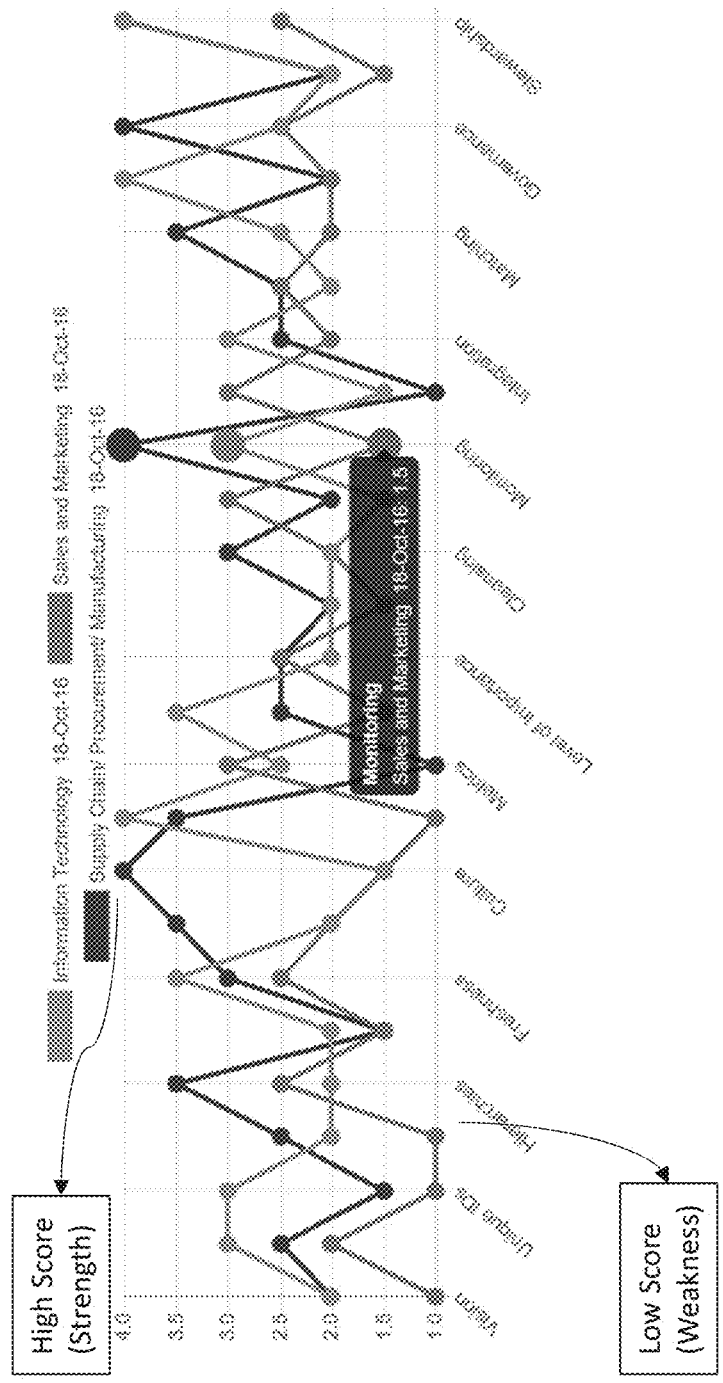

In at least one of the various embodiments, the master data maturity engine 204 includes a comparator 208 that is configured to compare maturity matrix scores for different hierarchical entities across the enterprise. For example, in at least one of the various embodiments, the system can compare line of business master data maturity matrix scores 207-1 . . . 207-n as shown in FIGS. 14A-14B herein.

Generalized Operation

The operation of certain embodiments will now be described with respect to FIG. 3A to FIG. 4. In at least one of various embodiments, processes 300 and 400 conjunction with FIG. 3A to FIG. 4 can be implemented by and/or executed on a single network computer, such as network computer 600 of FIG. 6A. Likewise, in at least one of the various embodiments, processes 300 and 400, or portions thereof, can be operative on one or more client computers, such as client computer 500 of FIG. 5. However, embodiments are not so limited, and various combinations of network computers, client computers, virtual machines, or the like can be utilized. Further, in at least one of the various embodiments, the processes described in conjunction with FIG. 3A-FIG. 4 and interfaces of FIGS. 7-14 can be operative in system with logical architectures such as those described in conjunction with FIGS. 1-2 and FIG. 6B.

In at least one of the various embodiments, master data maturity matrix information can be stored in one or more data stores, for later processing and/or analysis. Likewise, in at least one of the various embodiments, information can be processed as it is determined or received. Also, master data maturity matrix information can be stored in data stores, such as databases, for use as historical information and/or comparison information.

Figure 3A:
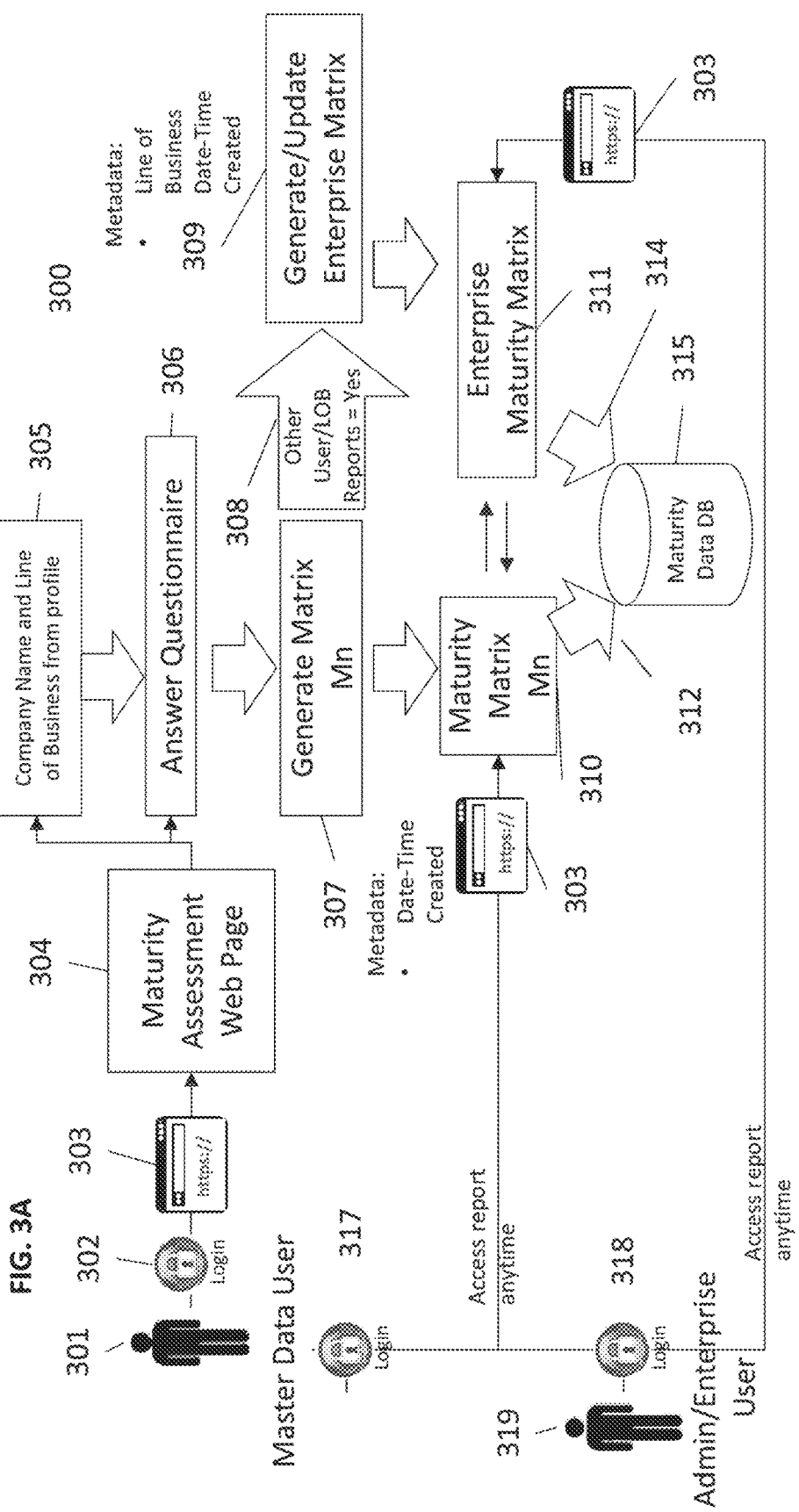

FIG. 3A illustrates an overview flowchart for process 300 for master data maturity analysis in accordance with at least one of the various embodiments. At block 302, in at least one of the various embodiments, a master data user 301 logs into a master data maturity interface, for example a secure web interface 303 with a web server configured to present the master data maturity interface.

At block 304, in at least one of the various embodiments, the master data user is presented with a master data maturity interface configured to generate a master data maturity matrix.

In an embodiment, the system maps or links hierarchical entity data to the master data user. For example, at block 305, if the user or the enterprise has generated a unique master data profile, for example as shown in FIG. 3B or FIG. 3C, FIGS. 7-14, the system saves or maps the hierarchical entity data with the unique master data user, such as the enterprise's company name and line of business for that master data user. Then the system can link or map the master data user's master data maturity matrix to that hierarchical entity data.

Figure 3B:
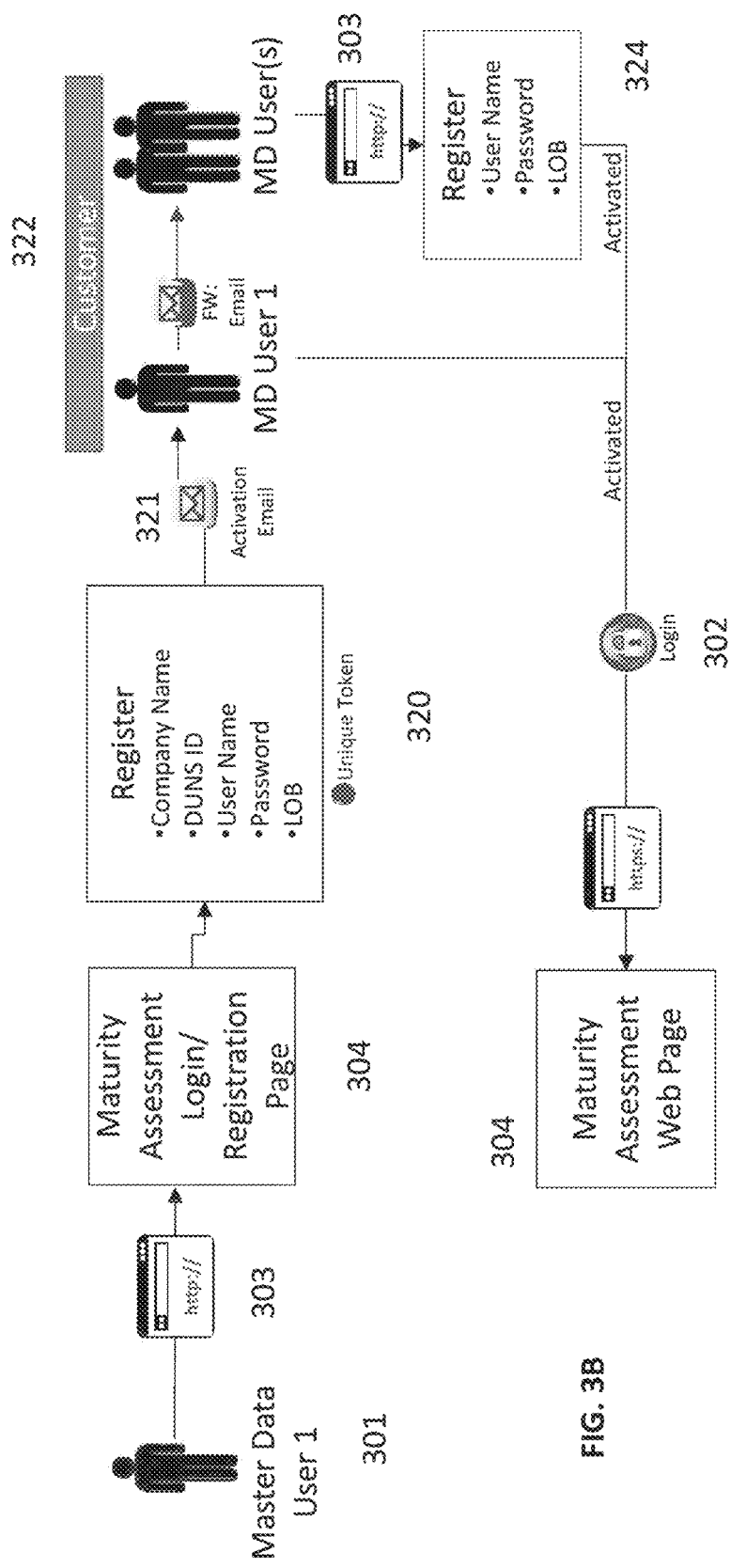

In at least one of the various embodiments, as shown in FIG. 3B, the system is configured to allow a master data user 301 to create a profile that links them to an enterprise. As shown in FIG. 3B, after the master data user 301 is presented with a master data maturity interface at block 304, at block 320 the system presents the master data user 310 with a registration page to generate a unique master data profile. The user can create, via the interface, a username and password, as well as enter a company name and select a line of business, thereby linking the master data user with these hierarchical entitles (e.g. the enterprise and line of business). For example, the system can generate a unique token that associates the enterprise account with the company name and information. In at least one of the various embodiments, the master data user can link the enterprise data with a company ID (e.g.: a DUNS ID) for a business entity information service that includes robust firmographics, for example, that links the company with information obtained from one or more Business Entity Analytics Servers 114. Examples of a business entity information services and Business Entity Analytics Servers 114 are described in U.S. Pat. No. 7,822,757, filed on Feb. 18, 2003 entitled System and Method for Providing Enhanced Information, and U.S. Pat. No. 8,346,790, filed on Sep. 28, 2010 and entitled Data Integration Method and System, the entirety of each of which is incorporated by reference herein. At block 321 the master data user 301 is then sent an activation e-mail to activate the profile and an enterprise account with the master data maturity system. As shown at block 322, the master data user or the system can invite any number of other master data users 201-n in the enterprise, for example via an email or other suitable electronic communication. Each of master data users can then log into a master data maturity interface, for example via the secure web interface 303, where the master data users can register to the company master data maturity account. As the users are already linked to the enterprise by virtue of the invitation from the master data user creating the company account, at block 324 the user registers to the enterprise account with a user name, password and line of business. The system can then link the hierarchical entity data with the unique master user(s) as shown in block 305 of FIG. 3A, namely the enterprise's company name and line of business for that master data user and continue to use the master data maturity interface as described herein.

Figure 3C:
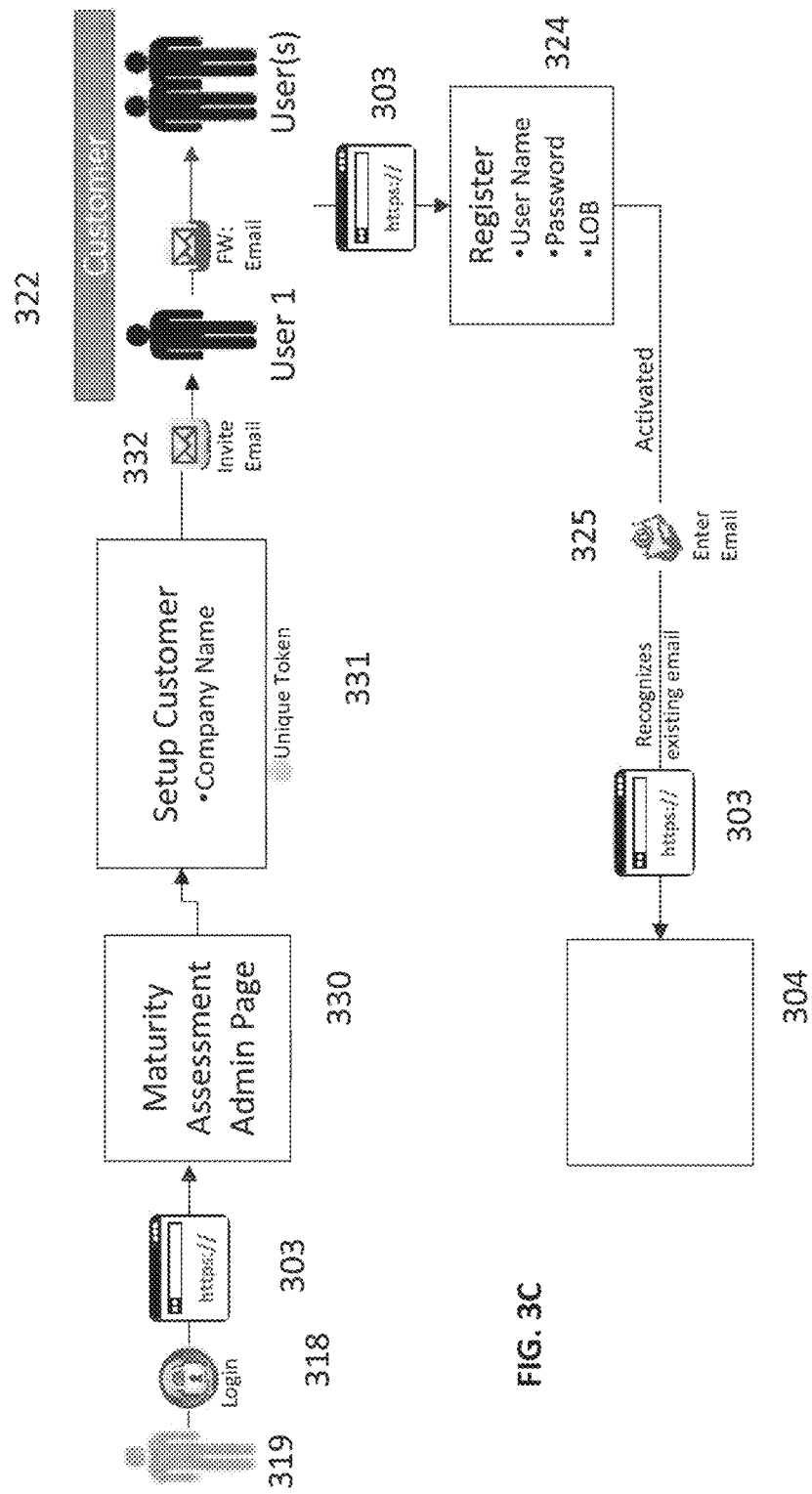

In an embodiment, the master data maturity system offered by a business entity information service that includes robust firmographics, for example, a service hosting Business Entity Analytics Servers 114. As shown in FIG. 3C, an administrative user 319 or enterprise user having an existing enterprise account with the business information entity service can create an associated enterprise account or enterprise profile for master data maturity analytics. At block 330 the administrative user 319 is presented with a master data maturity administrative interface. The operational flow proceeds to block 331, where the administrative user can create, via the interface, a company account, and the system can generate a unique token that associates the enterprise account with the company name and information from the business entity information service. The account can be thus created and associated with a company ID (e.g.: a DUNS ID) for a business entity information service that includes robust firmographics, for example, that links the company with information obtained from one or more Business Entity Analytics Servers 114. At block 332 the system or the administrative user can then send invitations, for example via an email or other suitable electronic communication, to one or more master data users associated with the enterprise, for example, those registered to or logged with the business entity information service. The master data user 301 can invite other master data users as described herein. The master data users then can log into a master data maturity interface, for example via the secure web interface 303, where the master data users can register to the company master data maturity account. As the master data user(s) are already linked to the enterprise by virtue of the invitation from the master data user creating the company account, at block 324 the user registers to the enterprise account with a user name, password and line of business. At block 325 the master data user can then send or enter an activation e-mail, which may already be known to the system, to activate the master data user profile to the enterprise account with the master data maturity system. The system can then link the hierarchical entity data with the unique master user(s) as shown in block 305 of FIG. 3A, namely the enterprise's company name and line of business for that master data user and continue to use the master data maturity interface as described herein.

Returning to FIG. 3A, in at least one of the various embodiments, the master user is presented, via the interface, an evaluation survey configured to generate a master data maturity matrix comprising a plurality of master data dimensions for each unique master data user. In an embodiment, the master data maturity matrix includes a plurality of master data goals, and each master data goal comprising one or more of the master data maturity dimensions.

In an embodiment, the master data evaluation survey comprises, for each master data dimension, an input for an ordinal measure of the dimension. For example, at block 306, the master data evaluation survey comprises a questionnaire that includes, for each master data dimension, a predetermined question and a plurality of predetermined ordinal answers for each question, and the user interface is configured to accept a selected answer as the ordinal measure input and generate a master data maturity score for the dimension. An exemplary survey questionnaire illustrating exemplary predetermined questions for 24 master data dimensions that measure 6 master data goals is shown at Tables 1A-1F. Each predetermined question has 6 predetermined answers which the master data user can select one answer. The answers are ordinal inputs which are used to generate master data scores for each master data dimension.

TABLE 1A-1

| Goal | Dimension | Question | Levels |
|---|---|---|---|
| Vision | Vision | What is your company vision for Master Data? | There is no vision for Master Data |
| | | | Some "grass-roots" initiatives are emerging from within the organization that describe how to use Master Data |
| | | | Some Master Data initiatives exists but are IT led and lack sufficient business involvement |
| | | | Master Data vision in place |
| | | | One unifying vision for Master Data across the organization |
| | | | One unifying vision for Master Data that clearly links Master Data to business results |

TABLE 1B-1

| Goal | Dimension | Question | Levels |
|---|---|---|---|
| Strategy | Strategy | What is your strategy for managing Master Data requirements? | No strategy in place |
| | | | Do not have a strategy and little or no organized actions to address Master Data |
| | | | Strategy is mostly reactive |
| | | | Strategy is proactive |
| | | | Strategy is consistent and integrated across the org |
| | | | Strategy has regular funding and is focused on ongoing improvement of Master Data |
| | Unique IDs | What is your strategy for assigning Unique IDs to Master Data assets such as Customer | Do not see a value in Unique IDs |
| | | | No Standardization of Unique IDs |
| | | | Unique IDs are maintained by individual systems or domains |
| | | | Central repository with unique ID and local mapping in place |
| | | | Central repository with unique ID and maintained by domain |
| | | | Adheres to a strict policy in regards to unique IDs for customers |
| | Enrichment | What is your strategy for enriching Master Data from external as well as internal data sources? | Limited use of existing data |
| | | | No strategy in place to enrich existing records with additional attributes |
| | | | Some systems and domains require additional attributes. Strategies in place for adding these on an as-needed basis |
| | | | Few enrichment attributes are automatically sourced and updated |
| | | | Enrichment is part of the overall master data plan. Sourcing of additional attributes is limited |
| | | | Enrichment plays a key role in the business results. Strategies and processes are in place for sourcing all additional attributes |

TABLE 1B-2

| Goal | Dimension | Question | Levels |
|---|---|---|---|
| Strategy | Hierarchies | Commercial entities such as Customers and Vendors can have relationships (legal, geography, location, etc.) to other entitles which can be represented in a hierarchies. Such information provide critical clarity into the opportunity or risk associated with a relationship. What is your strategy for managing hierarchical information? | Limited or no need for master data |
| | | | No hierarchies are factored in master data creation and distribution |
| | | | Hierarchies are added after the fact. |
| | | | Some areas of the business are capable of including hierarchical information for customer |
| | | | Strategy in place to support lookup of some hierarchical information for customer |
| | | | Strategy in place for entities such as customer or vendor to support several hierarchical arrangements based on a particular classification schema (legal entity level |

TABLE 1B-2-continued

| Goal | Dimension | Question | Levels |
|---|---|---|---|
| | Consistency | What is your strategy for maintaining consistent schema definition for commercial entities such as customers and vendors? | Consistency is not necessary for consumption<br>Data consistency is non-existent<br>Consistency of schema<br>There is consistency in attributes across domains but disparate schema is used<br>Schema and attributes are consistently maintained for each master data entity such as customers<br>Strategy is in place to manage and maintain consistent schema and attributes. The taxonomy of master data is also tied into governance processes |
| | Data Sourcing | How is external data sourced and converted to Master Data? | No external data is used. All data is created internally<br>Data Lists are purchased on a as needed basis<br>Data sourced from a single vendor and is not centralized<br>Source Data is sourced from multiple vendors individually by different groups. Some of the sourced data becomes Master Data<br>Strategy in place to monitor and update Master Data from all the sourced data as it comes in<br>Sourced data is immediately converted to Master Data or in some cases existing Master Data is augmented with sourced data |

TABLE 1C-1

| Goal | Dimension | Question | Levels |
|---|---|---|---|
| Culture & Execution | Culture | What is your company culture in regards to Master Data? | No one is responsible for Master Data<br>Master Data is created on an as needed basis with no or few rules/standards<br>Good understanding of Master Data as an asset<br>Master Data is treated at the organizational level as critical for successful mission performance<br>Master Data is treated as a source of competitive advantage<br>Master Data is seen as critical for survival in a dynamic and competitive market. Data is "talk of the town" |
| | Execution | What is your Master Data Execution status? | Version of the truth unnecessary<br>No version of the truth<br>Multiple versions of the truth<br>Multiple versions of the truth with processes in place<br>Single version of the truth<br>Single golden record of master data managed and maintained |
| | Metrics | What is/are your Master Data Metrics? | No metrics necessary<br>No Metrics for Master Data Quality goals<br>Starting to develop metrics to set Master Data Quality goals but there is no unified metrics scheme<br>Successful in using metrics at the domain level<br>Using metrics to measure success across data domains<br>Metrics as the basis for management and further investments in Master Data |

TABLE 1C-2

| Goal | Dimension | Question | Levels |
|---|---|---|---|
| Culture & Execution | Change management | How are you identifying and executing to Master Data changes?s | Customer and Vendor list do not need change<br>Master Data is updated only with new additions<br>Master Data changes are updated only when there is a problem<br>Master Data changes are checked and updated periodically<br>Master data is monitor for changes and updates are propagated to systems when they occur<br>Master Data changes are continuously monitored and impacted systems are updated immediately |
| | Level of Importance | What level of importance does your organization give towards Master Data Quality? | Not considered important<br>Organization understand the need for common standards<br>Organization takes steps towards cross-department sharing to achieve operational efficiency<br>Full business sponsorship and involvement<br>Business impact analysis of data flaws is common<br>Senior management sees information as a competitive advantage and exploits it to create value and increase efficiency |

TABLE 1D-1

| Goal | Dimension | Question | Levels |
|---|---|---|---|
| Master Data Quality | Awareness | How aware is your organization in regards to Master Data Quality? | No Awareness<br>Awareness is growing of poor data quality and of fragmented and inconsistent information in key subject areas<br>Data quality concerns are perceived as mainly IT department's responsibility<br>Data quality given considerable attention in the IT charter<br>Data quality is a prime concern of both IT and business<br>In-depth quality analysis for both objective and subjective quality attributes such as latency |
| | Cleansing | What is your approach to Data cleansing which includes standardization | Corrections happen sporadically<br>Data corrections occur periodically but duplicates remain<br>Data corrections are done regularly. However the siloed nature of Master Data does not eliminate duplicates<br>Dedupe and Data cleansing are considered important and is considered to be the responsibility of IT<br>Data quality tools are in place for cleansing including duplicate identification<br>Master Data Cleansing including duplicate identification and elimination are part of the ongoing efforts and important part of all business processes |
| | Assessment | How does your organization react to Master Data Quality issues? | No capability for identifying data quality expectations nor are they documented<br>Wait and see approach to data quality issues<br>Data quality issues are addressed after they occur (reactive)<br>Capability for validation of data using defined data quality rules. Methods for assessing business impact explored. Data quality tools are regularly used on a project-by-project basis<br>Proactive data quality efforts. Data quality is a prime concern of both IT and business. Regular measures and monitors for data quality at an enterprise level and across multiple systems.<br>Unstructured mission-critical information |

TABLE 1D-2

| Goal | Dimension | Question | Levels |
|---|---|---|---|
| Master Data Quality | Monitoring | What level of change monitoring does your organization have for Master Data? | Monitoring is unnecessary<br>No quality or updates to the data is checked<br>Master data is monitored for updates and quality after-the-fact<br>Some monitoring for updates and quality in place<br>Data quality checks and data updates are part of operational information systems<br>Data updates and Quality monitoring are included in regular business processes |
| | Updates | How does your organization handle Master Data Updates? | Data updates are done only when needed<br>Updates are not propagated across all systems<br>Updates to master data are made once an issue is discovered<br>Updates happen actively but propagated only across some systems<br>Master Data changes are monitored and updated as they occur<br>Monitoring and Updates are integral part of the operational ecosystem |

TABLE 1E

| Goal | Dimension | Question | Levels |
|---|---|---|---|
| Technology, Search & Distribution | Integration | What is your Master Data Sourcing and Integration process? | No Integration in place nor necessary<br>Data collection & sourcing takes up most of the time. Master data often siloed and most data is not integrated. Changes to Master data are uncontrolled with no common data definitions<br>Some data integration. Controls developed around changes of master data definitions. Different guidelines and processes around definitions and requirements gathering<br>Integration of data silos allows for key data being available. Data management processes rationalized. Common data definitions Master Data solution covers multiple business units<br>Internal and external data shared and readily available. Additional sources easily added. Master Data solution integrated with consistent capabilities that includes management of customer |

TABLE 1E-continued

| Goal | Dimension | Question | Levels |
|---|---|---|---|
| | Distribution | How do your distribute your Master Data into other systems? | Distribution is done manually or email<br>IT departments seek efficiencies through vertical silo consolidation (data warehouse) using data modelers and DB administrators<br>Integrating new application systems typically requires all data and processing integrity logic be replicated to each consuming application. MDM solutions are in the process of implementation<br>Master Data solution covers few data domain<br>Flexible data architecture - information as a service. Data Quality metrics embedded in processes and systems. Data Quality approach adjusted when business strategy changes. Full fledged MDM solution implemented<br>Comprehensive MDM solution is implemented. Distributed of Master Data across various systems and applications is through Master Data-as-a-Service (M-DaaS) |
| | Matching | How do you currently search? | No Search and retrieval necessary<br>Finding Master Data involves manual lookup of a database or files<br>Lookup usually with scripts is limited to each silo where master data is maintained<br>Search<br>All master data can be searched using a centralized framework.<br>Some match logic in place.<br>Complex match algorithms |

TABLE 1F

| Goal | Dimension | Question | Levels |
|---|---|---|---|
| Governance & Stewardship | Practice | What is your organization's awareness and practice towards Governance requirements for Master Data? | No awareness<br>Some awareness of the importance of Information Strategy and Data Governance<br>Metrics are emerging to focus on retention for information<br>Processes in place to validate data quality compliance.<br>Implemented a process driven data governance framework that supports centralized business rules management and distributed rules processing<br>Enterprise data governance enables high quality master data sharing across the enterprise |
| | Governance | What is your current Governance policies for Master Data? | No Governance necessary<br>No Data Governance organization<br>Informal governance role and policies exists. Information management policies and standards are published<br>Governance organization in place. Standard processes to address data aspects of projects. Leadership is aware of the importance of Data Governance and the impact on the performance of the organization<br>Data governance in place<br>Governance extended to business partners. Prevention is main focus. All demand and supply processes address data aspects. Adherence to policies is enforced. |
| | Risk Management | How do you handle Risk related to Master Data? | No risk management necessary<br>Effort to document risk associated with uncontrolled information assets has begun<br>Risks of not managing information as corporate asset are well understood<br>Full compliance with information management policies and standards<br>Cross enterprise multi-domain governance in place<br>Governance is well established across the enterprise |
| | Stewardship | What is your approach to Data Stewardship? Do you have dedicated Data Stewards? | No data stewardship necessary<br>Do not have data stewards that have responsibility for Master data quality. Data owned at departmental level<br>Starting to develop a culture of data stewardship. Data stewardship and ownership at departmental level<br>Team of data stewards<br>Centralized or federated steward groups across the organization<br>Well established |

Figure 17:
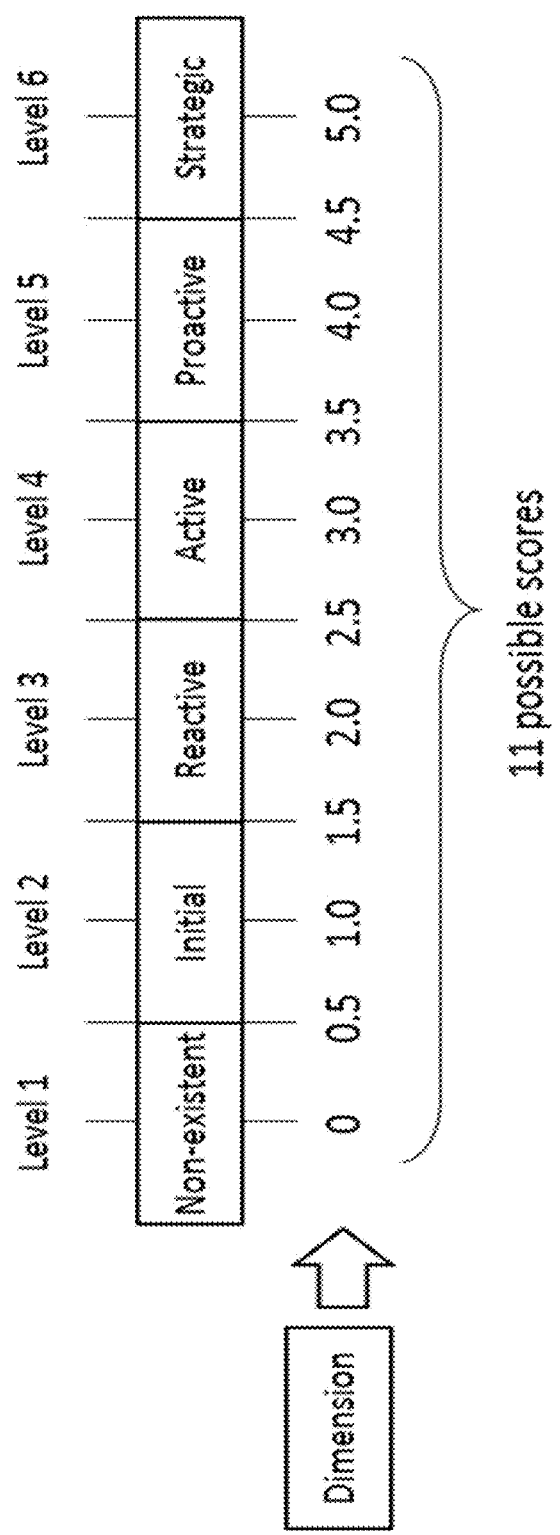
FIG. 17 shows interval scores for mapping ordinal answers.

At block 307, in at least one of the various embodiments, the system generates the master data maturity matrix 310 for that master data user. As shown in FIGS. 3A-4, the system generates master data maturity scores for each of the plurality of master data dimensions from the ordinal measure inputs, described herein as the selected answers to the predetermined questions. For example, in Tables 1A-1F above, each master data dimension has 6 predetermined ordinal answers. When a master data user inputs one of the six answers for each master data dimension question, the system generates a master data maturity dimension score based on the answer. As shown in FIG. 17, each answer for the ordinal level maps to an interval score. Master data users are asked to select from six answers corresponding to six levels for each dimension. The user will also have the option to select in-between levels, for example such as an interval between "Active" and "Proactive." The system generates a unit score of one point for each selection of levels, and a half-point is added to the previous level if the master data user selects "in-between" answers for the levels. For example, if the user selects "Active" for a dimension, they score 3 points, 4 points if they select "Proactive" and 3.5 points if they select the interval between "Active" and "Proactive." The scoring begins at 0 and ends at 5. For example, selecting "Non-existent" scores a 0 and "Strategic" scores a 5. If the user chooses to ignore a dimension, the default score is "0." Thus the system is thus configured to generate 11 possible interval scores based on selected answers by the master data user, as shown on the exemplary interval scale in FIG. 17.

The system is also configured to calculate an overall master data maturity score from the plurality of master data dimension maturity scores for the master data maturity matrix 310. For example, an overall master data maturity score can be calculated as a mean or other aggregated score. In an embodiment, the system is configured to generate a master data maturity trend score as the overall master data maturity score for the master data user. In at least one of the various embodiments, the master data maturity trend score is a statistical score. Exemplary models for statistical scoring of a maturity trend score include a linear model selected from the group of linear regression, linear least-squares; or an iteratively reweighted least squares (IRLS).

A trend line can be calculated as straight line approximation, for example by calculating a straight line on a scatter plot so that the number of points above the line and below the line is about equal (and the line passes through as many points as possible). In an embodiment, the system can be configured to use a least square method to calculate the overall master data maturity trend score. For example, the master data maturity engine is configured to apply a straight-line function with the data plotted vertically and values of time (t=1, 2, 3, . . . ) plotted horizontally, for example using a least-squares fit to minimize the sum of the squared errors in the data series.

Given a set of points in time $\{t\}$, and data values $\{y\{t\}\}$ observed for those points in time, values of $\{a\}$ and $\{b\}$ are chosen so that trend=$\Sigma_t([(at+b)-y_t]^2)$ is minimized, with at+b being the trend line. The sum of squared deviations from the trend line is minimized, and constant b is an optional logical value specifying whether to force the constant b to equal 0.

The master data user's overall master data maturity trend score can be employed to compare the overall trend for master data maturity from all dimensions and can be compared to each individual dimension, for example using a graphic as shown at FIGS. 11A-12E. An overall score value shows strengths and weaknesses in master data maturity, making it easy to identify master data maturity dimensions that can be addressed to improve the overall trend score. This helps users identify and implement master data tools and practices to ensuring that specific master data dimension matching is improved, thereby improving the overall master data strategy and master data technology and architecture of their enterprise. Thus an improvement in master data maturity scores correlates directly with an improvement in the enterprise master data and master data architecture itself, including improvements in specific master data dimension maturity scores to master data scores calculated therefrom, including goal scores, overall scores, and scores for hierarchical entities (e.g.: the master data user, lines of business, and the enterprise).

In at least one of the various embodiments, the system is configured to log or generate, for each maturity data matrix, one or more target master data maturity scores. For example, as shown in FIG. 4, as the master data user answers the questionnaire at block 306, at block 401 the system generates master data dimension maturity scores for each master data dimension. At block 405, the master data user can input, via the interface, target scores for his or her master data maturity. The master user can then implement master data tasks and training in each dimension to improve proficiency and compliance with master data usage and technology, thus improving the master data architecture and structures he or she interfaces with. At block 307 the system then generates the master data maturity matrix including the current master data dimension scores, the overall master data maturity score and/or the master data maturity target scores for each dimension. The system can also be configured to generate an overall master data target maturity score for the master data user, which can be a simple mean or a statistical score as described herein.

In at least one of the various embodiments, the maturity data dimension scores, including the assessment scores and/or the target scores, can be used to generate master data maturity goal scores from the master data maturity dimension scores for measuring the goal, for example as a trend score as described herein or an arithmetic mean or median of the master data dimension scores.

Accordingly, in at least one of the various embodiments, the system is configured generate, for each master data maturity matrix, a target score for each master data dimension; a master data goal score for one or more of the master data dimensions, and an overall master data maturity.

The system can then generate and display one or more maturity matrix graphics to the master data user, for example as shown in the user interfaces at FIGS. 7-14B At operation 312, the master data maturity matrix is stored in a massive master data user maturity database 315. As shown at operations 317 and 318, the master data user 301 for whom the master data user matrix 310 was generated or an enterprise user 320 given access to enterprise matrix 311 can access the master data user's maturity matrix 310 at any time.

At block 308 in at least one of the various embodiments, the system determines if a master data maturity matrix has been generated for another unique master data user for to the same enterprise. If so, at block 309, the system generates an enterprise master maturity matrix 311 from each unique master data users' master data maturity matrix 310 scores. In at least one of the various embodiments, the enterprise master data maturity matrix 311 is generated from the master data maturity scores of all the unique master data users for that enterprise. In an embodiment, the system could generate a higher order hierarchical entity matrix by calculating a mean for each dimension by summing the master data maturity scores for each dimension generated for each master data user and divide the score by the number of master data users who generated the score. In another embodiment, the system can calculate a statistical score for the higher order hierarchical entity matrix scores (e.g.: line of business, enterprise) using a linear model to aggregate master data maturity scores for each dimension to obtain the higher order hierarchical entity master data maturity scores. The statistical scoring model can be selected from the group of linear regression, linear least-squares; or an iteratively reweighted least squares (IRLS). The resulting aggregated master data maturity dimension scores for the higher order hierarchal entity can then be used to calculate a maturity trend score for that higher order hierarchical entity. Thus every hierarchical entity from the unique master data user to the entire enterprise can have its own master data maturity matrix including maturity dimension scores (e.g. current, target) and overall maturity scores.

In an embodiment, the enterprise master data maturity matrix 311 including, for example, one or more line of business master data maturity matrices, are calculated from the master data users' master data maturity scores. For example, the system is configured to log the line of business for each unique master data user for the enterprise master data maturity matrix 311, as well as the time when the enterprise master data maturity matrix 311 is created. In at least one of the various embodiments, each line of business master data maturity matrix is generated from the master data maturity scores of the one or more unique master data users associated with that line of business. Accordingly, in an embodiment, the system also generates one or more master data maturity matrices for lines of business associated with each master data user matrix 310 for the enterprise maturity matrix 311. At operation 314, the master data maturity matrix is stored in a massive master data user maturity database 315.

As described herein, any of the hierarchical entities master data maturity matrices can be compared with one another, for example via interfaces shown in FIGS. 7-14B.

As shown at operation 318, an enterprise user 319 or an administrative user 311 given access to enterprise level reports can access the enterprise maturity matrix 310 at any time, although a master data user 301 may not have such access. Accordingly, in an embodiment, a user's position in an enterprise hierarchy may determine what access they have to master data maturity matrix interfaces and reports. For example, a manager or master data steward for a given line of business may have access to the line of business matrix (not shown), other line of business matrices, and the unique master data user maturity matrices 310 for his or her line of business, but not the enterprise level maturity matrix 311 nor the unique master data user maturity matrices 310 for other lines of business. They can also be empowered to set master data maturity target scores independent of those calculated from master data users' target scores. In embodiments, the enterprise can define access levels for users as desired.

In at least one of the various embodiments, each time a master data user generates a new master data maturity matrix, all linked hierarchical entity master data maturity scores are updated as well. For example, if a new, unique master data user generates a master data maturity matrix, the line of business master data maturity matrix linked to that user is recalculated to include the master data user's maturity scores. The enterprise master data maturity matrix is also recalculated and updated. Similarly, if a master data user who has previously generated one or more master data maturity matrices generates a new master data maturity matrix, the line of business and enterprise master data maturity matrices linked to that user are recalculated to include the master data user's updated, current master data maturity scores, including any updated target scores. The system can also be configured to generate and track milestones such as when a target is met and the time elapsed based on the time of creation for the matrices that set and achieved the target.

In at least one of the various embodiments, the maturity matrices are continually stored in the master data maturity database 315 over time. For example, in an embodiment, each new and current master data maturity matrices for the all hierarchical users can be stored in the a master data maturity database 315 along with prior maturity matrices for the all hierarchical users to allow tracking of maturity scores over time for all users. In another embodiment, as each master data user's matrices and scores are tagged with the time of creation of each matrix, the system can save the master data users' maturity scores and generate the other hierarchical matrix scores (e.g.: line of business, enterprise) from the historical record of master data users' stored scores, the time generated, and the enterprise name and line of business linked or mapped to that users up to that time. Thus, the system can be configured to generate a historical "snapshot" of the master data maturity across all vertical and horizontal hierarchical users for an enterprise for any given time in the past up to the present, as well as dynamically track the master data maturity over time for all hierarchical entities (e.g.: master data users, lines of business, and the enterprise).

For example, in at least one of the various embodiments, the system is configured to allow each unique master data user to generate a plurality of master data maturity matrices over time. Thus the system can track master data maturity scores and score differences over time for each unique master data user as well at the other hierarchical entities (e.g.: lines of business, the enterprise). The system can be configured to track master data maturity matrices for each hierarchical user over time. As described herein, in at least one of the various embodiments, the system is configured to log, for each unique master data user, the line of business, the enterprise, and a time the master data maturity matrix is generated. For example, at block 305 the system links an enterprise name and a line of business for the master data user. Each time the master data user completes the master data maturity evaluation survey as shown at block 306, the system generates a new master data maturity matrix for the unique master data user and identifies and stores the date and time it is created, for example as metadata or other data. For each subsequent master user data maturity matrix for that unique master data user, the system updates the current maturity matrix maturity scores, and at block 310, stores the updated maturity matrix in the massive maturity matrix database 315. The system thus is configured to store a time-series of master data maturity matrices and scores, thus can track progress of the scores over each master dimension, compare progress against target scores, track and generated score differentials, and track the time taken for level and goal achievement for each unique master data user.

Thus the maturity data assessment can be taken multiple times so that each master data user (or administrative user) can track progress not only for themselves and their division but also overall company-wide progress. Also, adding multiple master data users and taking the assessment several times over a period of time at a regular cadence make it easy to pin-point the real maturity levels as well as track on going improvements over the course of the enterprise's master data journey.

In an embodiment, at block 309 the enterprise master data maturity matrix as well as the corresponding line of business master data maturity matrix is also continually updated each time a unique master data user generates or updates their master data maturity matrix. As described herein, hierarchical entity master data maturity matrices and scores therefor are calculated from master data user maturity scores. Thus, each time a master data user generates a new master data matrix, the system can be configured to dynamically recalculate and generate all hierarchical entity master data maturity scores across the entire system for up to any number of hierarchical entities, even into the thousands or millions.

In at least one of the various embodiments, the system can be configured to prompt or set milestones and regular assessments. For example, the system can be configured to allow a user, for example an administrative user or master data user, to set regular intervals for each master data user generate a new master data maturity matrix and update their master data maturity scores.

In an embodiment, the system can also be configured to allow users to delete master data maturity matrices as well. For example, the system can be configured to allow a master data user to delete their master data maturity matrix or scores, or to allow an administrative user to delete master data matrices for the enterprise. The master data maturity systems and system interfaces are thus configured to be highly dynamic for enterprises of even very large sizes, for example where thousands of employees or agents for the enterprise are generating and updating master data maturity matrices. Because the system is configured to assess and optimize master data maturity for any and up to all employees or agents for an enterprise, the system's master data maturity engine and interfaces produce highly accurate master data maturity assessment both horizontally and vertically in the enterprise and for all hierarchical entities and business components over time. Similarly because the system can interface with all master data users across the enterprise, the entire enterprise's master data and technical architecture is itself measurably improved as confirmation of improvement is objectively scored based on each master data users own self-assessment from predetermined questions selected from fixed ordinal level answers. Thus the technology provides highly accurate base data for master data maturity, as opposed to a comparatively subjective, non-dynamic single "snapshot" in time from small sample provided by "top down" evaluators.

Figure 16:
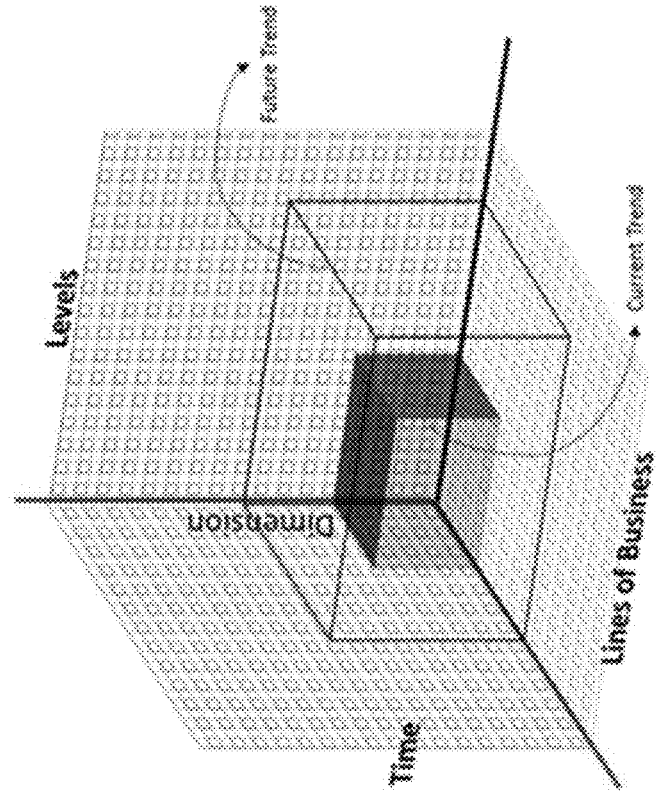
FIG. 16 shows a graph representing master data user maturity analysis for hierarchical master data users.
Figure 15:
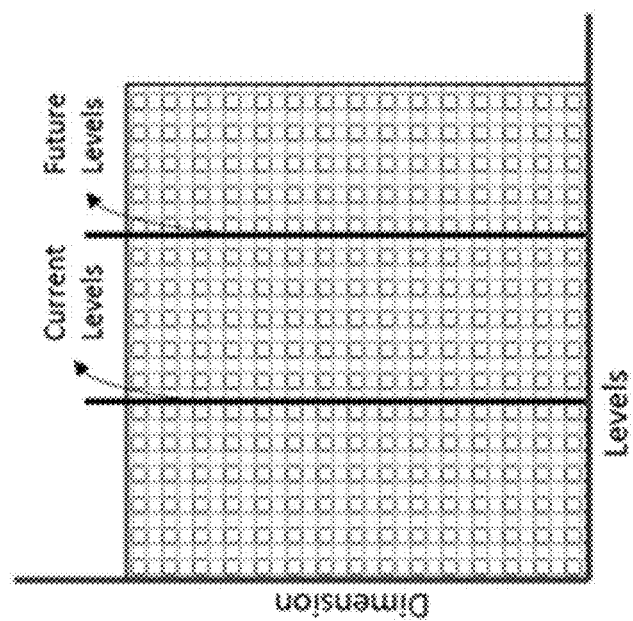
FIG. 15 shows a graph representing conventional master data maturity platform analysis.

For example, as shown in FIG. 15, conventional master data maturity platforms can offer "top down" measurements of master data dimensions (y axis) that are by evaluators (e.g. managers or outside evaluators) and not the master data users themselves. As there is no system interface or master data maturity engine or tracking master data maturity database, conventional systems provide a "snapshot" of, at best, current levels and a future level. Moreover, such measurements are much more subjective as they are not based on actual master data usage by master data users, and thus put one or more degrees of ignorance between the actual master data usage and the measurement thereof, making report less reliable and any information therefrom including subjective and imprecise. In contrast, as shown in FIG. 16 the current master data maturity interface can build accurate measurements of any hierarchical level of an enterprise from actual master data usage, for example master data maturity dimensions (y axis) master data maturity levels (x-axis), lines of business (z-axis), all of which are objectively measured and dynamically tracked in time. Also, the overall trend scoring measures and target scores measure not just current and future levels from a "snapshot," but instead show a current trend and a future trend over time across all hierarchical entities both vertically and horizontally across the enterprise and the enterprise as a whole.

In at least one of the various embodiments, the system is configured to allow a user to compare master data maturity scores for hierarchical entities for an enterprise with master data maturity scores for other enterprises using the system. For example, master data maturity analysis can be hosted with an entity that provides business entity information services or otherwise serves multiple enterprises. The master data maturity analysis system provides a standardized approach that allows comparisons for hierarchical entities across and between enterprises as well as within enterprises.

It will be understood that each block of the flowchart illustration, and combinations of blocks in the flowchart illustration, can be implemented by computer program instructions. These program instructions can be provided to a processor to produce a machine, such that the instructions, which execute on the processor, create means for implementing the actions specified in the flowchart block or blocks. The computer program instructions can be executed by a processor to cause a series of operational steps to be performed by the processor to produce a computer-implemented process such that the instructions, which execute on the processor to provide steps for implementing the actions specified in the flowchart block or blocks. The computer program instructions can also cause at least some of the operational steps shown in the blocks of the flowchart to be performed in parallel. Moreover, some of the steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments.

Illustrative Client Computer

Figure 5:
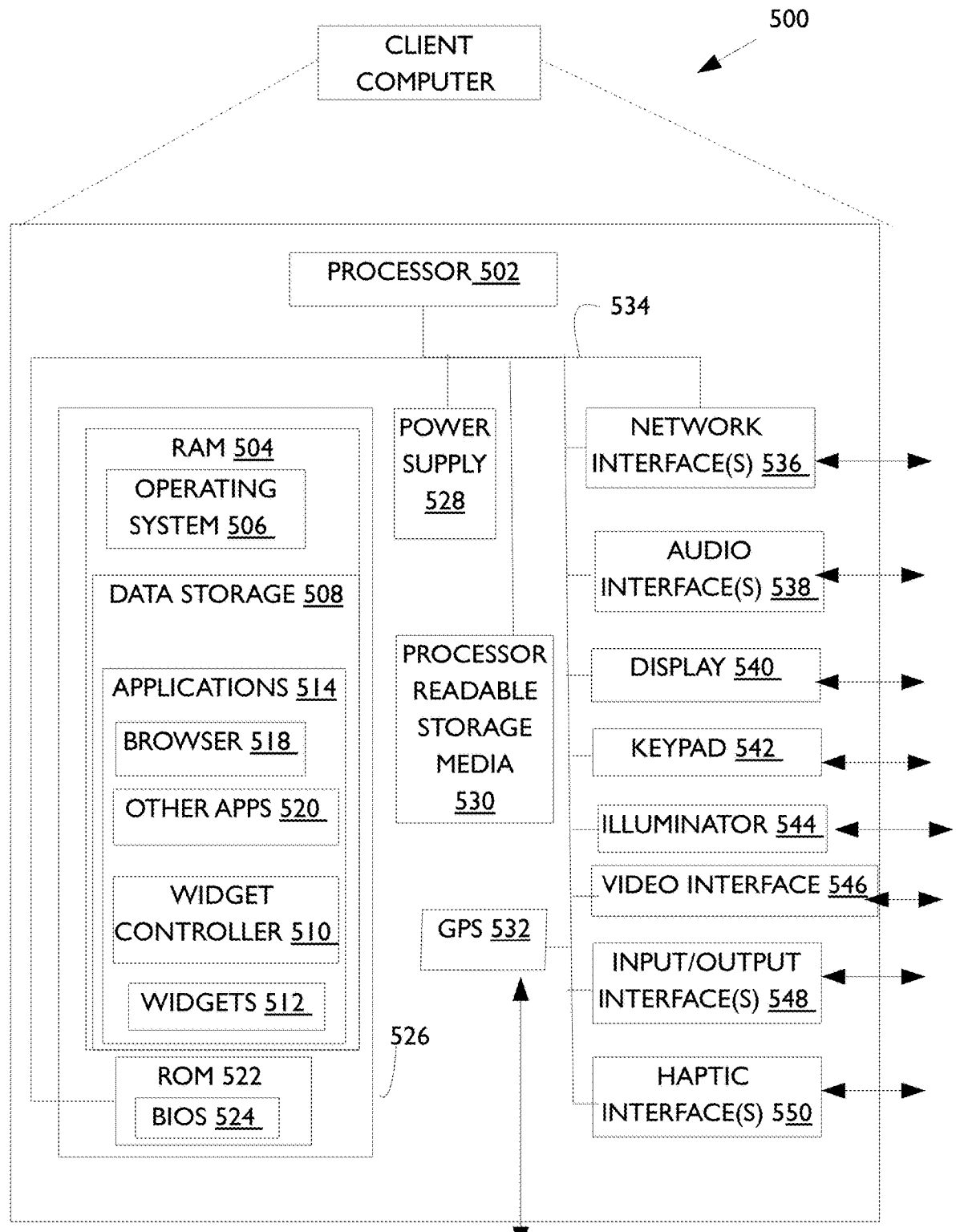
FIG. 5 shows an embodiment of a client computer that can be included in a system such as that shown in FIG. 1.

FIG. 5 shows one embodiment of Client Computer 500 that can be included in a system implementing embodiments. Client Computer 500 can include many more or less components than those shown in FIG. 5. However, the components shown are sufficient to disclose an illustrative embodiment. Client Computer 500 can represent, for example, one embodiment of at least one of Client Computers 102-105 of FIG. 1.

As shown in the figure, Client Computer 500 includes a processor 502 in communication with a mass memory 526 via a bus 534. In some embodiments, processor 502 can include one or more central processing units (CPU). Client Computer 500 also includes a power supply 528, one or more network interfaces 536, an audio interface 538, a display 540, a keypad 542, an illuminator 544, a video interface 546, an input/output interface 548, a haptic interface 550, and a global positioning system (GPS) receiver 532.

Power supply 528 provides power to Client Computer 500. A rechargeable or non-rechargeable battery can be used to provide power. The power can also be provided by an external power source, such as an alternating current (AC) adapter or a powered docking cradle that supplements and/or recharges a battery.

Client Computer 500 can optionally communicate with a base station (not shown), or directly with another computer. Network interface 536 includes circuitry for coupling Client Computer 500 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 536 is sometimes known as a transceiver, transceiving device, or network interface card (NIC).

Audio interface 538 is arranged to produce and receive audio signals such as the sound of a human voice. For example, audio interface 538 can be coupled to a speaker and microphone (not shown) to enable telecommunication with others and/or generate an audio acknowledgement for some action.

Display 540 can be a liquid crystal display (LCD), gas plasma, light emitting diode (LED), organic LED, or any other type of display used with a computer. Display 540 can also include a touch sensitive screen arranged to receive input from an object such as a stylus or a digit from a human hand.

Keypad 542 can comprise any input device arranged to receive input from a user. For example, keypad 542 can include a push button numeric dial, or a keyboard. Keypad 542 can also include command buttons that are associated with selecting and sending images.

Illuminator 544 can provide a status indication and/or provide light. Illuminator 544 can remain active for specific periods of time or in response to events. For example, when illuminator 544 is active, it can backlight the buttons on keypad 542 and stay on while the Client Computer is powered. Also, illuminator 544 can backlight these buttons in various patterns when particular actions are performed, such as dialing another client computer. Illuminator 544 can also cause light sources positioned within a transparent or translucent case of the client computer to illuminate in response to actions.

Video interface 546 is arranged to capture video images, such as a still photo, a video segment, an infrared video, or the like. For example, video interface 546 can be coupled to a digital video camera, a web-camera, or the like. Video interface 546 can comprise a lens, an image sensor, and other electronics. Image sensors can include a complementary metal-oxide-semiconductor (CMOS) integrated circuit, charge-coupled device (CCD), or any other integrated circuit for sensing light.

Client computer 500 also comprises input/output interface 548 for communicating with external devices, such as a headset, or other input or output devices not shown in FIG. 5. Input/output interface 548 can utilize one or more communication technologies, such as USB, infrared, Bluetooth™, or the like.

Haptic interface 550 is arranged to provide tactile feedback to a user of the client computer. For example, the haptic interface 550 can be employed to vibrate client computer 500 in a particular way when another user of a computing computer is calling. In some embodiments, haptic interface 550 can be optional.

Client computer 500 can also include GPS transceiver 532 to determine the physical coordinates of client computer 500 on the surface of the Earth. GPS transceiver 532, in some embodiments, can be optional. GPS transceiver 532 typically outputs a location as latitude and longitude values. However, GPS transceiver 532 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 500 on the surface of the Earth. It is understood that under different conditions, GPS transceiver 532 can determine a physical location within millimeters for client computer 500; and in other cases, the determined physical location can be less precise, such as within a meter or significantly greater distances. In one embodiment, however, client computer 500 can through other components, provide other information that can be employed to determine a physical location of the computer, including for example, a Media Access Control (MAC) address, IP address, or the like.

Mass memory 526 includes a Random Access Memory (RAM) 504, a Read-only Memory (ROM) 522, and other storage means. Mass memory 526 illustrates an example of computer readable storage media (devices) for storage of information such as computer readable instructions, data structures, program modules or other data. Mass memory 526 stores a basic input/output system (BIOS) 524 for controlling low-level operation of client computer 500. The mass memory also stores an operating system 506 for controlling the operation of client computer 500. It will be appreciated that this component can include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system can include, or interface with a Java virtual machine module that enables control of hardware components and/or operating system operations via Java application programs.

Mass memory 526 further includes one or more data storage 508, which can be utilized by client computer 500 to store, among other things, applications 514 and/or other data. For example, data storage 508 can also be employed to store information that describes various capabilities of client computer 500. The information can then be provided to another computer based on any of a variety of events, including being sent as part of a header during a communication, sent upon request, or the like. Data storage 508 can also be employed to store social networking information including address books, buddy lists, aliases, user profile information, or the like. Further, data storage 508 can also store message, we page content, or any of a variety of user generated content. At least a portion of the information can also be stored on another component of client computer 500, including, but not limited to processor readable storage media 530, a disk drive or other computer readable storage devices (not shown) within client computer 500.

Processor readable storage media 530 can include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 530 can also be referred to herein as computer readable storage media and/or computer readable storage device.

Applications 514 can include computer executable instructions which, when executed by client computer 500, transmit, receive, and/or otherwise process network data. Network data can include, but is not limited to, messages (e.g. SMS, Multimedia Message Service (MMS), instant message (IM), email, and/or other messages), audio, video, and enable telecommunication with another user of another client computer. Applications 514 can include, for example, browser 518, and other applications 520. Other applications 520 can include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 518 can include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages can be employed. In one embodiment, browser 518 can enable a user of client computer 500 to communicate with another network computer, such as Master Data Maturity Analytics Server Computer 112 and/or Business Entity Information Server Computer 114 of FIG. 1.

Applications 514 can also include Widget Controller 510 and one or more Widgets 512. Widgets 512 can be collections of content provided to the client computer by Master Data Maturity Analytics Server Computer 112. Widget Controller 510 can be a program that can be provided to the client computer by Master Data Maturity Analytics Server Computer 112. Widget Controller 510 and Widgets 512 can run as native client computer applications or they can run in Browser 518 as web browser based applications. Also, Widget Controller 510 and Widgets 512 can be arranged to run as native applications or web browser applications, or combination thereof.

Illustrative Network Computer

FIG. 6A shows one embodiment of a network computer 600. Network computer 600 can include many more or less components than those shown. The components shown, however, are sufficient to disclose an illustrative embodiment. Network computer 600 can be configured to operate as a server, client, peer, a host, or any other computer. Network computer 600 can represent, for example Master Data Maturity Analytics Server Computer 112 and/or Business Entity Information Server Computer 114 of FIG. 1, and/or other network computers.

Network computer 600 includes processor 602, processor readable storage media 628, network interface unit 630, an input/output interface 632, hard disk drive 634, video display adapter 636, and memory 626, all in communication with each other via bus 638. In some embodiments, processor 602 can include one or more central processing units.

As illustrated in FIG. 6, network computer 600 also can communicate with the Internet, or some other communications network, via network interface unit 630, which is constructed for use with various communication protocols including the TCP/IP protocol. Network interface unit 630 is sometimes known as a transceiver, transceiving device, or network interface card (NIC).

Network computer 600 also comprises input/output interface 632 for communicating with external devices, such as a keyboard, or other input or output devices not shown in FIG. 6. Input/output interface 632 can utilize one or more communication technologies, such as USB, infrared, Bluetooth™, or the like.

Memory 626 generally includes RAM 604, ROM 622 and one or more permanent mass storage devices, such as hard disk drive 634, tape drive, optical drive, and/or floppy disk drive. Memory 626 stores operating system 606 for controlling the operation of network computer 600. Any general-purpose operating system can be employed. Basic input/output system (BIOS) 624 is also provided for controlling the low-level operation of network computer 600.

Although illustrated separately, memory 626 can include processor readable storage media 628. Processor readable storage media 628 can be referred to and/or include computer readable media, computer readable storage media, and/or processor readable storage device. Processor readable storage media 628 can include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 626 further includes one or more data storage 608, which can be utilized by network computer 600 to store, among other things, applications 614 and/or other data such as content 610. For example, data storage 608 can also be employed to store information that describes various capabilities of network computer 600. The information can then be provided to another computer based on any of a variety of events, including being sent as part of a header during a communication, sent upon request, or the like. Data storage 608 can also be employed to store messages, web page content, or the like. At least a portion of the information can also be stored on another component of network computer 600, including, but not limited to processor readable storage media 628, hard disk drive 634, or other computer readable storage medias (not shown) within client computer 600.

Data storage 608 can include a database, text, spreadsheet, folder, file, or the like, that can be configured to maintain and store user account identifiers, user profiles, email addresses, IM addresses, and/or other network addresses; or the like.

In at least one of the various embodiments, Data storage 608 can include master data maturity database 315, which can contain master data maturity matrix information determined from one or more master data users. Master data maturity database 610, can include historical information for master data maturity matrices and scores therefrom as well as comparison information based on some or all of the hierarchical master data entities that can be associated with the system.

In at least one of the various embodiments, data storage 608 can include business entity information database, which can contain information determined from one or more Business Entity Analytics Servers 114. Examples of Business Entity Analytics Servers 114 are described in U.S. Pat. No. 7,822,757, filed on Feb. 18, 2003 entitled System and Method for Providing Enhanced Information, and U.S. Pat. No. 8,346,790, filed on Sep. 28, 2010 and entitled Data Integration Method and System, the entirety of each of which is incorporated by reference herein.

Data storage 608 can further include program code, data, algorithms, and the like, for use by a processor, such as processor 602 to execute and perform actions. In one embodiment, at least some of data store 608 might also be stored on another component of network computer 600, including, but not limited to processor-readable storage media 628, hard disk drive 634, or the like.

Applications 612 can include computer executable instructions, which can be loaded into mass memory and run on operating system 606. Examples of application programs can include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 612 can also include website server 614, Master Data Maturity Engine 616, Master Data User Maturity Assessment and Score Generation Module 618, Master Data Maturity Matrix Generator 620, and/or Report Generator 621.

Website server 614 can represents any of a variety of information and services that are configured to provide content, including interfaces as described herein, over a network to another computer. Thus, website server 614 can include, for example, a web server, a File Transfer Protocol (FTP) server, a database server, a content server, or the like. Website server 614 can provide the content including messages over the network using any of a variety of formats including, but not limited to WAP, HDML, WML, SGML, HTML, XML, Compact HTML (cHTML), Extensible HTML (xHTML), or the like.

Master Data Maturity Engine 616 can be configured to generate master data user entity matrices and dynamic interface reports, and can be operative and/or hosted on Master Data Maturity Analytics Server Computer 112, Business Entity Information Server 144 or the like. Master Data Maturity Engine 616 can employ processes, or parts of processes, such as those described in conjunction with FIGS. 2-4 and interfaces FIGS. 7-14B, to perform at least some of its actions.

Master Data Maturity Engine 616 can comprise Master Data Maturity Assessment and Score Generation Module 618. In at least one of the various embodiments, Master Data Maturity Assessment and Score Generation Module 618 can be operative and/or hosted on Master Data Maturity Analytics Server Computer 112 or Business Entity Information Server 144 and can employ processes, or parts of processes, like those described in conjunction with FIGS. 2-4 and interfaces of FIGS. 7-10, to perform at least some of its actions.

Master Data Maturity Engine 616 can comprise Master Data Maturity Matrix Generator 619. In at least one of the various embodiments, Master Data Maturity Matrix Generator 619 can be hosted on Master Data Maturity Analytics Server Computer 112 or Business Entity Information Server 144 and can employ processes, or parts of processes, like those described in conjunction with FIGS. 2-4 and interfaces of FIGS. 11-14, to perform at least some of its actions.

Master Data Maturity Engine 616 can comprise Comparator 620. In at least one of the various embodiments, Master Data Maturity Matrix Generator 619 can be operative and/or hosted on Master Data Maturity Analytics Server Computer 112 and can employ processes, or parts of processes, such as those described in conjunction with FIGS. 2-4 and interface of FIG. 14B, to perform at least some of its actions.

Master Data Maturity Engine 616 can comprise a Report Generator 621. In at least one of the various embodiments, Report Generator 621 can be arranged and configured to determine and/or generate reports and dynamic graphic objects based on the master data maturity matrices. In at least one of the various embodiments, Report Generator 621 can be operative and/or hosted on Master Data Maturity Analytics Server Computer 112 and can employ processes, or parts of processes, like those described in conjunction with FIGS. 2-4 and interfaces of FIGS. 11A-14B, to perform at least some of its actions In at least one of the various embodiments, a master data maturity engine component 616 can be arranged to generate a master data maturity matrix based on the ordinal inputs from a master data user. In at least one of the various embodiments, master data maturity analysis can include determining the scores for the master data dimensions and goals as described herein.

Logical System Architecture

Figure 6B:
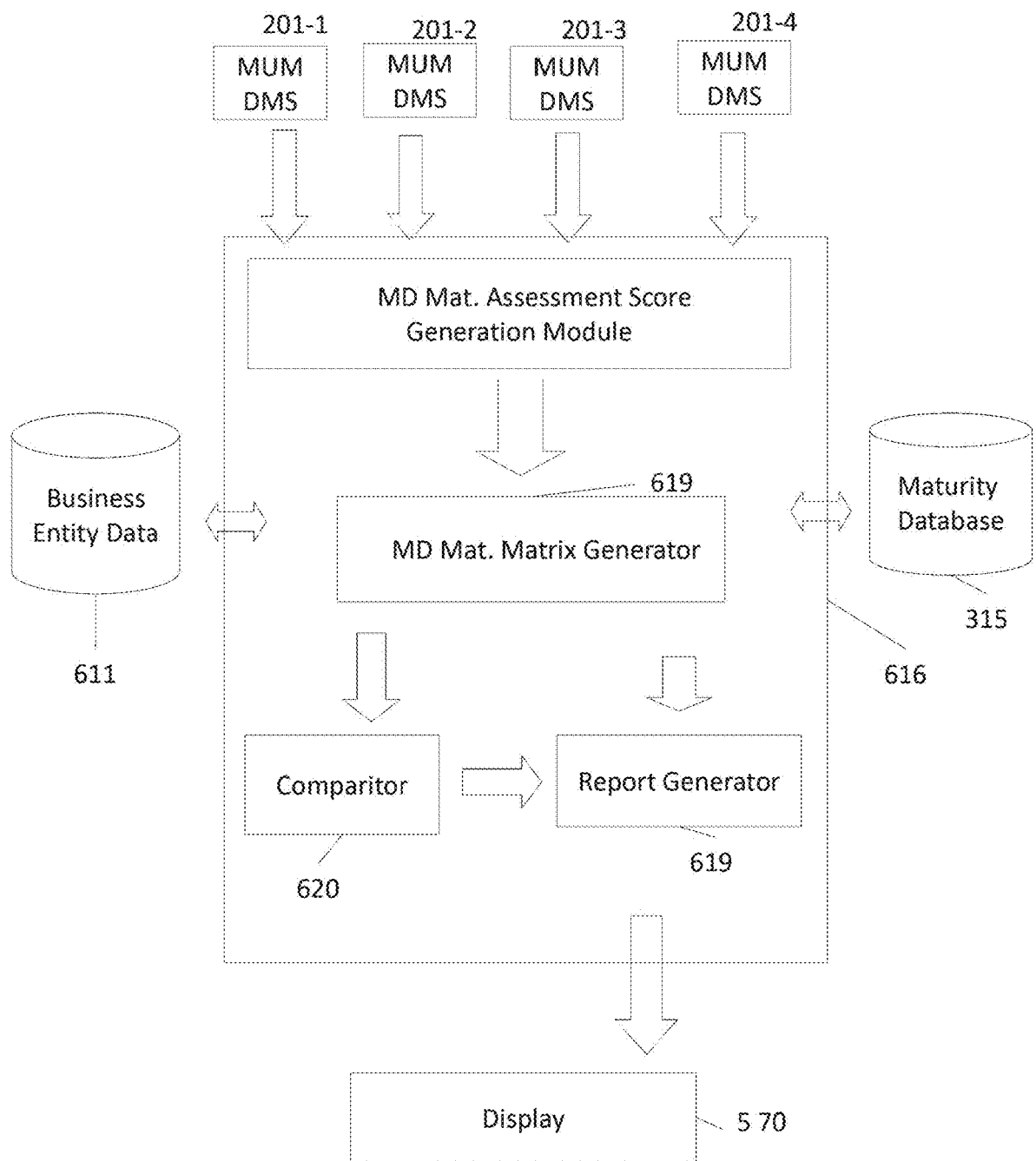

FIG. 6B represents a logical architecture flow for system 650 for master data maturity analytics in accordance with at least one of the various embodiments.

Figure 4:
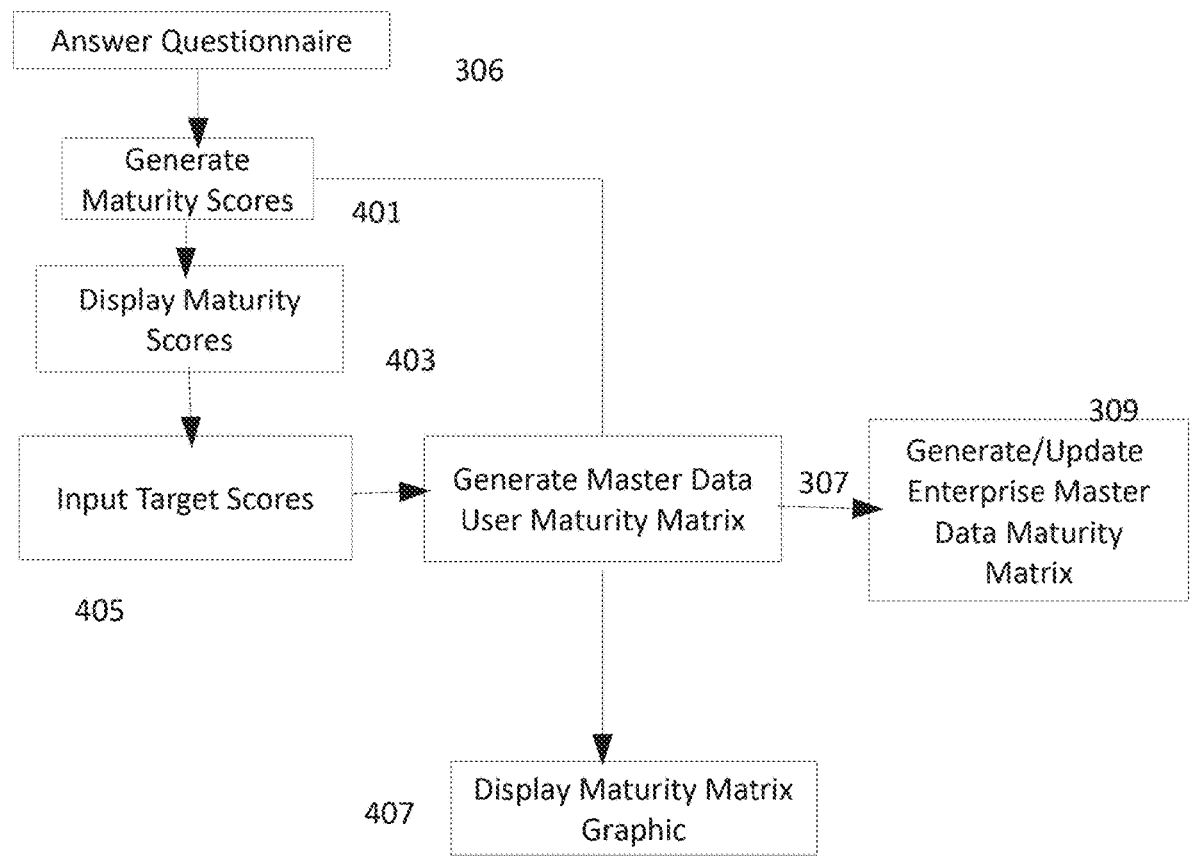

In at least one of the various embodiments, master data maturity analysis, inputs from unique master data users 201-1, 201-2, 201-3, 201-N, are input to master data Master Data Maturity Assessment and Score Generation Module 618 can be operative and/or hosted on Master Data Maturity Analytics Server Computer 112 and can employ processes, or parts of processes, like those described in conjunction with FIGS. 2-4 and interfaces of FIGS. 7-10J, to perform at least some of its actions.

In at least one of the various embodiments, master data maturity analysis can include determining historical information from a record store, such as, master data maturity database 610. In at least one of the various embodiments master data maturity database 610 can include master data user information, master data maturity matrix information including master data maturity scores and time of generation, hierarchical master data entity information, information, or the like, associated with hierarchical master data entities. Thus, in at least one of the various embodiments, master data maturity database 610 can be a storehouse of historical master data maturity matrices and master data maturity information that is associated with hierarchical master data users.

In at least one of the various embodiments, master data maturity analysis can include obtaining and linking or mapping hierarchical entity information for an enterprise from a record store, such as, enterprise database 611. In at least one of the various embodiments, enterprise database includes a database of robust company/business entity data 611 and employee data to enrich company master data maturity databases as described herein. Examples of Business Entity Analytics Servers 104 are described in U.S. Pat. No. 7,822,757, filed on Feb. 18, 2003 entitled System and Method for Providing Enhanced Information, and U.S. Pat. No. 8,346,790, filed on Sep. 28, 2010 and entitled Data Integration Method and System, the entirety of each of which is incorporated by reference herein. Enterprise database 611 can include firmographic data including company names, company IDs, employee listings and contact information, company scores, line of business and categories therefor, and robust linkage to firmographic data for enterprises. Database 611 can also include any number of categories applicable across enterprises that can be used to define hierarchal entities to categorize master data users, for example lines of business, vertical or horizontal business modules, department titles, employee titles, firmographic categories, and so on.

In at least one of the various embodiments, master data maturity matrix information from master data maturity engine component 616 can flow to comparator 620 and/or report generator 619. In at least one of the various embodiments, report generator 619 can be arranged to generate one or more reports based on the master data maturity matrix information. In at least one of the various embodiments, reports can include historical master data maturity matrix information or comparison information as described herein. In at least one of the various embodiments, reports can be determined and formatted as graphic interface objects, for example as described with respect to FIGS. 7-14B.

In at least one of the various embodiments, a graphic display interface can render a display of the information produced by the other components of the systems, for example via the website server 612. In at least one of the various embodiments, display 570 can be presented on a client computer accessed over network, such as client computers 102, 103, 104, 105, 500 or the like.

Illustrative User Interface Use Cases

FIGS. 7-14B represent graphical user interfaces for master data maturity analysis and optimization with at least one of the various embodiments. In at least one of the various embodiments, user interfaces other than user interfaces those described below can be employed without departing from the spirit and/or scope of the claimed subject matter. Such user interfaces can have more or fewer user interface elements, which can be arranged in various ways. In some embodiments, user interfaces can be generated using web pages, mobile applications, emails, or the like. In at least one of the various embodiments, master data maturity engine and components, or the like, can include processes and/or API's for generating user interfaces.

Figure 7:
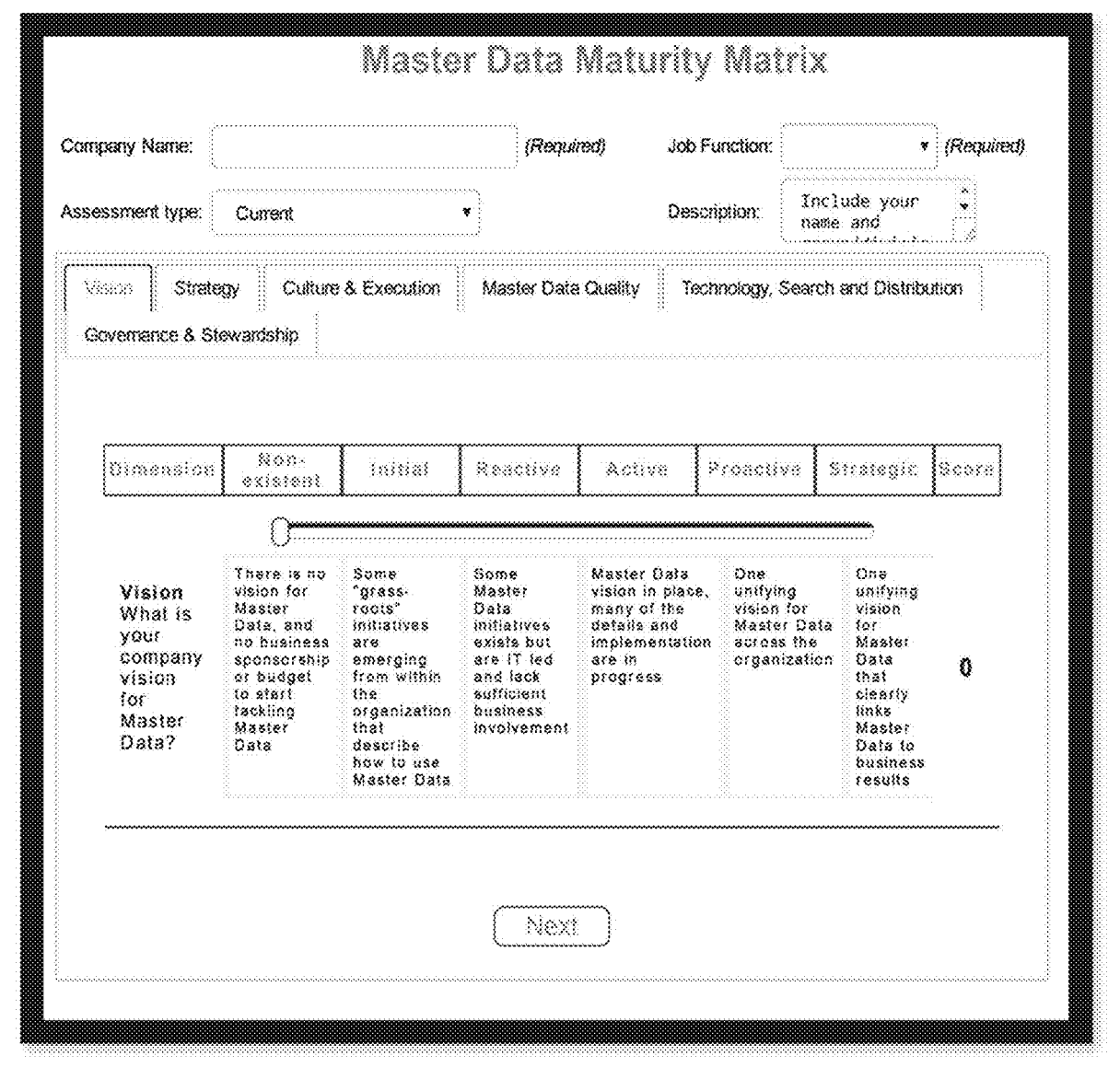

As shown in FIG. 7, the system interface presents a user interface a master data evaluation. As described herein, the survey comprises, for each master data dimension a predetermined question and a plurality of predetermined ordinal answers for each question, and the user interface is configured to accept a selected answer as the ordinal measure input. The interface includes a Name field where the master data user enters his or her name, as well as a required Job Function input, which is selected from a drop-down menu of predetermined job functions: (Information Technology, Supply Chain/Procurement/Manufacturing, Sales and Marketing, Finance, Executive). The required predefined Job Function selections can be used to identify and link the master data user's Line of Business. The interface also includes a field for further job descriptions, which can be used to further refine and identify master data usage areas and quality by linking the scores to the added information provided by master data users. The interface includes another dropdown menu for selecting the type of assessment. The user can choose to assess and generate scores for his or her current master data maturity assessment (Current), set target scores for his or her future master data maturity (Target), or assess and generate scores for both current and target master data maturity (Current and Target).

Once the master data user enters at least the required information and type of assessment, the graphic user interface presents an interface object for answering predetermined questions and generating master data maturity scores and/or master data target scores as described herein. For example, as shown in FIGS. 7-10I the interface comprises master data goal tabs, and when the tabs are selected via the interface, the system provides one or more master data dimension questions and 6 predefined answers therefor the user can select. In the embodiment, the master data user is provided with an interactive graphic including a slider that slides along the preselected answers and the ordinal levels, for example as shown in FIGS. 7-9B however any entry input for the interface can be used. For example, graphic can be configured with each of the ordinal answers as a clickable object, a radio object or other input. For example, as shown in FIGS. 10A-10J, the interactive graphic includes, for each question, a row or rows including a series of clickable boxes along the preselected answers and the ordinal levels for the question, and the user can click into the box to generate the score. As the master data user selects the preselected answer via the interface, the system generates and shows the master data dimension score for the selected level in a Score field. Once the user has made all the selections for each goal, the user clicks on a "Next" button and proceeds to the next goal.

As shown in FIGS. 9A-10J, the interface also includes an input object for inputting a target score for each master data dimension. If the master data user has selected "Target" (FIG. 9A) or "Current and Target" (FIGS. 9B, 10A-10J) in the dropdown assessment menu, the master data user is presented with interfaces that include an input object for generating target master data maturity scores. The system can be configured to require the master data user generate current master data maturity scores prior to or in conjunction with generating target scores. The system can also be configured to not allow a user to set a lower target score than a current score so that the target score is always at least equal to the current master data maturity score at any given time. For example, as shown in FIG. 9B, a left hand Current assessment slider that slides along a line for the preselected answers and the ordinal levels is employed, while on the right hand of the same line, a Target slider is employed, where the scores increase from left to right. In another embodiment, the system can be configured to allow the user to enter the Current and Target scores separately, for example as shown in FIGS. 10A-10J, where the interactive graphic includes two rows for each question—a Current row and Target row—each row including series of clickable boxes along the preselected answers and the ordinal levels for each question, and the user can click into the box in both the Current and Target rows to generate the scores.

Once the master data user completes the master data maturity survey, all the master data dimension scores are generated and, if selected, target master data dimension scores. The system can calculate an overall maturity score from the master data maturity dimension scores. The system can also generate a graphic showing a master data maturity report for the master data user.

For example, as shown in FIGS. 11A-13, the master data maturity matrix graphic comprises a radar chart for the master data user's master data maturity scores. The radar chart comprises a plurality of equiangular radii, each radii representing one of the master data maturity dimensions, and the corresponding master data maturity score generated by the system for the dimension is plotted on each radii along the standardized interval scale measuring the ordinal level for the dimension. The plotted dimension scores are connected to define a star-like chart or circular shape within the chart. In an embodiment, the overall master data maturity trend score can be plotted at the same interval on all the radii and to define a circular shape within the chart or can simply be shown as a number value.

The radar chart forms a two-dimensional chart of three or more quantitative variables represented on axes starting from the same point. It consists of a sequence of equiangular spokes (radii), with each spoke representing one of the ordinal levels and score of the maturity dimension. The data length of a spoke is proportional to the magnitude of the level interval for the data point relative to the maximum magnitude of the variable across all data points. A line is drawn connecting the data values for each spoke.

The radar chart graphic shows the observations that are most similar and clusters of observations, as well as examines relative values for a single data point (e.g., point 3 is large for variables 2 and 4, small for variables 1, 3, 5, and 6) and locates similar points or dissimilar points. The radar graphic displays multivariate observations with an arbitrary number of variables, where each star represents a single observation.

Figure 11A:
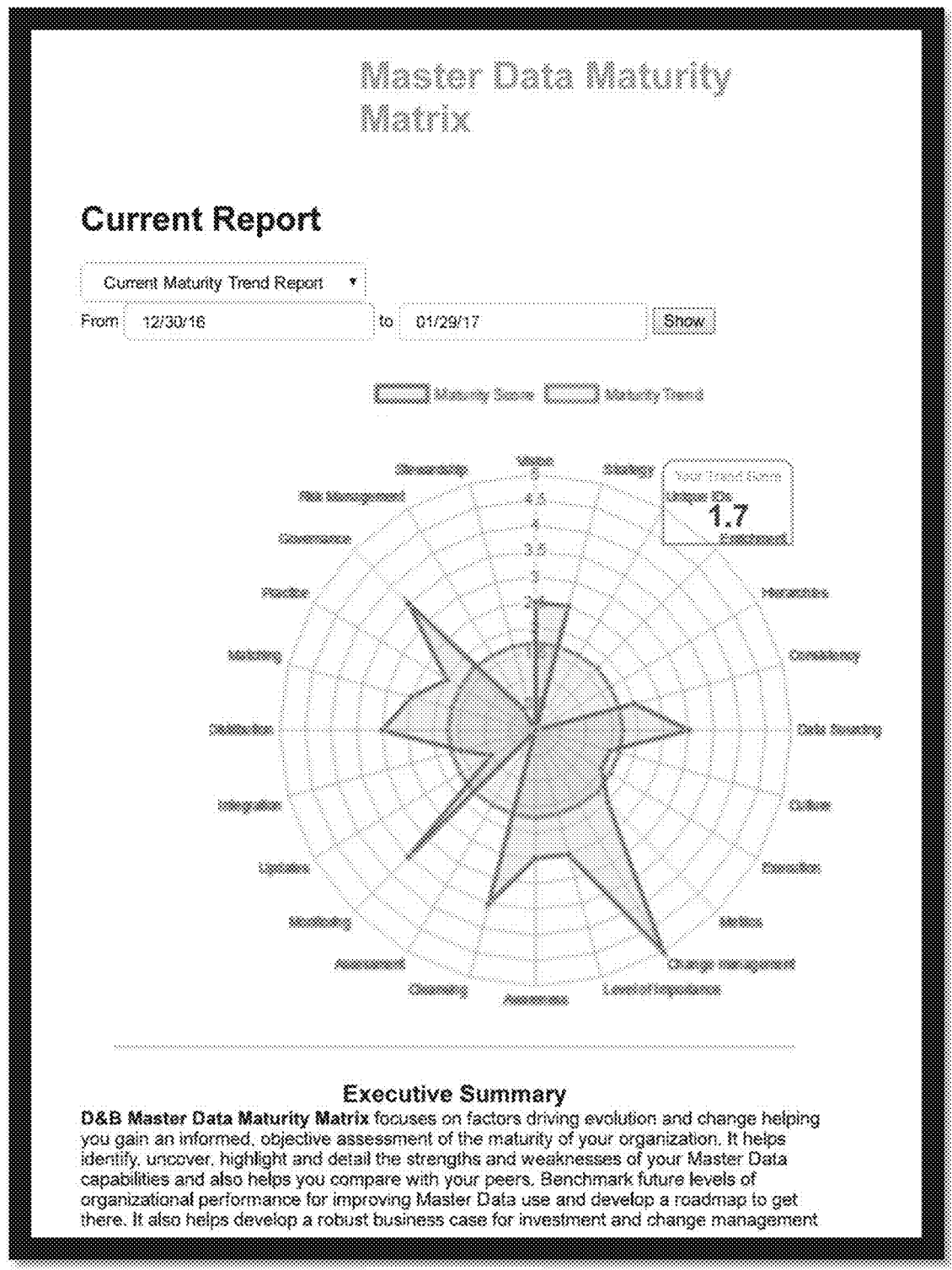
Figure 12A:
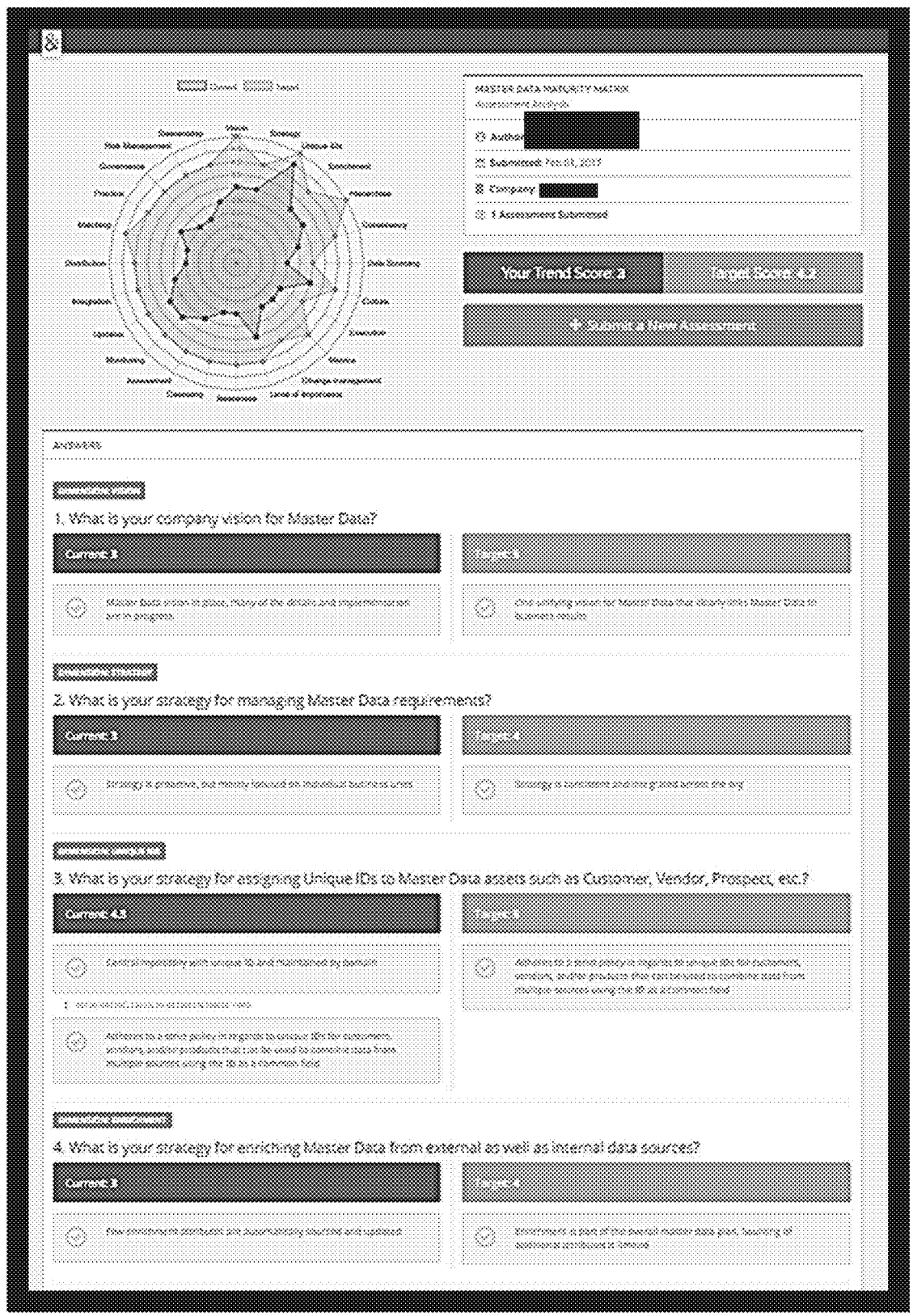

The master data user's score is represented by the star-shaped line and highlights areas of low score, which in turn impacts the "Maturity Trend" score. In an embodiment, as the Maturity Trend score is a single value calculated from the master data maturity dimension scores, the Maturity Trend score can be shown as a circle that has the same interval value for all dimensions as shown in FIG. 11A. The graph shows master data strengths and weaknesses, making it easy to identify dimensions that can be addressed to improve the overall trend score. This helps users identify and invest effort in ensuring that matching is improved in order to help with the overall master data strategy of their organization.

As shown in FIGS. 12A-12E, the systems can also generate plotted master data dimension target maturity scores on the radar chart. When shown together with the current master data maturity dimension scores, the graphic shows a larger star-like or circular chart that surrounds or is coincident with the current scores, visually identifying a precise, quantified delta for each master data dimension as well as visually representing an overall area delta for master data improvement that corresponds to that master data user's technical contribution to improve the enterprise's master data. As shown at FIGS. 12A-12E, the report can also include a detailed breakdown of dimensions comparisons between current and target scores. The report can also show the Maturity Trend score.

Figure 13:
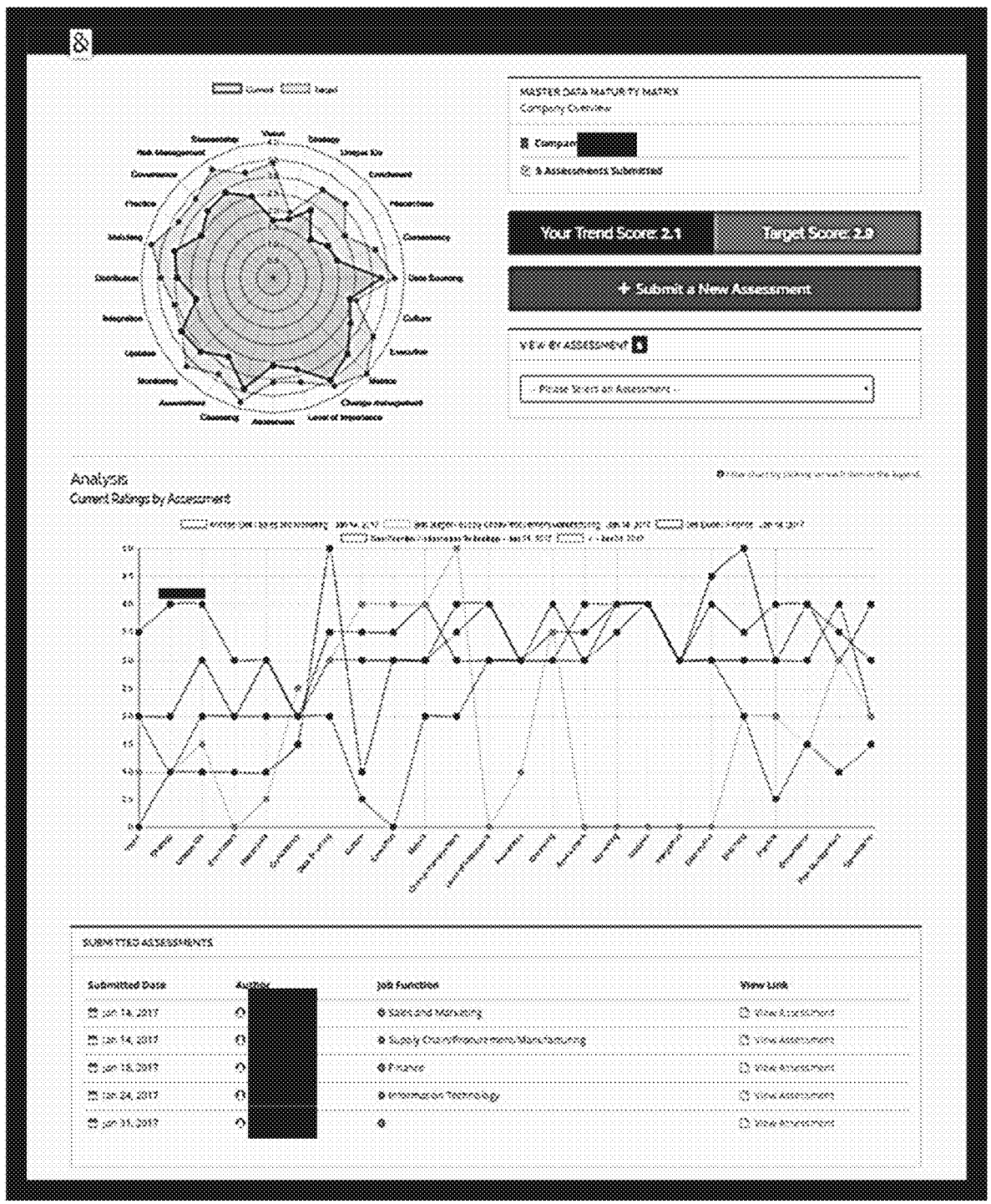

As shown in FIG. 13, as a plurality of master data users across the enterprise each generate one or more master data maturity matrices, the system is configured to generate a master data maturity matrix for the entire enterprise (all company reports). In an embodiment, the system can generate a master data maturity graphic for the enterprise, for example such as radar charts like those generated for individual master data users. In an embodiment, master data maturity graphics can also be generated for lines of business within the enterprise, for example radar charts or bar graphs for each line of business, which can be generated and displayed independently of the maturity matrix for the entire enterprise, together with it, or both.

As noted herein, in order to assess real master data maturity of an organization, it is best to take "sampling" from multiple 'points'—master data users—within the company as opposed to a single person taking the assessment. One person taking the assessment can give skewed results and may not represent an accurate maturity level for the whole company or even division or line of business. Assessments can be taken by master data users representing divisions or groups, practitioners, decision makers, end users, etc. All the master data user scores are used to calculate and generate company-wide maturity trend scores while allowing for identifying and comparing divisional/group level maturity assessments.

In at least one of the various embodiments, the system can generate reports or graphics for comparing the master data maturity of hierarchical master data entities such as lines of business, master data user entities, and an enterprise. For example, as shown in FIGS. 14A-14B the master data maturity graphic can include a bar graph, with a first axis marking dimensions and a second axis being the standardized interval scale measuring the ordinal level for each dimension on the first axis, and the graphic is configured such that hierarchical entities' dimension scores are plotted and compared on the bar graph. As shown in FIG. 14B, the master data maturity scores for three lines of business are plotted on the bar graph: Information Technology, Sales and Marketing, and Supply Chain/Procurement/Manufacturing. Supply Chain IT scores high on Monitoring but Sales and Marketing master data user scores aggregate to show a monitoring master data dimension as low maturity. Thus, Sales and Marketing master data users are not meeting master data monitoring goals with the current processes in place and is an area that can be addressed and improved.

Although the master data maturity comparison graphic as shown compares line of business entities, the system can be configured to compere any hierarchical master data entities. For example, the bar graph could plot a master data user's maturity data dimension scores, the master data maturity dimension scores for his or her line of business, and the enterprise master data maturity score. Or, for another example, one or more line of business master data maturity matrix scores can be plotted and compared to the enterprise's master data maturity matrix scores.

In an embodiment, the computer system can be configured to compare entities from different enterprises. For example, the system can be configured to allow an enterprise to compare the hierarchical entity master data maturity matrices generated from its master data users with master data maturity matrices from other enterprises stored in the master user database. For example, in at least one of the various embodiments, the system can allow users to compare matrices and master maturity scores for peer hierarchal entities in other enterprises, such as maturity matrices for lines of business or other defined business components As described herein, master data user maturity matrices can be linked and mapped firmographic data, for example from a Business Entity Server Information Server as described herein. Such data can be processed and presented to preserve business entity anonymity, and/or enterprises may opt to share such data openly.

Another embodiment includes a system for assessing and optimizing master data maturity for an enterprise master data comprising: a memory including a database configured to store master data maturity data for a plurality of hierarchical entities including a plurality of unique master data users; a master data maturity engine configured to measure master data maturity for a plurality of predefined hierarchical entities for an enterprise based on master data maturity units generated for a plurality of unique master data users, the master data maturity engine configured to generate, in the computer system, a master data maturity matrix comprising a plurality of master data dimensions; wherein the system is configured to generate, in the computer system, the master data maturity matrix for each of the plurality of hierarchical entities; wherein the master data maturity engine is configured to generate, in the computer system, a master data maturity unit for each of the plurality of master data dimensions; wherein an enterprise master data maturity matrix is generated from the master data maturity units of all the unique master data users for that enterprise; and a user interface configured to present a plurality of unique master data users with a master data evaluation interface for master data user input to the master data maturity engine and to display the master data maturity matrix.

Furthermore, each master data dimension maturity unit generated by the master data maturity engine is identified to a standardized interval scale corresponding to a plurality of ordinal levels for each dimension.

The system is configured to calculate an overall master data maturity from the plurality of master data dimension maturity units for the master data maturity matrix.

The hierarchal entities include a line of business and the enterprise, and a line of business master data maturity matrix and an enterprise master data maturity matrix are calculated from the master data user master data maturity units, wherein each line of business master data maturity matrix is generated from the master data maturity units of the one or more unique master data users identified to that line of business.

The system is configured to allow a user to compare master data maturity matrices for the hierarchical entities.

The master data evaluation interface is configured to present an interactive survey comprising, for each master data dimension, an input for an ordinal measure of the dimension, wherein the master data maturity engine generates the master data maturity unit for the master data dimension from the ordinal measure input.

The master data maturity matrix includes a plurality of master data goals, each master data goal comprising one or more of the master data dimensions. The master data maturity matrix includes a plurality of master data goals, each master data goal comprising one or more of the master data dimensions. The overall master data maturity is a master data maturity trend. The master data maturity trend is generated by the computer system from a statistical model.

The statistical model is selected from a linear model selected from the group of linear regression, linear least-squares; and an iteratively reweighted least squares (IRLS).

The system is configured to log or generate, for each maturity data matrix, one or more target master data maturity units. The system is configured to log or generate a target unit for each master data dimension; each master data goal, and an overall master data maturity. The system is configured to allow each unique master data user to generate a plurality of master data maturity matrices over time to track master data maturity differences. The system is configured to track master data maturity matrices for each hierarchical user over time.

The enterprise master data maturity matrix is continually updated each time a unique master data user generates or updates their master data maturity matrix.

The system is configured to log, for each unique master data user, the line of business, the enterprise, and a time the master data maturity matrix is generated.

The system is configured to allow a user to compare master data maturity matrix data for hierarchical entities for an enterprise with master data maturity matrix data for other enterprises using the system.

The line of business master data maturity matrix is continually updated each time a unique master data user generates or updates their master data maturity matrix.

The master data evaluation survey comprises, for each master data dimension a predetermined question and a plurality of predetermined ordinal answers for each question, and the user interface is configured to accept a selected answer as the ordinal measure input.

The master data maturity matrix interface display comprises a graphic including a radar chart comprising a plurality of equiangular radii, each radii representing one of the master data dimensions, and the corresponding master data maturity unit for the dimension is plotted on each radii along the standardized interval scale measuring the ordinal level for the dimension; wherein the plotted dimension units are connected to define a star-like chart or circular shape within the chart.

The master data maturity matrix interface comprises a graphic including a bar graph, with a first axis marking dimensions and a second axis being the standardized interval scale measuring the ordinal level for each dimension on the first axis, and the graphic is configured such that hierarchical entities' dimension matrices are plotted and compared on the bar graph. The bar graph is configured to compare lines of business, master data user entities, and an enterprise. The bar graph is configured to compare entities from different enterprises.

A method of assessing and optimizing master data maturity the method being performed by a computer system that comprises one or more processors, a memory operatively coupled to at least one of the processors, and a computer-readable storage medium encoded with instructions executable by at least one of the processors and operatively coupled to at least one of the processors, the method comprising: presenting the plurality of unique master data users with a master data maturity interface configured to generate a master data maturity matrix comprising a plurality of master data dimensions for each unique master data user; presenting, via the interface, each unique master data user with a master data evaluation interface for master data input to the master data maturity engine; generating the master data maturity units for each of the plurality of master data dimensions from the ordinal measure input; generating, for each of the unique master data users, a master data maturity matrix comprising the plurality of master data dimension maturity units and an overall master data maturity; logging the time the master data maturity matrix is created; determining if a master data maturity matrix has been generated for another master data user master data user logged to the same enterprise; if so, generating an enterprise master maturity matrix from each unique users' master data maturity matrix units; logging the time the enterprise master data maturity matrix is created; and storing each master data maturity matrix in the massive user database.

The method further comprises: associating each of the unique master data users with a line of business and an enterprise. The method further comprises: logging the line of business for each unique master data user to enterprise master data maturity matrix. The method further comprises: presenting, via the master data evaluation interface, a survey comprising, for each master data dimension, an input for an ordinal measure of the dimension, wherein the master data maturity engine generates the master data maturity matrix for the master data dimension from the ordinal measure input.

A computer program product comprising a computer-readable storage medium encoded with instructions that, when executed by at least one processor within a computer system that comprises one or more processors and a memory operatively coupled to at least one of the processors, cause the computer system at least to: present the plurality of unique master data users with a master data maturity interface configured to generate a master data maturity matrix comprising a plurality of master data dimensions for each unique master data user; present, via the interface, each unique master data user with a master data evaluation interface for master data input to the master data maturity engine; generate the master data maturity units for each of the plurality of master data dimensions from the ordinal measure input; generate, for each of the unique master data users, a master data maturity matrix comprising the plurality of master data dimension maturity units and an overall master data maturity; log the time the master data maturity matrix is created; determine if a master data maturity matrix has been generated for another master data user master data user logged to the same enterprise; if so, generate an enterprise master maturity matrix from each unique users' master data maturity matrix units; log the time the enterprise master data maturity matrix is created; and storing each master data maturity matrix in the massive user database.

Furthermore, wherein the instructions, when executed by at least one processor, further cause the computer system at least to: associate each of the unique master data users with a line of business and an enterprise. The instructions, when executed by at least one processor, further cause the computer system at least to: log the line of business for each unique master data user to enterprise master data maturity matrix.

The instructions, when executed by at least one processor, further cause the computer system at least to: present, via the master data evaluation interface, a survey comprising, for each master data dimension, an input for an ordinal measure of the dimension, wherein the master data maturity engine generates the master data maturity matrix for the master data dimension from the ordinal measure input.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A system for assessing and optimizing master data maturity comprising:
   a network computer, including:
   a transceiver for communicating over the network;
   a massive user database for an enterprise configured to store master data maturity data for a plurality of hierarchical entities for the enterprise including a plurality of unique master data users; and
   a memory for storing at least instructions;
   a processor device that is operative to execute instructions that enable actions, including:
   present the plurality of unique master data users with a master data maturity graphical user interface operatively connected to the massive user database configured to generate a master data maturity matrix comprising a plurality of master data dimensions for each unique master data user logged to the system;
   present, via the graphical user interface, each unique master data user with a master data evaluation interface for master data input to the master data maturity engine wherein the graphical user interface comprises an interactive graphic input object to set a predetermined current ordinal measure for each of the plurality of master data dimensions and an interactive graphic input object to set a predetermined target ordinal measure for each of the plurality of master data dimensions, wherein the interactive graphic input to set from inputting an ordinal measure that is lower than the ordinal measure set for the respective master data dimension;
   generate master data maturity units for each of the plurality of master data dimensions from the current ordinal measure input and the target ordinal measure input;
   generate, for each of the unique master data users, a current master data maturity matrix comprising the plurality of master data dimension maturity units and an overall master data maturity;
   generate, for each of the unique master data users, a target master data maturity matrix comprising the plurality of master data dimension maturity units and an overall target master data maturity;
   log the time the current master data maturity matrix and the target master data maturity matrix is created;
   determine if a current master data maturity matrix has been generated for another master data user logged to the same enterprise linked to the each of the master data users in the massive user database;
   if so, automatically generate or update an enterprise master maturity matrix from each unique users' master data maturity matrix;
   log the time the enterprise master data maturity matrix is created;
   store each master data maturity matrix and time logs therefor in the massive user database,
   wherein the system is configured to dynamically recalculate and generate all hierarchical entity master data maturity scores across the entire system for the plurality hierarchical entities.

2. The computer system of claim 1, wherein the one or more processors are further programmed to associate each of the unique master data users with a line of business and an enterprise.

3. The computer system of claim 2, wherein the one or more processors are further programmed to log the line of business for each unique master data user to enterprise master data maturity matrix.

4. The computer system of claim 1, wherein the one or more processors are further programmed to present, via the master data evaluation interface, a survey comprising, for each master data dimension, an input for an ordinal measure of the dimension, wherein the master data maturity engine generates the master data maturity matrix for the master data dimension from the ordinal measure input.

5. The computer system of claim 1, wherein the one or more processors are further programmed at least to:
   log or generate, for each maturity data matrix, one or more target master data maturity units.

6. The computer system of claim 1, wherein the one or more processors are further programmed at least to:

log or generate, for each master data maturity matrix, a target unit for each master data dimension; a master data goal for one or more of the master data dimensions, and an overall master data maturity.

7. The computer system of claim 1, wherein the one or more processors are further programmed at least to:
display, via the master data maturity interface, a graphic of the master data maturity matrix.

8. The computer system of claim 7, wherein the one or more processors are further programmed at least to:
display, via the master data maturity interface, the master data maturity matrix graphic comprising a radar chart comprising a plurality of equiangular radii, each radii representing one of the master data dimensions, and the corresponding master data maturity unit for the dimension is plotted on each radii along a standardized interval scale measuring the ordinal level for the dimension; and
wherein the plotted dimension units are connected to define a star-like chart or circular shape within the chart.

9. The computer system of claim 8, wherein the one or more processors are further programmed at least to:
plot and display one or more corresponding master data maturity target units for the dimension along a standardized interval scale measuring the ordinal level for the dimension;
wherein the plotted data maturity targets units are connected to define a star-like chart or circular shape within the chart.

10. The computer system of claim 7, wherein the one or more processors are further programmed at least to:
display, via the master data maturity interface, the master data maturity matrix graphic comprising a bar graph, with a first axis marking dimensions and a second axis being the standardized interval scale measuring an ordinal level for each dimension on the first axis, and the graphic is configured such that one or more hierarchical entities' dimension units are plotted and compared on the bar graph.

11. The computer system of claim 10, wherein the one or more processors are further programmed at least to:
compare master data maturity matrices of hierarchical entities selected from: one or more lines of business, master data user entities, and an enterprise; and
display the comparisons on the bar graph.

12. The computer system of claim 11, wherein the one or more processors are further programmed at least to:
compare master data maturity matrix data of entities from different enterprises and;
display the comparisons on the bar graph.

13. The computer system of claim 1, wherein the one or more processors are further programmed at least to:
generate, for each unique master data user, a plurality of master data maturity matrices over time; and
track, for the plurality of master data maturity matrices for the unique master data user, master data maturity matrix differences,
wherein the system is configured to track master data maturity matrices for each hierarchical user over time.

14. The computer system of claim 4, wherein the one or more processors are further programmed at least to:
present, via the interface, the master data evaluation survey comprising, for each master data dimension, a predetermined question and a plurality of predetermined ordinal answers for each question, and the user interface is configured to accept a selected answer as the ordinal measure input.

15. The computer system of claim 11, further comprising:
an operative connection to a massive business entity information database configured to store firmographic data for a plurality of enterprises; and
wherein the one or more processors are further programmed at least to:
register the enterprise to the massive business entity database; and
access the massive business entity database to log, for each of the unique master data users, firmographic data for the enterprise the master data user is associated with.

16. A computer system for assessing and optimizing master data maturity for an enterprise master data comprising:
a memory including an enterprise massive user database configured to store master data maturity data for the enterprise for a plurality of hierarchical entities including a plurality of unique master data users;
a master data maturity engine configured to measure master data maturity for a plurality of predefined hierarchical entities for an enterprise based on master data maturity units generated for the plurality of unique master data users, the master data maturity engine configured to generate, in the computer system, a master data maturity matrix comprising a plurality of master data dimensions;
wherein the system is configured to generate or dynamically update, in the computer system, the master data maturity matrix for each of the plurality of hierarchical entities;
wherein the master data maturity engine is configured to generate, in the computer system, a master data maturity unit for each of the plurality of master data dimensions;
wherein an enterprise master data maturity matrix is generated from the master data maturity units of all the unique master data users linked to that enterprise in the massive user database; and
a graphical user interface operative connected to the massive user database configured to present a plurality of unique master data users with a master data evaluation interface for master data user logged to the system to input to the master data maturity engine and to display the master data maturity matrix, wherein the graphical user interface comprises an interactive graphic input object to set a predetermined current ordinal measure for each of the plurality of master data dimensions and an interactive graphic input to set a predetermined target ordinal measure for each of the plurality of master data dimensions, wherein the interactive graphic input object to set the predetermined target ordinal measure is configured to prevent each master data user from inputting an ordinal measure that is lower than the ordinal measure set for the respective master data dimension.

17. A method of assessing and optimizing master data maturity the method being performed by a computer system that comprises one or more processors, a memory operatively coupled to at least one of the processors, and a computer-readable storage medium encoded with instructions executable by at least one of the processors and operatively coupled to at least one of the processors, the method comprising:

presenting, on a graphical user interface, a plurality of unique master data users logged to the system with a master data maturity interface operatively connected to a massive user database and configured to generate a master data maturity matrix comprising a plurality of master data dimensions for each unique master data user, wherein the graphical user interface comprises an interactive graphic input to set a predetermined current ordinal measure for each of the plurality of master data dimensions and an interactive graphic input to set a predetermined target ordinal measure for each of the plurality of master data dimensions, wherein the interactive graphic input to set the predetermined target ordinal measure is configured to prevent each master data user from inputting an ordinal measure that is lower than the ordinal measure set for the respective master data dimension;

presenting, via the graphical user interface, each unique master data user with a master data evaluation interface for master data input to the master data maturity engine;

generating a plurality of master data maturity units for each of the plurality of master data dimensions from the current ordinal measure input and the target ordinal measure input;

generating, for each of the unique master data users, a current master data maturity matrix comprising the plurality of master data dimension maturity units and an overall master data maturity;

generate, for each of the unique mater data users, a target master data maturity matrix comprising the plurality of master data dimension maturity units and an overall target master data maturity;

logging the time the current master data maturity matrix and the target master data maturity matrix is created;

determining if a current master data maturity matrix has been generated for another master data user logged to a same enterprise and linked to the each of the unique master data users in a massive user database;

if so, automatically generating or updating an enterprise master maturity matrix from each unique users' master data maturity matrix units;

logging the time the enterprise master data maturity matrix is created; and storing each master data maturity matrix and time logs therefor in the massive user database.

18. A computer program product comprising a non-transitory computer-readable storage medium encoded with instructions that, when executed by at least one processor within a computer system that comprises one or more processors and a memory operatively coupled to at least one of the processors, cause the computer system at least to:

present, via a graphical user interface, a plurality of unique master data users with a master data maturity interface operatively connected to the massive user database for an enterprise configured to generate a master data maturity matrix comprising a plurality of master data dimensions for each unique master data user logged to the system;

present, via the graphical user interface, each unique master data user with a master data evaluation interface for master data input to the master data maturity engine, wherein the graphical user interface comprises an interactive graphic input object to set a predetermined current ordinal measure for each of the plurality of master data dimensions and an interactive graphic input object to set a predetermined target ordinal measure for each of the plurality of master data dimensions, wherein the interactive graphic input master data user from inputting an ordinal measure that is lower than the ordinal measure set for the respective master data dimension;

generate the master data maturity units for each of the plurality of master data dimensions from the current ordinal measure input and the target ordinal measure input;

generate, for each of the unique master data users, a master data maturity matrix comprising the plurality of master data dimension maturity units and an overall master data maturity;

generate, for each of the unique master data users, a target master data maturity matrix comprising the plurality of master data dimension maturity units and an overall target master data maturity;

log the time the current master data maturity matrix and the target master data maturity matrix is created;

determine if a master data maturity matrix has been generated for another master data user logged to the same enterprise and linked to the each of the unique master data users in a massive user database;

if so, automatically generate or update an enterprise master maturity matrix from each unique users' master data maturity matrix units;

log the time the enterprise master data maturity matrix is created; and storing each master data maturity matrix and time logs therefor in the massive user database, wherein the system is configured to dynamically recalculate and generate all hierarchical entity master data maturity scores across the entire system for the plurality hierarchical entities.

* * * * *